US012284298B2

(12) United States Patent
Doney

(10) Patent No.: US 12,284,298 B2
(45) Date of Patent: Apr. 22, 2025

(54) METHOD AND APPARATUS FOR CREATING AND MANAGING USER CONFIGURABLE OBJECTS AND FUNCTIONS ON DISTRIBUTED LEDGER NETWORKS

(71) Applicant: Securrency, Inc., Annapolis, MD (US)

(72) Inventor: George Daniel Doney, Riva, MD (US)

(73) Assignee: DTCC DIGITAL (US) INC., Jersey City, NJ (US)

( * ) Notice: Subject to any disclaimer, the term of this patent is extended or adjusted under 35 U.S.C. 154(b) by 125 days.

(21) Appl. No.: 18/224,346

(22) Filed: Jul. 20, 2023

(65) Prior Publication Data

US 2023/0359604 A1 Nov. 9, 2023

Related U.S. Application Data

(63) Continuation-in-part of application No. 17/677,605, filed on Feb. 22, 2022, which is a continuation-in-part of application No. 16/143,058, filed on Sep. 26, 2018, now Pat. No. 11,410,235, said application No. 17/677,605 is a continuation-in-part of application No. 17/332,375, filed on May 27, 2021, now Pat. No. 11,876,915.

(60) Provisional application No. 63/151,834, filed on Feb. 22, 2021, provisional application No. 63/151,837, filed on Feb. 22, 2021, provisional application No. 62/563,684, filed on Sep. 27, 2017, provisional application No. 62/732,189, filed on Sep. 17, 2018, provisional application No. 63/030,416, filed on May 27, 2020.

(51) Int. Cl.
| | | |
|---|---|---|
| H04L 29/06 | (2006.01) | |
| G06F 16/22 | (2019.01) | |
| G06Q 20/36 | (2012.01) | |
| H04L 9/00 | (2022.01) | |

(52) U.S. Cl.
CPC ............ *H04L 9/50* (2022.05); *G06F 16/2255* (2019.01); *G06Q 20/367* (2013.01)

(58) Field of Classification Search
None
See application file for complete search history.

(56) References Cited

U.S. PATENT DOCUMENTS

| | | | |
|---|---|---|---|
| 10,721,069 B2 | 7/2020 | Konda et al. | |
| 10,831,924 B2 | 11/2020 | Miller | |
| 11,038,771 B2 | 6/2021 | Padmanabhan | |
| 11,050,572 B2 | 6/2021 | Steele et al. | |

(Continued)

FOREIGN PATENT DOCUMENTS

| | | | | |
|---|---|---|---|---|
| EP | 870291 B1 | * | 10/2001 | ............ B63B 49/00 |
| WO | WO-2012079926 A1 | * | 6/2012 | ................ B25J 9/16 |

*Primary Examiner* — Andrew J Steinle
(74) *Attorney, Agent, or Firm* — NEO IP

(57) ABSTRACT

A Decentralized Trusted Control Plan (D-TCP) to provide a means to define object behaviors without the need for coding on a decentralized computing network. The D-TCP implements pluggable logic through a multitude of decentralized registries with pre-defined code snippets stored on a decentralized network. The D-TCP links the applicable code selected from the registries to create desired functionality while maintaining platform security and providing economic incentives for fostering growth of the multitude of decentralized registries.

20 Claims, 26 Drawing Sheets

(56) References Cited

U.S. PATENT DOCUMENTS

| | | | |
|---|---|---|---|
| 11,316,691 | B2 | 4/2022 | Westland |
| 11,397,565 | B2 | 7/2022 | Buck et al. |
| 11,398,909 | B2 | 7/2022 | Madhuram et al. |
| 2008/0263531 | A1 | 10/2008 | Perry et al. |
| 2014/0129457 | A1 | 5/2014 | Peeler |
| 2018/0117446 | A1* | 5/2018 | Tran ........................ G06F 1/163 |
| 2019/0080404 | A1 | 3/2019 | Molinari et al. |
| 2020/0005284 | A1 | 1/2020 | Vijayan |
| 2020/0089672 | A1 | 3/2020 | Velisetti et al. |
| 2020/0349562 | A1 | 11/2020 | Madhuram et al. |
| 2022/0006705 | A1 | 1/2022 | Padmanabhan |
| 2022/0188810 | A1 | 6/2022 | Doney |
| 2022/0271915 | A1 | 8/2022 | Turner et al. |

* cited by examiner

250

| ClassRegistry | |
|---|---|
| PK | UniqueID |
| FK | parentId |
| | name |
| | creator |

| ClassInterface | |
|---|---|
| PK,FK1 | classId |
| PK,FK2 | logicId |
| PK,FK2 | interfaceId |
| | name |

| ClassDependency | |
|---|---|
| PK,FK1 | classId |
| PK,FK2 | logicId |
| PK,FK2 | dependencyId |
| | name |
| FK | attributeId |
| FK | linkedId |
| | permissionType |
| | readOnly |

| ClassFunction | |
|---|---|
| PK,FK1 | classId |
| PK,FK2 | functionKey |
| | interfaceId |
| | name |
| | permissionType |
| | permissionId |

| ClassProperty | |
|---|---|
| PK,FK1 | classId |
| PK,FK2 | propertyKey |
| | interfaceId |
| | name |
| FK | propertyId |
| | permissionType |
| | readOnly |

| ClassEvent | |
|---|---|
| PK,FK1 | classId |
| PK,FK2 | eventKey |
| FK | interfaceId |
| | name |

| ClassTrigger | |
|---|---|
| PK | UniqueID |
| FK | classId |
| | name |
| | triggerType |
| | functionKey |
| | triggerData |

| ClassSigner | |
|---|---|
| PK,FK1 | classId |
| PK,FK2 | address |
| | name |

| ClassIdentifierType | |
|---|---|
| PK,FK1 | classId |
| PK,FK2 | typeId |

CREATE PROPERTY

NAME *
Rate<br/>

CONTEXT *
Securrency
Securrency

INHERIT FROM (optional)
select inherit from

424

SOURCE (optional)
select source

DATA TYPE *
Select data type

EXTERNAL ID (optional)
Type name

ADDRESS ON REFUSE (optional)
Enter Address

EXPIRATION TIME(DAYS) (optional)
Type the number of days

DESCRIPTION (optional)
Type description

KEYS (optional)
Enter key

FIG. 4c

```
// Copyright SECURRENCY INC.
// SPDX-License-Identifier: AGPL 3.0
pragma solidity >=0.8.0 <0.9.0;

contract IExternalStorage {
// Getter Methods (will use a key modifier)
function getUint(bytes32 key) external view returns(uint);
function getInt(bytes32 key) external view returns(int);
function getAddress(bytes32 key) external view returns(address);
function getBytes32(bytes32 key) external view returns(bytes32);
function getBool(bytes32 key) external view returns(bool);
function getBytes(bytes32 key) external view returns(bytes memory);

// Setter Methods (will use a key modifier)
function setUint(bytes32 key, uint value) external;
function setInt(bytes32 key, int value) external;
function setAddress(bytes32 key, address value) external;
function setBytes32(bytes32 key, bytes32 value) external;
function setBool(bytes32 key, bool value) external;
function setBytes(bytes32 key, bytes calldata value) external;

// Delete Methods (will use a key modifier)
function deleteUint(bytes32 key) external;
function deleteInt(bytes32 key) external;
function deleteAddress(bytes32 key) external;
function deleteBytes32(bytes32 key) external;
function deleteBool(bytes32 key) external;
function deleteBytes(bytes32 key) external;
}

/**
 * @notice Modifies the storage pointer
 * @dev Additionally, add msg.sender to the key for keys uniqueness for each contract
 *
 * @param key The key provided from the logic
 * @return modifiedKey Hash of the provided key and msg.sender
 */
function keyModifier(bytes32 key) internal view returns (bytes32) {
    (uint itemId, address classRegistry) = _getSessionDetails(msg.sender);
    return keccak256(abi.encodePacked(key, itemId, classRegistry, msg.sender));
}
```

FIG. 11

METHOD AND APPARATUS FOR CREATING AND MANAGING USER CONFIGURABLE OBJECTS AND FUNCTIONS ON DISTRIBUTED LEDGER NETWORKS

CROSS REFERENCES TO RELATED APPLICATIONS

This application is related to and claims priority from the following U.S. patents and patent applications. This application is a continuation-in-part of U.S. application Ser. No. 17/677,605 filed Feb. 22, 2022, which claims priority to and the benefit of U.S. Provisional Application No. 63/151,834, filed Feb. 22, 2021, and U.S. Provisional Application No. 63/151,837, filed Feb. 22, 2021, and is a continuation-in-part of U.S. application Ser. No. 16/143,058, filed Sep. 26, 2018, which claims priority to and the benefit of U.S. Provisional Application No. 62/563,684, filed Sep. 27, 2017, and U.S. Provisional Application No. 62/732,189, filed Sep. 17, 2018, and is a continuation-in-part of U.S. application Ser. No. 17/332,375, filed May 27, 2021, which claims priority to and the benefit of U.S. Provisional Application No. 63/030,416, filed May 27, 2020, each of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO COMPUTER PROGRAM LISTING APPENDIX

The official copy of the Computer Program Listing is submitted concurrently with the specification as a TXT formatted file via EFS-Web, with a file name of "4534022-20230503-Computer-Program-Listing-Appendix.txt", a creation date of May 3, 2023, and a size of 74 kilobytes. The Computer Program Listing filed via EFS-Web is part of the specification and is incorporated in its entirety by reference herein.

BACKGROUND OF THE INVENTION

1. Field of the Invention

The present invention relates to a low-code development platform that utilizes configurable templates on a decentralized network, and more specifically to a Decentralized-Trust Control Plane for managing an on-chain store of routing instructions to smart contract logic.

2. Description of the Prior Art

It is generally known in the prior art to provide a platform for enabling low-code development through object-oriented programming.

Prior art patent documents include the following:

U.S. Patent Publication No. 2022/0006705 for systems, methods, and apparatuses for implementing a metadata driven rules engine on blockchain using distributed ledger technology (dlt) by inventor Pandmanabhan, filed Jun. 15, 2021 and published Jan. 6, 2022, is directed to systems, methods, and apparatuses for implementing a metadata driven rules engine on blockchain using Distributed Ledger Technology (DLT) in conjunction with a cloud based computing environment. There is a system having at least a processor and a memory therein executing within a host organization, in which such a system includes means for operating a blockchain interface to a blockchain on behalf of a plurality of tenants of the host organization, wherein each one of the plurality of tenants operate as one of a plurality of participating nodes on the blockchain having access to the blockchain; displaying a Graphical User Interface (GUI Interface) to a user device communicably interfaced with the system over a network, wherein the GUI interface is to prompt for a metadata rule definition at the user device when displayed by the user device; receiving input at the system from the GUI interface displayed to the client device, the input defining the metadata rule definition, wherein the metadata rule definition includes one or more conditions or criteria to be matched to a transaction received at the blockchain; auto-generating code for a smart contract representing the metadata rule definition based on the input received from the GUI interface displayed to the client device; submitting the smart contract having the code representing the metadata rule definition to the blockchain for consensus by participating nodes of the blockchain; and adding the smart contract having the code representing the metadata rule definition onto the blockchain by writing the metadata rule definition into an asset of a new block on the blockchain pursuant to the smart contract attaining consensus from the participating nodes of the blockchain.

U.S. Patent Publication No. 2020/0349562 for extensible template for asset token by inventors Madhuram, et al., filed Oct. 3, 2019 and published Nov. 5, 2020, is directed to a computer system comprising a logic system, and, operatively coupled to the logic system, a computer-memory system holding instructions that, when executed by the logic system, cause the computer system to: receive a token-behavior selection corresponding to a real-world asset to be tracked on a virtual ledger, the token behavior selection identifying a client-defined combination of behaviors; construct a template for registration of a token class on the virtual ledger according to the provider-defined architecture of the virtual ledger, wherein each new token instantiated from the token class exhibits the client-defined combination of behaviors as determined by the token-behavior selection; and provide access to the template to a client computer device.

U.S. Pat. No. 11,398,909 for reusable template for asset token by inventors Madhuram, et al., filed Oct. 3, 2019 and published Nov. 5, 2020, is directed to a computer system comprises a logic system, and, operatively coupled to the logic system, a computer-memory system holding instructions that, when executed by the logic system, cause the computer system to: receive a token-behavior selection corresponding to a real-world asset to be tracked on a virtual ledger, the token behavior selection identifying a client-defined combination of behaviors; construct a template for registration of a token class on the virtual ledger according to the provider-defined architecture of the virtual ledger, wherein each new token instantiated from the token class exhibits the client-defined combination of behaviors as determined by the token-behavior selection; and provide access to the template to a client computer device.

U.S. Patent Publication No. 2022/0271915 for advanced non-fungible token blockchain architecture by inventors Turner, et al., filed Feb. 23, 2021 and published Aug. 25, 2022, is directed to methods and systems that implement non-fungible tokens that implement a programmable grammar-based syntax in a variety of environments. A first non-fungible token that implements a programmable grammar-based syntax standard and includes a first updatable programmable section is generated. The first non-fungible token includes at least one of first executable instructions or first data, and a first portion of the at least one of the first executable instructions or the first data is stored, according to the grammar-based syntax standard, in the first updatable programmable section. The first non-fungible token may then be stored at a first blockchain address on a blockchain, and the first portion of the at least one of the first executable instructions or the first data in the first updatable programmable section of the first non-fungible token is subsequently changed to at least one of second executable instructions or second data.

U.S. Patent Publication No. 2020/0089672 for multi-tenant distributed ledger interfaces by inventors Velisetti, et al., filed Dec. 20, 2018, and published Mar. 19, 2020, is directed to a set of interfaces for implementing a blockchain network by a multi-tenant server, wherein the set of interfaces comprise an object mapping interface. The object mapping interface includes a set object function to designate a tenant object for use in the blockchain network based on an input object; a map function to map fields of the tenant object in a multi-tenant system managed by the multi-tenant server and fields of an exchange object used by the blockchain network based on an input set of field mappings; and a set owner function to set a tenant in the multi-tenant system as an owner of the mappings based on an input identifier.

U.S. Pat. No. 11,038,771 for systems, methods, and apparatuses for implementing a metadata driven rules engine on blockchain using distributed ledger technology (DLT) by inventors Padmanabhan, filed Nov. 14, 2019 and issued Jun. 15, 2021, is directed to systems, methods, and apparatuses for implementing a metadata driven rules engine on blockchain using Distributed Ledger Technology (DLT) in conjunction with a cloud based computing environment. A system having at least a processor and a memory therein executing within a host organization, in which such a system includes means for operating a blockchain interface to a blockchain on behalf of a plurality of tenants of the host organization, wherein each one of the plurality of tenants operate as one of a plurality of participating nodes on the blockchain having access to the blockchain; displaying a Graphical User Interface (GUI Interface) to a user device communicably interfaced with the system over a network, wherein the GUI interface is to prompt for a metadata rule definition at the user device when displayed by the user device; receiving input at the system from the GUI interface displayed to the client device, the input defining the metadata rule definition, wherein the metadata rule definition includes one or more conditions or criteria to be matched to a transaction received at the blockchain; auto-generating code for a smart contract representing the metadata rule definition based on the input received from the GUI interface displayed to the client device; submitting the smart contract having the code representing the metadata rule definition to the blockchain for consensus by participating nodes of the blockchain; and adding the smart contract having the code representing the metadata rule definition onto the blockchain by writing the metadata rule definition into an asset of a new block on the blockchain pursuant to the smart contract attaining consensus from the participating nodes of the blockchain. Other related embodiments are disclosed.

U.S. Patent Publication No. 2014/0129457 for an interactive organizational decision-making and compliance facilitation portal by inventor Peeler, filed Nov. 11, 2013 and published May 8, 2014, is directed to systems and methods for facilitation of enterprise compliance with managed rules or policies, including the use of and interactive compliance application including a decision tree structure with decision nodes, wherein an enterprise user may answer one or more specific questions and compliance guidance with respect to one or more managed rules or policies is provided according to received answers to the questions. An interactive decision facilitation portal enables the decision tree structure, by enabling both computer-algorithm-implemented decision nodes and human-aided decision nodes of the decision tree structure.

U.S. Patent Publication No. 2019/0080404 for system and method of providing a timing feature to token offerings by inventors Molinari, et al., filed Sep. 10, 2018 and published Mar. 14, 2019, is directed to a method for generating a unique token associated with a profit participation parameter in an issuing entity for a token holder, the unique token being generated as a security according to a security regulation and being based on a determination of demand by token holders. The method includes implementing a smart contract on a blockchain to manage distributions from the issuing entity to the token holder according to the unique token, wherein the smart contract comprises a set of promises in digital form and comprises defined protocols for managing value distribution from the issuing entity to the token holder, and wherein one of the unique token and the smart contract comprises a timeframe associated with a restriction on selling the unique token, implementing a restriction on a sale of the unique token during the timeframe and enabling the sale of the unique token after the timeframe.

U.S. Pat. No. 11,397,565 for automated generation of software applications using analysis of submitted content items by inventors Buck, et al., filed Dec. 23, 2020 and issued Jul. 26, 2022, is directed to a proposed initial version of an application to be generated on behalf of a client based on an analysis of example content items is determined. At least a portion of a software program implementing the application is generated, and an indication of the software program is provided to the client. Based on input received from the client, additional operations associated with the program are initiated.

U.S. Pat. No. 11,316,691 for methods and systems for enhancing network privacy on multiple party documents on distributed ledger-based networks by inventor Westland, filed Apr. 14, 2020 and issued Apr. 26, 2022, is directed to methods and systems directed at providing enhanced security and privacy to multiple party communications that occur on zero knowledge proof (ZKP)-enabled distributed ledger-based networks (DLNs). In particular, the methods and systems include subject matter related to the deployment, and approval, of a multi-party document or instrument for consideration and approval by multiple participants of the DLN.

U.S. Pat. No. 10,721,069 for methods and systems for enhancing privacy and efficiency on distributed ledger-based networks by inventors Konda, et al., filed Feb. 22, 2019 and issued Jul. 21, 2020, is directed to methods and systems that are directed at providing enhanced privacy, efficiency and security to distributed ledger-based networks (DLNs) via the implementation of zero-knowledge proofs (ZKPs) in the DLNs. ZKPs allow participants of DLNs to make statements on the DLNs about some private information and to prove the truth of the information without having to necessarily reveal the private information publicly. As such, the disclosed methods and systems directed at the ZKP-enabled DLNs provide privacy and efficiency to participants of the DLNs while still allowing the DLNs to remain as consensus-based networks.

U.S Patent Publication No. 2008/0263531 for automatic runtime control binding by inventors Perry, et al., filed Aug. 29, 2007 and published Oct. 23, 2008, is directed to binding automatically taking place between controls and information sources at runtime. This minimizes an amount of code that is to be generated by a user and thus can lower errors from the code. In addition, some wizards that allow binding without code writing can become problematic since some information is not available at runtime (e.g., when the wizard operates prior to runtime.) Relevant information is received and at least one binding is created based off received information.

U.S. Pat. No. 10,831,924 for unified control of privacy-impacting devices by inventor Miller, filed Oct. 20, 2019 and issued Nov. 10, 2020, is directed to systems, techniques, and apparatuses to facilitate selecting, defining, controlling, verifying, and auditing privacy-impacting behaviors of devices in alignment with the privacy behavior expectations of individuals and other entities. Techniques and systems, including apparatuses, are presented to facilitate controlling and verifying the privacy behaviors of privacy-impacting devices. "Privacy enunciator" apparatuses announce the presence of entities in a device's range of action or influence. Techniques and systems for defining and sharing individualized privacy behavior preferences are described. Techniques and systems are disclosed for privacy preference resolution protocols that allow for the automated or interactive resolution of conflicts that arise between individuals in multi-actor environments or ambiguous contexts. Accountability and audit mechanisms verify the control state of devices with respect to their privacy behavior preference inputs. A trust-enhancing and technically transparent system architecture includes a distributed application network, distributed ledger technology, smart contracts, and/or blockchain technology.

U.S. Pat. No. 11,050,572 for systems and methods for a decentralized data authentication platform by inventors Steele, et al., filed Jun. 18, 2020 and issued Jun. 29, 2021, is directed to a computer-implemented method for creating authenticable data may include receiving, at a computer server, a credential; storing, in a first data storage, the credential; and generating a credential decentralized identifier (DID) document. The credential DID document may correspond to the credential. The method may further include obtaining a first digital signature, which may be verifiable via a first public cryptographic key. A first attesting DID document may include the first public cryptographic key. The method may further include storing, in the first data storage, the first digital signature; and modifying the first attesting DID document to include a link configured to provide data access to data stored at first location in the first data storage. The data stored at the first location in the first data storage may include the credential or the first digital signature. The method may include obtaining a verifiable credential.

SUMMARY OF THE INVENTION

The present invention relates to a platform for enabling the means to define and modify configurable templates on a decentralized network to represent the behaviors and properties of real and virtual objects without the need for coding.

It is an object of this invention to provide a platform to enable scalable management of object templates in a decentralized network without a central authority to define template schema and object behaviors.

In one embodiment, the present invention includes a method for defining object behaviors for a configurable object in a decentralized network including: a Decentralized Trusted Control Plane (D-TCP) receiving a request to define a behavior of the configurable object; wherein the configurable object is a unique instance of a class expressed as a data structure specifying executable behaviors of the configurable object stored in an item registry; wherein the data structure of the configurable object includes a unique identifier, identifiable by a plurality of registries; wherein the plurality of registries includes the item registry including a plurality of objects and a logic registry including a plurality of selectable logic associated with the configurable object; wherein the plurality of registries are executable on a Decentralized Ledger Technology (DLT) through at least one smart contract; wherein the request includes smart contract logic from the logic registry defining an object behavior; the D-TCP routing the request using instructions in the data structure of the configurable object; the D-TCP mapping the smart contract logic from the logic registry to the configurable object of the item registry; the D-TCP configuring the configurable object to include the behavior defined by the smart contract logic; and the D-TCP executing the configurable object which includes the behavior defined by the smart contract logic using the at least one smart contract on the DLT.

In another embodiment, the present invention includes a system for defining object behaviors for a configurable object in a decentralized network including: a Decentralized Trusted Control Plane (D-TCP) including a processor and a memory executable on a Distributed Ledger Technology (DLT); wherein the D-TCP is operable to receive a request to define a behavior of the configurable object; wherein the configurable object is a unique instance of a class expressed as a data structure specifying executable behaviors of the configurable object stored in an item registry; wherein the data structure of the configurable object includes a unique identifier, identifiable by a plurality of registries; wherein the plurality of registries includes the item registry including a plurality of objects and/or a logic registry including a plurality of selectable logic associated with the configurable object; wherein the plurality of registries are executable on a DLT through at least one smart contract; wherein the request includes smart contract logic from the logic registry defining an object behavior; wherein the D-TCP further comprises an attestation registry and attribute registry operable to determine authorization to define object behavior by assigning an attestation value associated with the configurable object; wherein the D-TCP further comprising a context-based permission model operable to manage execution of state changes on the D-TCP by verifying that the configurable object associated with the requested state change is associated with a digital wallet having authority to make the requested state change through the unique identifier of the configurable object; wherein the D-TCP is operable to route the request using instructions in the data structure of the configurable object; wherein the D-TCP is operable to map the smart contract logic from the logic registry to the configurable object of the item registry; wherein the D-TCP is operable to configure the configurable object to include the behavior defined by the smart contract logic; and wherein the D-TCP is operable to execute the configured configurable object using at least one smart contract on a DLT.

In yet another embodiment, the present invention includes a system for defining object behaviors for a configurable object in a decentralized network comprising: a Decentralized Trusted Control Plane (D-TCP) including a processor and a memory executable on a Distributed Ledger Technology (DLT); wherein the D-TCP is operable to receive a request to define a behavior of the configurable object; wherein the configurable object is a unique instance of a class expressed as a data structure specifying executable behaviors of the configurable object stored in an item registry; wherein the data structure of the configurable object includes a unique identifier, identifiable by a plurality of registries; wherein the plurality of registries includes the item registry including a plurality of objects and/or a logic registry including a plurality of selectable logic associated with the configurable object; wherein the plurality of registries are executable on a DLT through at least one smart contract; wherein the request includes smart contract logic from the logic registry defining an object behavior; wherein the D-TCP further comprises a token factory operable to issue a fungible token, wherein the D-TCP facilitates a fee and/or payment of the fungible token as value exchange for actions associated with logic certification, object creation, smart contract logic implementation, and/or class template implementation; wherein the D-TCP is operable to route the request using instructions in the data structure of the configurable object; wherein the D-TCP is operable to map the smart contract logic from the logic registry to the configurable object of the item registry; wherein the D-TCP is operable to configure the configurable object to include the behavior defined by the smart contract logic; and wherein the D-TCP is operable to execute the configured configurable object using at least one smart contract on a DLT.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 3b illustrates a class registry data structure for capturing class templates according to one embodiment of the present invention.

FIG. 4c illustrates a GUI for property creation according to one embodiment of the present invention.

FIG. 11 illustrates an example of an interface specification for smart contract interactions with External Data that is shared between versions of a registered smart contract according to one embodiment of the present invention.

DETAILED DESCRIPTION

Figure 1:
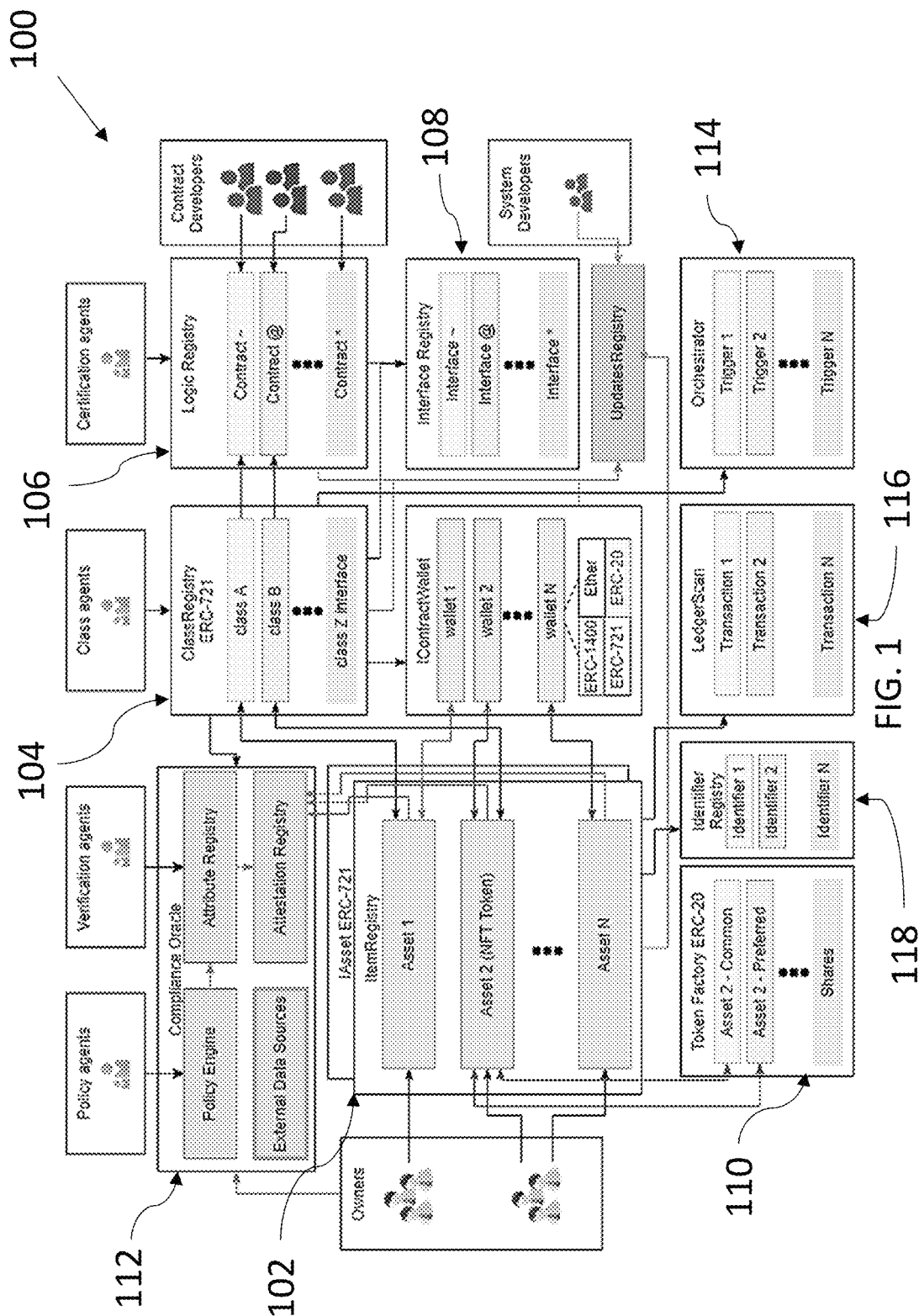
FIG. 1 illustrates a schematic of a computer system of a decentralized trusted control plane (D-TCP) according to one embodiment of the present invention.

The present invention is generally directed to a platform to enable pluggable logic to configurable objects on a decentralized network.

In one embodiment, the present invention includes a method for defining object behaviors for a configurable object in a decentralized network including: a Decentralized Trusted Control Plane (D-TCP) receiving a request to define a behavior of the configurable object; wherein the configurable object is a unique instance of a class expressed as a data structure specifying executable behaviors of the configurable object stored in an item registry; wherein the data structure of the configurable object includes a unique identifier, identifiable by a plurality of registries; wherein the plurality of registries includes the item registry including a plurality of objects and a logic registry including a plurality of selectable logic associated with the configurable object; wherein the plurality of registries are executable on a Decentralized Ledger Technology (DLT) through at least one smart contract; wherein the request includes smart contract logic from the logic registry defining an object behavior; the D-TCP routing the request using instructions in the data structure of the configurable object; the D-TCP mapping the smart contract logic from the logic registry to the configurable object of the item registry; the D-TCP configuring the configurable object to include the behavior defined by the smart contract logic; and the D-TCP executing the configurable object which includes the behavior defined by the smart contract logic using the at least one smart contract on the DLT.

In another embodiment, the present invention includes a system for defining object behaviors for a configurable object in a decentralized network including: a Decentralized Trusted Control Plane (D-TCP) including a processor and a memory executable on a Distributed Ledger Technology (DLT); wherein the D-TCP is operable to receive a request to define a behavior of the configurable object; wherein the configurable object is a unique instance of a class expressed as a data structure specifying executable behaviors of the configurable object stored in an item registry; wherein the data structure of the configurable object includes a unique identifier, identifiable by a plurality of registries; wherein the plurality of registries includes the item registry including a plurality of objects and/or a logic registry including a plurality of selectable logic associated with the configurable object; wherein the plurality of registries are executable on a DLT through at least one smart contract; wherein the request includes smart contract logic from the logic registry defining an object behavior; wherein the D-TCP further comprises an attestation registry and attribute registry operable to determine authorization to define object behavior by assigning an attestation value associated with the configurable object; wherein the D-TCP further comprising a context-based permission model operable to manage execution of state changes on the D-TCP by verifying that the configurable object associated with the requested state change is associated with a digital wallet having authority to make the requested state change through the unique identifier of the configurable object; wherein the D-TCP is operable to route the request using instructions in the data structure of the configurable object; wherein the D-TCP is operable to map the smart contract logic from the logic registry to the configurable object of the item registry; wherein the D-TCP is operable to configure the configurable object to include the behavior defined by the smart contract logic; and wherein the D-TCP is operable to execute the configured configurable object using at least one smart contract on a DLT.

In yet another embodiment, the present invention includes a system for defining object behaviors for a configurable object in a decentralized network comprising: a Decentralized Trusted Control Plane (D-TCP) including a processor and a memory executable on a Distributed Ledger Technology (DLT); wherein the D-TCP is operable to receive a request to define a behavior of the configurable object; wherein the configurable object is a unique instance of a class expressed as a data structure specifying executable behaviors of the configurable object stored in an item registry; wherein the data structure of the configurable object includes a unique identifier, identifiable by a plurality of registries; wherein the plurality of registries includes the item registry including a plurality of objects and/or a logic registry including a plurality of selectable logic associated with the configurable object; wherein the plurality of registries are executable on a DLT through at least one smart contract; wherein the request includes smart contract logic from the logic registry defining an object behavior; wherein the D-TCP further comprises a token factory operable to issue a fungible token, wherein the D-TCP facilitates a fee and/or payment of the fungible token as value exchange for actions associated with logic certification, object creation, smart contract logic implementation, and/or class template implementation; wherein the D-TCP is operable to route the request using instructions in the data structure of the configurable object; wherein the D-TCP is operable to map the smart contract logic from the logic registry to the configurable object of the item registry; wherein the D-TCP is operable to configure the configurable object to include the behavior defined by the smart contract logic; and wherein the D-TCP is operable to execute the configured configurable object using at least one smart contract on a DLT.

None of the prior art discloses a platform to enable pluggable logic through a plurality of interconnected registries on a decentralized network.

Distributed ledger technology (DLT) is a next generation computing platform that enables the creation of digital assets that can be issued and transacted without the participation of intermediaries. A distributed ledger is a type of distributed database that operates without a central authority and replicates an identical copy to a non-hierarchical network of nodes that communicates with each other over peer-to-peer protocols. The distributed ledger and resulting state of the system is secured from fault by a consensus mechanism that replaces the trusted node or central authority used in traditional databases. The ability to decentralize state change authorization decisions is a principal DLT innovation. As DLT has evolved, a distributed ledger can serve as the foundation for a decentralized computing platform that provides a runtime environment for programs stored on the ledger.

The first application of DLT was to create and run an application and digital currency named "Bitcoin," which was launched in 2009. Since then, Bitcoin inspired systems have been developed to create digital representations, represented by "tokens" of fungible (e.g., currency, gold, oil) and non-fungible assets (e.g., share certificates, crypto art) that are created and transacted upon DLT platforms. An attraction of this work is that the digital ("tokenized") assets can be exchanged simultaneously (e.g., asset for currency, also known as DvP, or currency for currency) using standardized logic (e.g., the Ethereum Request for Comment-20 or "ERC-20" fungible token standard or the ERC-721 non-fungible token standard) and without the need for reconciliation or a central authority.

As the range of tokenized assets has expanded and the reach of these instruments crosses regulatory boundaries, mechanisms to protect market participants while providing greater access have been demanded by regulatory authorities. Creating compliant digital assets in this landscape is difficult, as doing so requires coding for not only the properties of the underlying asset, but also the functions and constraints associated with transacting a digital token on a DLT. For assets that are classified as securities, the properties, functions, and constraints can be required by a plurality of regulations and laws in a number of jurisdictions across the globe. This means that each asset may require design, development, planning, and coding by one or more highly skilled persons with knowledge not only of how DLT works, but also the myriad of legal, regulatory and functional requirements and constraints. The process can be very expensive and consume a substantial amount of time.

The evolution of digital assets includes decentralized financial (DeFi) instruments. DeFi instruments are self-processing assets (i.e., assets that implement their own financial behaviors as processing logic in smart contracts). These behaviors include complex financial functions including lending, market making, and yield farming. As these behaviors have become more complex and sophisticated, there is a need to combine object behaviors, substitute aspects of implementations for specific market requirements, reuse regulatory and compliance logic, and continue to adapt behaviors to a rapidly changing ecosystem.

The value created by the automation of financial processes has resulted in a global explosion of interest by talented individuals seeking to participate in financial transformation. Unlocking the next wave of innovation on blockchain networks can be accomplished by enabling "low code" development patterns on decentralized networks.

"Low code" development platforms are also well known. According to Wikipedia:

A low-code development platform (LCDP) provides a development environment used to create application software through a graphical user interface instead of traditional hand-coded computer programming. A low-code platform may produce entirely operational applications, or require additional coding for specific situations. Low-code development platforms reduce the amount of traditional hand coding, enabling accelerated delivery of business applications. A common benefit is that a wider range of people can contribute to the application's development—not only those with coding skills. LCDPs can also lower the initial cost of setup, training, deployment and maintenance.

Low code environments require object configurability, predefined interfaces and schemas, and operation under centralized control models. With current technology, it is difficult, to adapt low code environments for use in decentralized platforms. This has made it difficult to develop sophisticated and interoperable applications on decentralized computing platforms because each new process or instrument requires new code development.

In traditional "Web 1.0" (relational) systems, data, and changes to data for objects are stored in relational table structures under centralized control. The right to access and to update or delete object data stored in relational tables is controlled through a database administrator, the application, or both. The data structure and the rights to data are locked into an application, based on roles and permissions defined by the application owner. The centralization of schema and rights limits the application's utility to the scope defined by the application owner and its enterprise. Interoperability with other systems is a challenge as the schema and permissions must be mediated with other systems resulting in exponential increases in complexity as the number of systems and contexts increases. In more modern "Web2.0" systems, permissions are developed socially (instead of centrally managed) while schema and functions on objects remain in closed systems. This allows collaboration on content but not on the behavior and functionality of systems. The disclosed implementations provide for the creation, instantiation, and use configurable distributed ledger objects without a centralized data administrator or a pre-defined application tier.

A framework is needed to accelerate development on decentralized networks by reusing existing proven logic and focusing only on the creation of new desired behaviors; enabling efficient, predictable interaction between objects; incentivizing the sharing of innovative new behaviors through direct financial rewards for contributions that are used; and empowering innovators who do not write smart contract code to create new processes by connecting and combining existing logic.

In one embodiment, the invention is directed to a computer-implemented system and method to reduce the amount of resource and time investment for creating financial systems, enabling their accelerated delivery and allowing a wide range of people, who may not have traditional technology engineering and software coding skills, to contribute to a system's development. This is accomplished through a system and method that enables, in a decentralized computing environment, the configuration of digital asset templates from one or more pre-defined, extensible self-describing logic blocks that declare supported interfaces, properties, functions, events, dependencies, triggers, and requisite data in/outputs. The function and features of these configured templates can be extended by integration with future created logic blocks. Digital assets can be instantiated by creating a base object and assigning the object a template which infers it behaviors affected through the building blocks. The configurable templates of the present invention are an on-chain store of routing instructions to registered smart contract logic that implement the functions and events of a class of objects and data stores that maintain the state of each object in the class.

The present invention includes middleware to route functions and state change requests using the templates to affect the behaviors of the object. Furthermore, the middleware includes security measures for executing object functions and data.

In one embodiment, the invention is directed to a computer-implemented framework for implementing pluggable, pre-defined logic blocks. The logic blocks are both published to a DLT ledger and are implemented through a computer-implemented framework that provides a decentralized trusted control plane that links application code (in the form of smart contracts, for example) functions, events, and properties via editable and extensible class templates to create configurable object behavior. This framework records a list of defined interfaces published by authorized users creating consistent, reusable behaviors. It also performs orchestration and middleware tasks to route requests to internal and external logic while securing the interaction between objects and smart contracts, and also maintaining the security controls and accountability of the system, all within a decentralized network. Furthermore, the platform facilitates pluggable logic, which allows users of the platform to customize, combine, and modify smart contract logic (or code snippets). Additionally, this framework functions to prevent unauthorized execution and man in the middle attacks (i.e., logic that routes an authorized request to an unauthorized execution location). This computer-implemented system thereby enables composition and integration of desired functionality from preexisting code fragments without the need for a centralized database administrator or system architect normally responsible for the security posture of a system and eliminates the requirement for identity and access management systems that create walls between enterprises.

By leveraging the decentralized nature of distributed ledger technologies (accessibility by any party with a public/private key and no centralized data or application servers), the disclosure enables an ecosystem of user to develop and grow class templates, fueled by economic incentives for logic contributors. The class templates being the building blocks of a decentralized ecosystem where objects interact in a predictable, immutable manner but with no limit to the type of behaviors that can be modeled and automated. In this decentralized ecosystem, the end user can both contribute to and consume logic, templates, and other utility. The end user can be any authorized party with the means to operate a wallet, that is a public/private key on a distributed ledger.

The disclosed embodiments describe a series of linked registries on a distributed ledger that capture and manage the principal objects that enable configuration. A distributed ledger registry includes a smart contract that contains a table defining the structure of the principal object of the registry with each row being a unique instance of the object. For example, the smart contract LogicRegistry described below contains a table and its related data structures with each row of the table representing a registered logical element (i.e., a smart contract). The registry's smart contract contains logic to create, update, and delete an instance of an object, in addition to, the logic to utilize the registered objects. The various registries of the disclosed implementations are discussed in detail below.

An aspect of a disclosed embodiment is a method, and a computer system for accomplishing the method, for creating and managing configurable objects, the objects being executable on a decentralized computing network to affect asset behaviors. In one embodiment, the method comprises: specifying, using a creator wallet, a class, required object properties, wherein the class is defined by a class template expressed as a data structure specifying executable behaviors for the class, the behaviors including permissions, interfaces, functions, properties, events, errors, and/or dependencies assigned to the class, the class template being stored in a class template registry in the decentralized computing network, wherein the creator wallet includes an address on the decentralized computing network; instantiating a configurable object in the item registry, the object having a unique identifier, and a pointer to a class template that is configured to enable desired behaviors of the object; routing, by a trusted control plane, requests from authorized users of the configurable object to affect object behaviors, a trusted control plane that is a smart contract proxy that ensures the security and authenticity of routed requests, the routing using instructions in the data structure of the class template assigned to the object, the data structure including a map to registered smart contract logic that executes the object behaviors, the logic registered in a logic registry, the logic being in the form of smart contract code that is executable in the decentralized computing network; and executing, via registered smart contract logic the desired object behaviors on a distributed ledger network.

Disclosed embodiments include; a data structure (e.g., in the form of a class template) for capturing the interfaces, functions, properties, events, errors, triggers, dependencies, user rights, and inter-class relationships to enable the creation of end user created classes and affect the behavior of end user created objects; a trusted control plane, implemented as smart contract middleware, leveraging the class template to route state change requests to pre-deployed smart contracts that affect desired class behaviors; a pluggable framework to allow the contribution, certification, and configuration of self-describing logic to enable contributors to safely add and configure new behaviors to the ecosystem; an orchestration layer that detects, records, and affects triggered state changes published by registered logic and activated on the instantiation of an object that incorporates the logics behavior; an authorization structure to provide a flexible system for rights management for user created objects; a session management and security model to secure the system from unintended or malicious activity; a technical mechanism to link objects to wallets to enable interaction between objects and provide accountability for state changes that may involve complex or recursive object structures; a certification process to vet and characterize contributed behaviors; registries that facilitate end user creation and management of objects, classes, logic, interfaces, and object identifiers; and an economics model that incentivizes contribution to the ecosystem's utility, security, and functionality.

In one embodiment, item registry 102 is operable to create configurable distributed ledger objects. Configurability, in the context of configurable distributed ledger objects (or "configurable objects") means the ability to generate classes of objects that are operable to exhibit user defined properties and functions without having to write new computer code. In order for the configurability to be operable on a distributed ledger and/or DLT where immutable smart contracts are the primary driver, a number of innovations are necessary, such as, a data structure for capturing interfaces, functions, properties, events, triggers, dependencies, and user rights, inter-class relationships that are operable to affect object behaviors, a proxy model to route state changes and requests to pre-deploy smart contracts, a flexible permission structure for rights management, a session management and security module to prevent unintended or malicious activity, a mechanism to link wallets to objects and enable transactions between objects, and registries to facilitate end user creation, modification, and management of objects, classes, smart contract logic, and interfaces. The present invention provides such innovations.

Referring now to the drawings in general, the illustrations are for the purpose of describing one or more preferred embodiments of the invention and are not intended to limit the invention thereto.

FIG. 1 illustrates a schematic of a computer system of a decentralized trusted control plane (D-TCP) 100 according to one embodiment of the present invention. Throughout this disclosure the D-TCP 100 may be referenced as the platform and/or system of the present invention. In one embodiment, D-TCP 100 includes an Item Registry 102, a Class Registry 104, a Logic Registry 106, an Interface Registry 108, a Wallet Registry 120, a plurality of Item Wallets 109 in, a Token Factory 110, a Compliance Oracle 112, an Orchestrator 114, a Ledger Scan 116, and an Identifier Registry 118. The D-TCP 100 is operable to enable users of the platform to post and/or publish code to the plurality of registries. In one embodiment, the plurality of registries are libraries that are operable to continually receive new entries (preferably logic, smart contracts, classes, etc.), display the entries to users of the platform, enable users to pick and choose entries they would like to use or interact with, and display information about the entries. In one embodiment, the elements of the D-TCP 100 are in the form of "modules" that include software executing on processors of computer hardware coupled to other modules in a manner that achieves the functions described below. In one embodiment, the modules include code, processors, memory, and appropriate network connections. In one embodiment, each module includes a corresponding smart contract that is operable to execute the functions of the module. In one embodiment, the corresponding smart contracts are operable to execute functions and/or transfers on a distributed network. Throughout the present disclosure the computer module will be referred as its name, including a space, followed by indicia corresponding to FIG. 1 and the smart contract associated with the computer module will be referred to as its name, excluding a space and not followed by indicia. An example of this nomenclature is as follows, Item Registry 102 as the computer module and ItemRegistry as the smart contract. For the sake of clarity, and in reference to FIG. 1 a brief summary of the computer module and associated smart contract will follow its introduction. However, one of ordinary skill in the art will appreciate that the summary is for the purposes of establishing clarity of purpose and intention and should not be construed as a limiting description of the full capability of each component.

In one embodiment, Item Registry 102 is a module that includes a smart contract, ItemRegistry. The Item Registry 102 records all created objects in the D-TCP 100 (sometimes referred to as the "system" or "platform"). ItemRegistry includes smart contract code that enables the creation and management of objects in the system. In one embodiment, ItemRegistry is operable to decentralize the deployment of items by recording items on a DLT. An object in the Item Registry 102 is a pointer (a unique reference) that represents a unique instance of a virtual or physical object. An object in the platform has a creator (an individual or user of the platform associated with a wallet that initiates the creation of the object through the D-TCP 100), a creation date, and a pointer to a class in the Class Registry 104. In one embodiment, objects include properties of their class and/or additional properties not assigned from the class, which are stored in the Attribute Registry 112a. ItemRegisry is the central component of asset composability and house the proxy logic, session manager, and permission enforcement for the system. In one embodiment, objects derive ownership transfer behaviors from class templates. In one embodiment, object ownership transfer behaviors are consistent with the ERC-721 or other similar Ethereum or non-Ethereum based specification for non-fungible tokens (NFT). This enables ownership transfer of objects in the ItemRegistry. Most objects on the platform exhibit NFT transferability.

In one embodiment, ItemRegistry is operable to create and manage objects (sometimes referred to as items). In one embodiment, an object is a unique instance of a class (i.e., a collection of items). In one embodiment, the object exhibits the behaviors (i.e., the interfaces, functions, properties, events, errors, triggers, dependencies, user rights, inter-class relationships, and/or other characteristics of the class) of the class. In one embodiment, an object is assigned to a class template in the class registry 104 to exhibit the reusable behaviors of that class. In one embodiment, the Item Registry 102 is a collection of items from many classes, as defined in the Class Registry 104.

In one embodiment, an object represents a unique token and the ownership rights of the unique token, in the D-TCP 100. In one embodiment, the unique token represents an asset and is an NFT. In one embodiment, an object represents a fungible asset, such as securities or other assets that are interchangeable. In one embodiment, objects include a mechanism and/or a behavior to transfer ownership. In one embodiment, objects exhibit the behaviors of the underlying asset. In one embodiment relating to financial use cases or any use case where the object represents something of value, objects exhibit class behavior that extend the basic class, enabling behaviors for objects that represent value within the asset class.

In one embodiment, the ItemRegistry smart contract code includes trusted control plane logic, session management, and permission enforcement for the D-TCP 100, which together enable the composability/configurability of objects, as described in the present application.

In one embodiment, an object registered in item registry 102 is non-fungible (i.e., a unique and distinct implementation of the behaviors of a class). In one embodiment, each object has a unique identifier, (the itemId) that together with the smart contract address of ItemRegistry, uniquely identifies the object globally and immutably. In one embodiment, the object is assigned standardized behaviors of ownership and transfer.

In one embodiment, the objects in ItemRegistry represent a unique instance of a digital representation of a physical item. In one embodiment, the objects in ItemRegistry represent artwork, real estate, vehicles, and/or other physical things. In one embodiment, an object provides an accurate and immutable representation of ownership of the asset (digital, virtual, and/or physical) it represents and includes a unique reference (an itemId). Advantageously, this disclosure extends the practice of object representation to enable user configurable objects, where the itemId is a pointer in the globally distributed virtual machine of a distributed ledger where behaviors can be configured and affected securely and efficiently.

In one embodiment, an object's behavior is implemented in a configurable class within the ItemRegistry. In one embodiment, configurable classes include financial assets and/or processes. In one embodiment, configurable classes include funds, companies, futures, forwards, swaps, options, and/or other derivatives. In one embodiment, configurable classes include loans, mortgages, bonds, repos, and/or other credit instruments. In one embodiment, configurable classes include collateral and/or other credit enhancements. In one embodiment, configurable classes include leases, insurance policies, and other financial instruments or processes.

In one embodiment, Item Registry 102 is operable to create configurable distributed ledger objects for virtual items. In one embodiment, the virtual items include, data, documents, cloud or other computing resources, and items that are viewed or used in a virtual environment such as an online game or a "metaverse" (i.e., a virtual-reality space in which users can interact with a computer-generated environment and other users). In one embodiment, the virtual items are represented by fungible and/or non-fungible tokens.

In one embodiment, the objects in the Item Registry 102 are associated with a creator wallet (one of wallets 109 that was used to initiate the creation of the object in the manner described below), a creation date, and/or a pointer to a class in class registry 104 affecting the behaviors of the object.

In one embodiment, Class Registry 104 is a module and includes the smart contract ClassRegistry. In one embodiment, ClassRegistry is operable to decentralize the deployment of class by recording classes on a DLT. In one embodiment, each class template registered in the class registry 104 is a data structure defining the behaviors (properties, functions, etc.) of objects associated within the class. The Class Registry 104 records all user defined classes (i.e., templates that define the behaviors of objects in the class). The Class Registry 104 enables users to create and extend classes without needing to generate new code, define behaviors of instantiated objects by configuring data schema and data rights, link and assign access rights, inherit behaviors from other classes, define triggers, and other functions for class configuration. Furthermore, the class templates of Class Registry 104 can be self-referential. Specifically, a self-referential class is a class that defines its own class structure. In one embodiment, individual instances of user defined classes are stored in the Item Registry 102. In one embodiment, class structures are extended by inheriting behaviors from other class templates. In one embodiment, the Class Registry 104 enables class extension by providing a list of class templates that include pluggable logic.

Traditionally, properties of objects associated within a class are set at the class level, with permission controls defined by the class owner. However, in one embodiment of the present invention, objects include additional properties not defined by the associated class and created by the object owner or another party ("$3^{rd}$ party"). In this embodiment, these $3^{rd}$ party properties are created and set by any authorized user (i.e., not exclusively the class owner). The result of such an embodiment is more akin to a tagging model than a formal data model. As a nonlimiting example, a party assigns a property, such as a Rating, to a bond object, where the rating is assigned by the party independent of the object ownership structure and class defined properties. In this example, such additional properties are stored as data structures in attribute registry 112a of the compliance oracle 112, both of which are described below.

In one embodiment, the Logic Registry 106 is a module and includes the smart contract LogicRegistry. The Logic Registry 106 records all published smart contracts, and their associated logic, functions, and behaviors, of the platform (often collectedly referred to as "logic"). The D-TCP 100 enables users to publish new smart contracts and the Logic Registry 106 records all of the logic of any new smart contract published to the platform to extend the available smart contract logic for the entire platform. In one embodiment, LogicRegistry is operable to decentralize the deployment of logic by recording logic on a DLT. In one embodiment, published logic "certified" meaning that is has been verified by a certifying entity of the platform (preferably an administrator of the platform). In one embodiment, certified logic indicates that the published logic has been reviewed and verified to ensure that it is of a high quality for use (i.e., secure, functional, configurable, etc.). In one embodiment, published logic is certified by authorized certification agents, who can be individuals given the authority to verify the authenticity and operability of published logic. In one embodiment, certified logic is published in a standardized format to enable the functions, interfaces, events, triggers, and dependences to include interaction points for interoperability with other published logic. This enables certified logic to be efficiently configured and combined by users of the platform, who can simply reference the Logic Registry 106 rather than having to write new code. Additionally, the Logic Registry 106 stores details associated with published smart contracts, such as, the smart contract's publisher, publication date, certification status while providing an interface for users to easily view classes referencing the published smart contract logic. Advantageously, the Logic Registry 106 serves as a central library of useable logic to enable the low-code development of the platform. In one embodiment, the Logic Registry 106 includes a list of useable logic for object configuration.

In one embodiment, smart contract publishers charge for the use of logic in their smart contracts. The Logic Registry 106 is operable to assign a price to the use of published logic so that when a user instantiates an object that utilizes published logic subject to a price, the logic publishes gets paid through a fee associated with the logic's use. This creates an economic incentive for developers to extend the supply of available logic for reusable classes. In one embodiment, the published logic must be certified prior to being subject to a price. In one embodiment, the logic creator is paid through a transfer of value to a wallet associated with the registered logic publisher and/or smart contract publisher. Additionally, this creates a channel where code is posted to the Logic Registry 106, certified by a project owner, and monetized through use by users of the platform who desire to use the code's functionality in their own projects. This results in a decentralized ecosystem, that is governed by participants in the ecosystem, that implements the characteristics of Apple's AppStore™.

In one embodiment, the Class Registry 104 is operable to create and/or extend existing classes without the need for generating new code. In one embodiment, this is accomplished by populating a class template to the desired class behavior implemented in the LogicRegistry, and assigning associated properties, data rights, functions, and/or execution rights to the logic of LogicRegistry. In one embodiment, the class template defines triggers for event processing, along with other attributes in a manner described in the present application.

In one embodiment, a class template is updated to extend and enhance the behaviors of a class and/or inherit behaviors from previously defined classes in ClassRegistry. Advantageously, by updating and/or inheriting a class template, the behaviors of an existing class are reusable by changing only the differences from the earlier implementation, allowing for efficient reuse of logic and minimal effort to adapt to changing requirements. The update and inheritance process will be described in more detail later.

In one embodiment, the class registry 104 includes an ownership transfer behavior for class templates consistent with the ERC-721 specification (or equivalent on non-Ethereum ledgers) and enables class developers to monetize the value of configured classes and/or transfer this value to others.

In one embodiment, the class template data structure is self-referential. In one embodiment, a class template is created in the ClassRegistry and defines the behaviors of class objects. In one embodiment, instances of a class template (i.e., a user defined class) are recorded and managed in the Item Registry 102 and linked to the desired behaviors defined in the ClassRegistry. Advantageously, the ClassRegistry is operable to define its own upgradable configurable behavior supporting multiple implementations of the registry itself within the D-TCP 100. Similar to the Logic Registry 106, the Class Registry 104 serves as a central library of classes and classes templates for users of the platform to choose from when creating their own smart contracts, configurable objects, or even other classes.

In one embodiment, LogicRegistry enables the registration and management of published smart contracts for use in class configuration within the D-TCP 100. In one embodiment, Logic registry 106 stores ownership structure, certification status, and/or usage pricing data for published logic. In one embodiment, Logic registry 106 is operable to manage versioning of smart contracts and reuse data between versioned smart contracts using the External Data pattern described in detail within the disclosure.

Advantageously, Logic Registry 106 is operable to provide "Pluggable Logic" (i.e., replacing component of logic for other components without interfering with the remaining logic). Advantageously, Logic registry 106 enables smart contract developers to deploy and register new behaviors for configuration in the class registry and instantiation by user configured objects. Pluggable logic is also important for enabling a low-code development platform as the logic elements of the Logic Registry 106 are pre-configured by the D-TCP 100 to allow its code to be "plugged in" to other code elements. More specifically, pluggable logic means a user of the platform is able to customize code functionality by implementing and/or replacing code functionality for other functions.

Advantageously, by scanning the Logic Registry 106 for references to third party logic and contracts, a logic certifier is able to manually or automatically create restrictions on published logic and enforce such restrictions at the time of certification. Advantageously, by scanning the Logic Registry 106 in this way routing of requests to external logic or data are prevented to preclude man in the middle attacks from published logic.

Advantageously, self-describing smart contracts are efficiently configured and combined by class designers who, reference smart contracts stored in Logic Registry 106 rather than having to write new code. In one embodiment, Logic registry 106 is operable to store details about the smart contract's publisher (or publisher of logic to the smart contract). In one embodiment, the Logic registry 106 is operable to store the publication date and certification status of the published smart contracts and provide interfaces that enable users to view classes which reference published logic.

In one embodiment, Interface Registry 108 is a module and includes smart contract InterfaceRegistry. The Interface Registry 108 serves as a repository of interfaces for smart contracts published to the platform and enhances the platform's interoperability. An interface is a syntactical format for all interactions with published logic. An interface groups functions, properties, events, and errors that are expected of the logic's implementation. The interfaces defines the 'what' part of the syntactical format and the implementing logic defines the 'how' part of the syntactical format. In one embodiment, an interface published to the Interface Registry 108 is a smart contract interface, which provides a summary of the smart contract's functions to assist in building upon its functions. In one embodiment, InterfaceRegistry enables the registration and management of published interface specifications. An interface specification is computer code that defines the format for interaction with smart contract properties, functions, events, errors, and dependencies without an explicit implementation of the behavior. An interface specification displays a list of functions for a smart contract and the Interface registry 108 servers as a central location for those lists of functions.

Advantageously, interfaces are used to enhance interoperability through substitutability, a concept known in computer science as polymorphism. Polymorphism is an important aspect to enable scalability of an ecosystem of dissimilar but related objects by enabling a single implementation of logic that acts on common behaviors of dissimilar classes of objects. In one embodiment, by implementing interfaces in this way, classes are operable to substitute one behavior for another without interfering with the remaining properties of the smart contract. As a nonlimiting example, logic that instantiates the behavior of a bond may be very different than logic than instantiated the behavior of a mortgage, but when implementing logic that operates on the interest rate of an object, a common interface permits the operation on these dissimilar objects without coding for each class.

In one embodiment, InterfaceRegistry is operable to decentralize the deployment of object interfaces by recording object interfaces on a DLT. Advantageously, InterfaceRegistry enables an ecosystem for consolidating useful patterns of object interfaces without the need for central control of standards. Advantageously, Interface registry 108 manages the scale and complexity of pluggable logic and user defined classes. In one embodiment, Interface registry 108 permits user defined interfaces. In one embodiment, Interface registry 108 is operable to provide a mechanism for end users to publish, register, and describe useful object behaviors (functions, properties, etc) that are present across one or more classes in the Interface Registry 108. In one embodiment, Interface registry 108 creates the conditions by which common patterns can emerge though sharing of useful interfaces. In one embodiment, interface registry 108 facilitates the development of automated integration tests (e.g., tests that verify the proper behavior of register logic).

In one embodiment, InterfaceRegistry is operable to promote interoperability between logical elements of objects. Advantageously, InterfaceRegistry is operable to facilitate the configuration of complex object behaviors in a networking ecosystem while maintaining ease of use and minimal to zero additional coding. In one embodiment, InterfaceRegistry is operable to enable elements to work with a wide range of objects that, while having dissimilar implementations, exhibit similar characteristics with respect to certain behaviors. As a nonlimiting example, bonds, derivatives, and equities are dissimilar in implementation but all exhibit a price property. InterfaceRegistry is operable to enable developers to use this similarity to perform price operations on instances of each class. Advantageously, through the use of Interface Registry 108, a developer is able to plug in new implementations of a service to an object without having to modify dependent code (e.g., upgrading to an oracle that provides a more accurate Euro to United States Dollar (EUR to USD) conversion rate at a particular point in time).

In one embodiment, Wallet Registry 120 is a module and includes a smart contract, ItemWallet (or "iContractWallet" as shown in FIG. 1). In one embodiment, Wallet Registry 120 includes a plurality of digital wallets 109. ItemWallet enables a plurality of digital wallets 109 to initiate transactions within the platform. Each wallet 109 is assigned an item identifier to represent its ownership structure within the platform. Advantageously, Wallet Registry 120 enables a digital wallet 109 to be assigned as an object (referred to as an item wallet) that is operable to conduct transaction on a DLT in the same way as traditional digital wallets (i.e., through a public and private key address on a DLT). In one embodiment, an item wallet can only be operated under a permission structured enforced by the Item Registry 102 for a specific object instance (by default, the creator of the object). By implementing item wallets in this way, the platform enables complex interactions between objects, users, digital wallets, and other objects. For example, the Wallet Registry 120 enables an object to own one or more objects of the same or different class. Additionally, the object may implement logic to buy or sell an object it owns, or receive an object owned by another object.

In one embodiment, ItemWallet is operable to assign wallets 109 (unique address on a DLT system that initiate transactions on behalf of an individuals or "initiator") to an object in the item registry 102. In one embodiment, wallets 109 assigned to objects on the item registry 102 are referred to as "Item wallets or Item wallet 109." In one embodiment, ItemWallet is operable to implement the objects associated with wallets 109 to include ownership structures that are further operable to enable and affect wallet operations. Advantageously, this embodiment enables an object to be associated with (i.e., "own") a wallet to conduct transactions (i.e., receive or send value and/or cause a state change on the DLT system) in a same or similar way to traditional cryptographic wallets (i.e., public/private key operated addresses). In one embodiment, Item wallets 109 are exclusively operated under the permission structure enforced by Item Registry 102 for the particular object instance (by default, the creator of the object). In one embodiment, assignment of an item wallet 109 enables complex interactions between objects and ecosystem participants and between objects and other objects. As a nonlimiting example, by assigning wallets in this way one object is operable to own one or more other objects of the same or different class. The object is able to implement logic to buy or sell the object it owns or to seize the objects owned by an object it controls. An example of code for implementing and item wallet proxy can be found in Appendix 3. The concept of "proxies" as used in connection with the disclosed embodiments is discussed in greater detail below.

In one embodiment, Token factory 110 is a module and includes a smart contract, TokenFactory. TokenFactory enables the issuance of fungible and non-fungible tokens. The Token Factory 110 is operable to interact with the Item Registry 102 to associate fungible and non-fungible tokens with objects to enable complex interactions within the platform. Additionally, this enables objects to be assigned one or more share classes to implement ownership structures.

In one embodiment, TokenFactory enables the issuance of fungible tokens, in accordance with the ERC-20 or equivalent standard. In one embodiment, fungible tokens represent fractional ownership of assets, preferably shares in a corporation. In one embodiment, objects in item registry 102 are operable to link one or more share classes, that is non-fungible tokens, to represent ownership rights over the asset represented by the nonfungible token. As a nonlimiting example, an object representing a company in item registry 102, is operable to assign two fungible tokens, representing its "common" and "preferred" share classes. Owners of the fungible tokens are able to exercise rights within the company object based on their ownership of the fungible tokens representing their share. By implementing certain logic of the company object, the object is operable to require the majority of preferred shareholders to approve a wallet transaction greater that $1,000,000 in value. Upon request for a transfer of $2,000,000, the implementing logic of the company object is operable to initiate a vote from the linked preferred shares, with the transaction processing only when a quorum of preferred token holder have signed an approving transaction. Token holder governance on distributed ledger networks is often called a Decentralized Autonomous Organization (DAO). The intent of this example is not to teach the mechanism of blockchain based voting, but rather to illustrate a novel mechanism for linking the ownership of fungible tokens to authority structures of objects (in some cases non-fungible tokens) in the smart contract ItemRegistry enabled by the D-TCP 100.

In one embodiment, Token Factory 110 is operable to produce fungible tokens that are operable to be linked to an object registered in the Item Registry 102. In one embodiment, the owner of the object initiates a request to link the target fungible token to the object representing the rights of a share class. In one embodiment, where the request is accepted by the issuing authority for the fungible token, the fungible token is linked to the object representing the rights of a share class, which transfers issuer authority to the object and assigns the share class rights to the behaviors of the object. In one embodiment, the linkage between an object and the fungible tokens are stored in the ItemToken table 210 shown in FIG. 3a.

In one embodiment, share classes are assigned to one or more rights individually, or collectively over the behaviors of the object. As a nonlimiting example, an object in item registry 102 is assigned to a company class template, where the object wallet (such as wallet 109) for the object represents the company's treasury function. If the company CEO (a right created by the object) attempts to initiate a money transfer greater than an assigned threshold, the class logic of the object requires concurrence of a majority of one or more share classes with votes assigned based on fungible token ownership based on the logic of the class template.

In one embodiment, Compliance Oracle 112 is a module and includes a smart contract, ComplianceOracle. In one embodiment, ComplianceOracle enables the creation and enforcement of complex policies (rulesets that are evaluated to determine if a proposed state change on the DLT, such as a transfer of fungible tokens, is authorized or in compliance with a specific ruleset). In one embodiment, Compliance Oracle 112 is operable to leverage policies. In one embodiment, leveraged policies are byte codes representing the rules to be enforced, which are published to an on-chain policy enforcement point (i.e., an "oracle"). In one embodiment, oracles are operable to determine the authorization of a proposed state change (i.e., whether the proposed state change is in compliance with a ruleset), by interpreting the policy and the data posted from external sources, including off-chain sources. In one embodiment, the present invention is operable to utilize the systems and methods disclosed in U.S. patent application Ser. No. 17/083,622, which is incorporated by reference in its entirety. In one embodiment, the Compliance Oracle 112 is consulted as part of the trusted control mechanism to verify the authorization of a proposed request in the trusted control mechanism.

In one embodiment, Compliance oracle 112 includes smart contracts AttributeRegistry 112a and AttestationRegistry 112b. These registries enable the creation of arbitrary properties or "attributes" that are assignable to classes and object instances and populated with values based on internal and external sources. The AttributeRegistry 112a provides a map (i.e., the means to access and read desired data) to any data source, either internal, external, or otherwise. Attributes are read only pointers to data. The Attestation Registry 112b is a data element that has been "attested to" by an authorized party. An attribute is operable to point to an attestation. An attribute is operable to be mapped to an external source, such as a price feed to obtain a price for an object. As a nonlimiting, clarifying example, an attribute is defined as a "qualification" in the AttributeRegistry 112a and assigned a key based on the wallet identifier. In the AttestationRegistry 112b, a "qualification" property is created. Following, an authorized attestor creates, through the D-TCP 100, an attestation for a specific wallet for the property qualification and assigns a value to it. This enables the means to access qualification data for the specific wallet. In one embodiment, the AttributeRegistry 112a is operable to enable the D-TCP 100 to communicate and interact with external 3rd-party data sources, including information found on the internet. In one embodiment, the AttributeRegistry 112a includes a pointer to an external data source, such that the D-TCP 100 is provided with the information (i.e., instructions) needed to access the external data source. In one embodiment, the AttributeRegistry 112a includes a point that includes instructions to access data on an on-chain data store or an oracle by include the address of the store, the property or field containing the data, and the type of key needed to reference the specific item. The Attestation Registry 112b enables flexible control of data rights for objects. In one embodiment, the AttestationRegistry 112b is operable to utilize the methods and systems described in U.S. patent application Ser. No. 17/677,657, which is incorporated herein by reference in its entirety. The AttributeRegistry 112a includes an object's or item's attributes mapped from external data stores and/or sources while the Attestation-Registry 112b includes a value assigned to an attribute of an identified object or item indicative of the validity of the attribute.

Advantageously, AttributeRegistry 112a and Attestation-Registry 112b are operable to provide a smart contract based general purpose data management layer with flexible controls to enable a decentralized coalition of participants. In one embodiment, AttributeRegistry 112a and Attestation-Registry 112b are operable to: define data schema; share data; manage access and authority to create, update, and delete decentralized data; track provenance and data staleness; and mediate between differing formats for data consumption. These smart contracts enable the creation of arbitrary properties (the terms "attributes" and "properties" are used interchangeably herein) that are assigned to classes or object instances and populated with values based on authorized internal or external sources. AttestationRegistry 112b enables robust and flexible control of data rights for objects and thus facilitates broad use of the framework. The AttributeRegistry 112a records the values assigned to attributes for specific objects. For example, a class template may include a property for interest rates that is pegged to the London Inter-Bank Offering Rate (LIBOR). A specific entity is authorized to publish LIBOR data. Advantageously, a smart contract registered in logic registry 106 may depend on the pegged interest rate value in its processing logic but does not want to (or need to) control the authority by which this value is set. AttributeRegistry 112a includes logic that enforces the right to publish this data. The class template links the property used by the smart contract to the corresponding attributes in AttributeRegistry 112a. As a new value is assigned in the AttestationRegistry 112b, the smart contract logic has access to this value. Property operations are described in more detail later in the disclosure.

In one embodiment, Permission structures used for authorization of transactions of objects in the Item Registry 102 includes the methods and systems described in U.S. patent application Ser. No. 17/332,375 and additionally include: permissions based on assigned roles, memberships, or other corporate structures; workflow based (multiparty configurable human and/or machine sequences) authorizations; and decentralized shareholder voting patterns (DAO). A detailed description of these advanced permission structures is not repeated herein. However, it will be apparent to one of ordinary skill in the art that such permission structures may be used by the class designer or object owner in place of the basic authorization structures expressly described herein.

In one embodiment, Orchestrator 114 is a module and includes a set of on-chain (on the DLT platform), a set of off-chain (on a centralized platform and/or different DLT platform), and/or a hybrid set of on-chain and off-chain components to register triggers for specific objects and execute state changes (e.g., transactions) when triggers are fired. A trigger is a mechanism that includes code to detect an event initiated internally or externally with an assigned action to take when the event is detected. In one embodiment, triggers are used feed log files. In one embodiment, once an event is detected, the trigger affects a state on the DLT based on a task assigned by the trigger through at least one smart contract. As a nonlimiting example, a loan object has a trigger to update the loan's principal and interest on the first day of each month. On initiation, the loan registers the event in an on-chain data store. The registration of a new event is detected by an off-chain listener which queues up an action for execution when the event associated with the trigger is detected (i.e., when the first of the month occurs in this example). The Orchestrator 114 monitors the list of assigned triggers, and in this case takes the assigned action when an off-chain calendar source detects the first day of each month in a known manner.

In one embodiment, Ledger scan 116 is an off-chain stream processing engine that detects the activity of the smart contracts in the D-TCP 100 and/or DLT and records the activity for scalable data-mining, reporting, and user interaction. In one embodiment, the Ledger scan 116 is implemented as a module and includes the smart contract LedgerScan. As a nonlimiting example, if millions of objects have been created by Item Registry 102, it takes significant processing power to filter the list of objects by class, properties, or other parameters. Advantageously, Ledger scan 116 is operable to make user interaction with the elements of the system practical and scalable by indexing object data and presenting the indexed data in an efficient format. In one embodiment, the Ledger scan 116 is operable to record smart contract activity in a way known by one of ordinary skill in the art.

In one embodiment, Identifier Registry 118 is a module and includes smart contract, IdentifierRegistry. The Identifier Registry 118 enables the assignment of a plurality of external unique identifies to items and/or objects in the Item Registry 102. In one embodiment, class templates of the Class Registry 108 include a list of valid external identifier types and include formatting data for the extern identifiers. In one embodiment, objects of the platform are assigned a plurality of external identifiers to aid in mapping the objects to external systems. In one embodiment, IdentifierRegistry is operable to create and manage mappings of external unique identifiers to Item Registry 102 objects by linking the external identifier and identifier type to the object's itemId. As a nonlimiting example, an object of the Company class have many unique identifiers (LEI, DUNS number, EIN (tax ID), CUSIP, ISIN, and more). Providing a registry to map these external system references to unique objects in Item Registry 102 simplifies indexing, discovery, and integration of objects with external systems.

Figure 2:
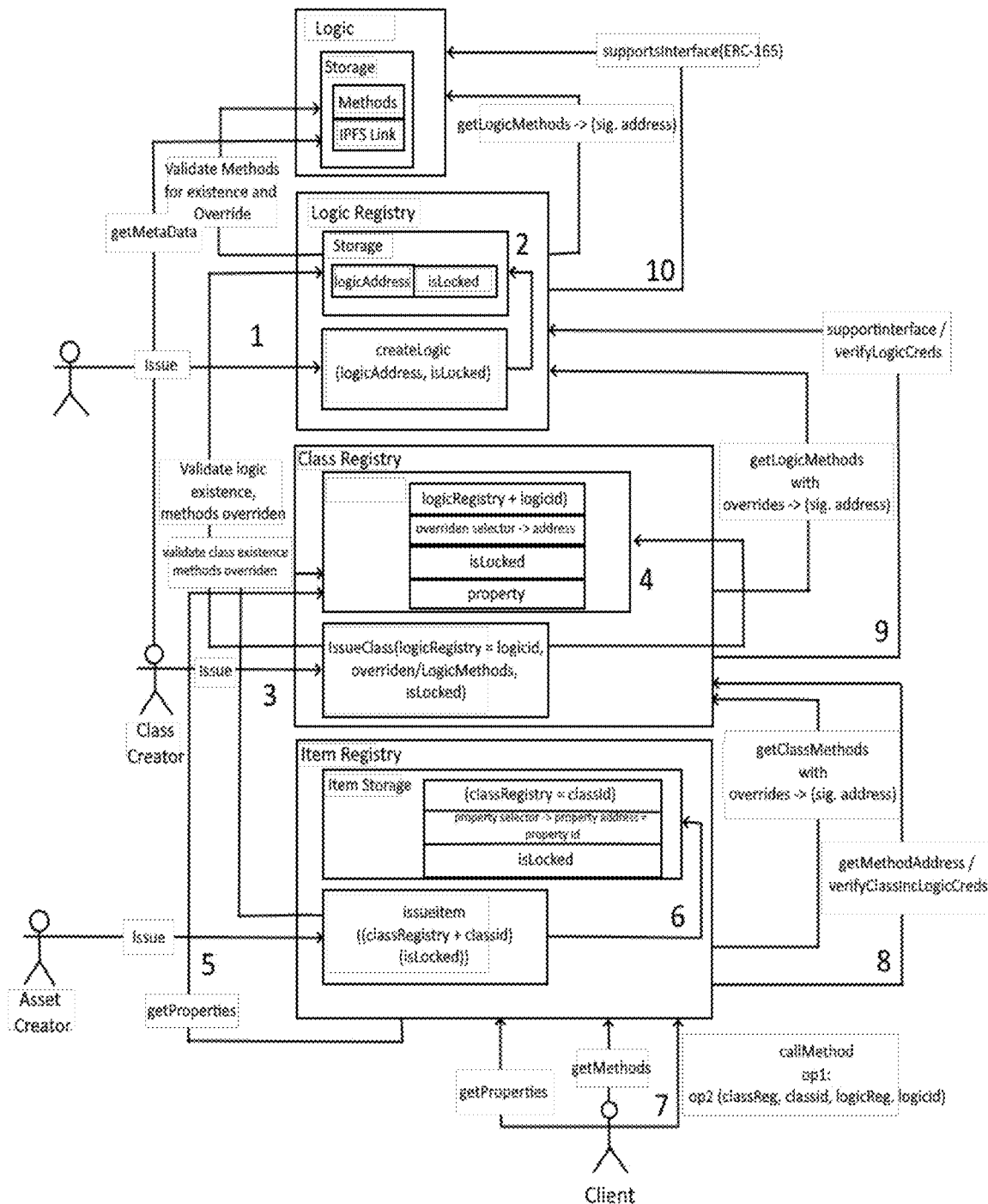
FIG. 2 illustrates a summary of the interactions between the registries of the D-TCP 100 for object creation according to one embodiment of the present invention.

FIG. 2 illustrates a summary of the interactions between the registries of the D-TCP 100 for object creation according to one embodiment of the present invention. FIG. 2 further illustrates the basic steps for creating a loan object as a nonlimiting example of the internal functionality of the registries of the D-TCP 100 for object creation. In one embodiment, the D-TCP 100 includes a plurality of registries, a logic registry 106, a class registry 104, and an interface registry 102. In the following description of FIG. 2 a representative example of a single loan smart contract is described. However, one of ordinary skill in the art will appreciate that the system of the present invention is operable to utilize any type of smart contract. At step 1, a smart contract that implements loan behaviors is registered to the D-TCP 100. In the preferred embodiment, an authorized user registers the loan smart contract. At step 2, the loan smart contract is stored and/or registered in the logic registry 106. At step 3, a class template is created in the Class Registry 104 that references the registered logic (of the loan smart contract), which enables routing of requests from objects implementing the class template to the designated logic for execution. In one embodiment, the D-TCP 100 enables an authorized user to create a class template referencing registered logic. At step 4, the class template is stored in the Class Registry 104. At step 5, an item is issued assigning the loan class to the object. In one embodiment, an authorized user (e.g., a lender) issues a new item assigning the loan class to the object. At step 6, the item is stored in the Item Registry 102. At step 7, a request for the loan balance (e.g., GetLoanBalance) is published to the platform. In one embodiment, an authorized user (e.g., the loan recipient) publishes the request. At step 8, the Item Registry 102 is operable to determine the authorization for the request (e.g., whether the request is coming from an authorized user, within an authorized session, or otherwise coming from the D-TCP 100 rather than some outside source). If authorized, the Item Registry 102 is operable to make a request to the Class Registry 104 to determine a path to the logic to execute the request. At step 9, the Class Registry 104 is operable to make a request to the logic registry 106 to verify the existence of the function (e.g., GetLoanBalance) within the logic. At step 10, the Logic Registry 106 is operable to make a request to the registered logic to obtain the routing information for the requested function. In one embodiment, if verified, the signature is cached at the item registry 102 to accelerate future requests, a session is initiated, and the request is routed to the registered smart contract for execution. Many of the specific interactions are covered in detail in descriptions of each element. This illustration provides a non-exhaustive summary of these interactions for reference. The specific nature of all interactions can be ascertained from the present disclosure.

Figure 3A:
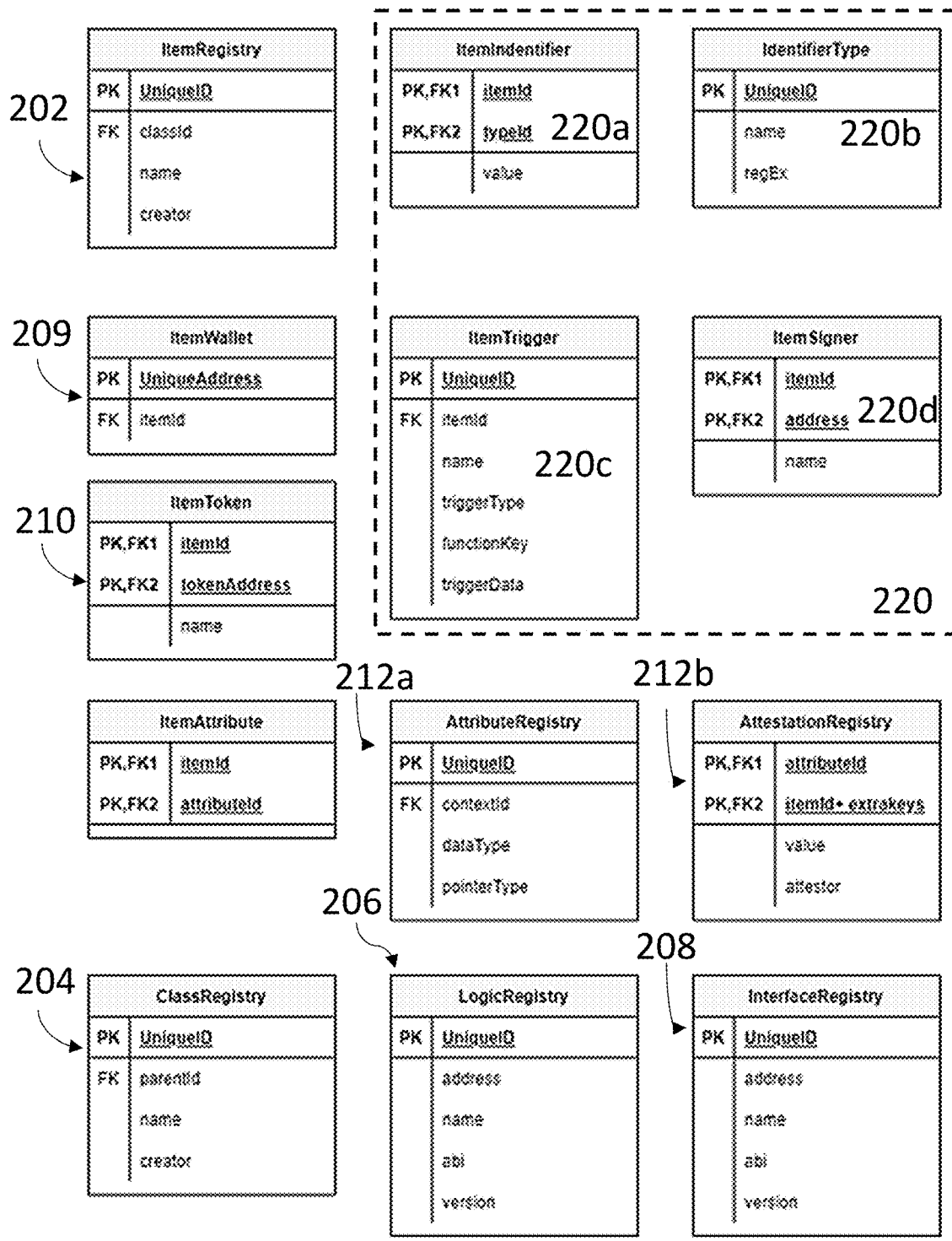
FIG. 3a illustrates a core registry data structure according to one embodiment of the present invention.

FIG. 3a illustrates a core registry data structure according to one embodiment of the present invention. In one embodiment, the plurality of registries of the D-TCP 100 include the data structures of FIG. 3a. In one embodiment, the plurality of registries utilizes the data structures of FIGS. 3a-3c to form a standardized data structure to facilitate communication between registries. In one embodiment, the middleware utilizes the standardized data structures of FIGS. 3a-3c, including the UniqueIDs in order to facilitate its functions. FIG. 3a uses standard database nomenclature indication; "PK" for a primary key in a table and "FK" for a foreign key in a table, the foreign key is a primary key in a different table. In one embodiment, the core registry data structure of FIG. 3a includes Item Registry 102 data fields 202, Item Wallet 109 data fields 209, Item Token data fields 210 that contain the linkage between Item Registry 102 objects and fungible tokens, Attributeregistry 112a data fields 212a that stores the linkage between objects and user assigned properties in the AttestationRegistry 112a, Class data fields 204 (additional data schema for a class template described later), Logic Registry data fields 206 (additional logic registry data schema described later), Attestation Registry data fields 212, and Interface registry data fields 208. Other data structures supporting the Identifier Registry 118 and Orchestrator 114 functions are shown at 220, which are discussed in more detail below.

Figure 3C:
FIG. 3c illustrates a simplified example of a data structure for logic in the logic registry according to one embodiment of the present invention.

In one embodiment, the D-TCP 100 includes a mechanism to link an instance of an object to a class (i.e., a set of behaviors that define the object) through the use of the uniqueIDs of FIGS. 3a-3c. In one embodiment, to create an object that implements a class behavior, an authorized user signs, pays associated fees, and publishes a IssueItem transaction to the ItemRegistry on the distributed ledger providing the object name, class template identifier and other data required to initialize an object of the class. See Appendix 4 for Item Registry Issuing Interface for a smart contract encoded implementation of Item Registry object creation logic. This logic adds a record to the Item Registry 102 that includes the unique identifier, itemId for the new object, the class identifier defining the behaviors of the new object, and other data as desired. In one embodiment, the Item Registry 102 supports basic functions, such as, GetItems (pulled from off-chain data store, Ledger Scan 116, as described below) which returns a filtered list of all objects meeting the filter criteria and returns class data and other data for the object identified by the request's itemId. Advantageously, the interaction between Item Registry 102 and Ledger Scan 116 enable a search function for items in the Item Registry 102.

In one embodiment, ItemRegistry includes, and/or has access to, an on-chain table with each row recording an object created in the framework. In one embodiment, each object has a unique identifier assigned at creation and a class identifier which defines the behaviors of the object. In one embodiment, a CreateItem function of smart contract ItemRegistry is operable to create new objects and assign behaviors to the objects. In one embodiment, only authorized users can use the CreateItem function. An example of implementation code of Item Registry 102 for creating and managing objects can be found in Appendix 4.

In one embodiment the ItemRegistry includes functions associated with the items it has registered. In one embodiment, the ItemRegistry includes the following functions:

GetItems(filter parameters) operable to return a list of all created items or items that meet specified search criteria. This list is often drawn from an off-chain data store for performance reasons;

GetClass(itemId) operable to return the class associated with a specific object;

GetWallet(itemId) operable to return the wallet associated with the identified object;

GetProperties(itemId) operable to return a list of properties and assigned values for the identifies object; and similar functions to operate the wallet (i.e., to send value or see a list of transactions for the wallet). A code sample for the interface for recovering an item's metadata, functions, and properties is shown below. An item's metadata, functions, and properties are shown below.

```
contract ItemLogic {
constructor (address middleware, bytes32 IPFSLink){ }
interface IBasicLogic {4
/**
*@notice Returns IPFS link
*/
function getMetaData ( ) external view returns (bytes32);
/**
    *@notice Get for logic methods and properties
    *@retrn methods List of the logic methods
    *@retrn properties List of the logic properties
    */
function getLogicMethodAndProperties ( )
external
view
returns (
    bytes4[ ] memory method,
    bytes32[ ] memory properties
);
```

```
/**
*@notice Returns protected methods list
*/
function protectedMethodsList ( ) external pure returns
    (bytes[ ] memory methods);
}
```

Other samples of code for implementation of Item Registry 102 basic operations can be found in Appendix 5.

Data mediation between systems is often challenging because different systems may use different keys to uniquely identify an object in a system. For example, US Financial Systems refer to registered investment objects by a Committee on Uniform Securities Identification Procedures (CUSIP) number. While this identifier type is uniform in the US, it is not recognized in international markets where the International Securities Identification Number (ISIN) is used to identify objects. A specific security may be referenced by one or both identifier types. As US Computer Systems transact with European Systems, identifiers need to be reconciled to ensure proper interaction. As the number of objects and identification systems increases, this mediation can result in very difficult reconciliation challenges for financial ecosystems. The problem is particularly acute when trying to uniquely identify companies globally, as dozens of identifier standards are used.

In one embodiment, Identifier registry 118 is implemented as a module and includes smart contract IdentifierRegisty, which is designed to address this challenge. In one embodiment, the ItemRegistry creates the itemId, which is an immutable, globally unique, accessible, and composable identifier for any object. Identifier registry 118 operable to create an immutable mapping between an external identifier and the itemId, simplifying reconciliation within the ecosystem and with external systems.

As shown in FIG. 3a at 220b, identifier registry 118 enables creation of IdentifierType, which is a unique external reference format operable to map objects in external systems. CUSIP and ISIN are examples of identifiers for securities. GLEI, DUNS, EIN and other types are used to identify corporate entities. In one embodiment, an IdentifierType includes a regular expression to ensure proper formatting of data. To map an external identifier to an itemId, a record is added to IdentifierRegistry 220a by an authorized user. Each combination of typeId and value must be globally unique. The IdentifierRegistry 220a is operable to map a plurality of identifiers to a single itemId providing the means to reconcile between external systems. In one embodiment, using the schema in FIG. 3a, IdentifierType is associated with one or more classes. The class owner or other authorized user may assign identifier types to the class to facilitate mapping with external systems and encourage indexing of data with the added IdentifierType.

FIG. 3b illustrates a Class Registry 104 data structure 250 for capturing class templates according to one embodiment of the present invention. In one embodiment, the class templates include routing instructions and class relationships relevant to the underlying class. In one embodiment, the Class Registry 104 data structure for capturing class templates is in the form of a table 250. In one embodiment, ClassRegistry includes and/or has access to an on-chain table with each row recording a class templated created in the D-TCP 100 platform. In one embodiment, the on-chain table is in the format illustrated in FIG. 3b. In one embodiment, a class template is a data structure that contains the name of a class, its owner, a wallet operated by the class, and/or linkages to implemented behaviors that include interfaces and functions, properties, events, errors, triggers, dependencies, and/or parent classes from which the class derives its behaviors. The function call GetClasses(filters) is operable to obtain a list of available classes that meets the filter criteria. The function call GetClass(classId) is operable to return specific data for the identified class. Similarly, GetProperties, GetFunctions, GetEvents, GetError, GetInterfaces, GetDependencies(classId): returns a list of the specified behaviors/attributes for the identified class. An example of code for implementing Basic Class functions is disclosed in Appendix 7.

In one embodiment, the D-TCP 100 is operable to enable users to create custom classes. In one embodiment, a new class is created by identifying an earlier class and inheriting the earlier class's behaviors. In one embodiment, the D-TCP 100 only allows an authorized person to create a new class. In one embodiment, a new class is created by adding additional properties, which are typed attributes that are assigned values for each object implementing the class behavior. In one embodiment, the typed attributes are strings, integers, Boolean logic, decimals, pointers, blobs, and/or other similar data inputs.

In one embodiment, a class is created by mapping one or more smart contracts that exhibit the desired behaviors from a list of available smart contract logic located in the logic registry 106 to a class template. The logic registry 106 includes an interface of selectable smart contract's functions, properties, events, errors, and/or dependencies. Selection of the desired functions, properties, events, errors, and/or dependencies includes them into the class. In one embodiment, any conflicts between functions, properties, behaviors, etc. during class creation are identified by the system, resolved by the system, identified by the class creator, and/or resolved by the class creator. As a nonlimiting example, upon selection of the desired smart contract behaviors, two smart contracts may expose a function with the same signature, the system is operable to notify the class creator of the same signature and provide the class creator with the option to select the preferred signature and create a record in the ClassFunctions table (as seen in FIG. 3b) to map the preference.

In one embodiment, smart contract properties are mapped via the class template. Each connected smart contract of the D-TCP 100 publishes the smart contract's properties with a unique propertyKey and property name associated with the property. As the smart contract properties from connected smart contracts are mapped, a record is entered in the ClassProperty table. The record links the smart contract property, referenced by the propertyKey, to a propertyId in the AttributeRegistry 112a. In one embodiment, property values are stored in the AttributeRegistry 112a.

In one embodiment, smart contract properties from different smart contracts are connected to allow communication between smart contracts through connected properties, which is accomplished by connecting multiple propertyKeys to the same AttributeRegistry 112a propertyId. In one embodiment, where multiple properetyKeys are mapped, each has the same data type. In one embodiment, the ClassProperty entry is marked as readOnly, resulting in the smart contract property not being able to be edit by, for example, another smart contract. In this embodiment, one or more smart contracts may edit the property value while other contracts that depend on the value may only read the value. As a nonlimiting example, one smart contract is able to set the interest rate property for a variable rate loan, while another smart contract can only read the property for loan processing. In one embodiment, each property and function of a smart contract in the class template is assigned a permission structure. On creation, all assignments of permissions for the class template are stored in the Class Registry 104. Thus, the class template defines the behaviors associated with the class.

In one embodiment, the class template stores triggers (illustrated in the "ClassTrigger" data table of FIG. 3*b*). A trigger provides instructions for how to respond to an event. In one embodiment, a trigger provides instructions for how to respond to an event based on time or activity. In one embodiment, the D-TCP 100 includes an Orchestrator 114, which is an off-chain element. In one embodiment, the orchestrator 114 is operable to detect triggers and take the desired action when the event (trigger) occurs. In one embodiment, the class template records dependencies published by the connected logic. In one embodiment, the Orchestrator 114 is operable to functionally communicate with the Class Registry 104 and interpret the data in the class data structures 250.

FIG. 3*c* illustrates a simplified example of a data structure for logic in the Logic Registry 106 according to one embodiment of the present invention. In one embodiment, the data structure for logic in the Logic Registry 106 includes a primary key with a uniqueID data entry, an address data entry, a name data entry, an ABI data entry, a version entry, a price entry, and/or other data fields. In one embodiment, Logic Registry 106 is operable to provide a means for developers to monetize certified code in an App Store model that is described in the tokenomics section below by referencing the price entry of the data structure for logic in the registry. FIG. 3*c* illustrates how a user of the platform contributing logic may assign a price for the use of the logic to draw value from its utility as described in the tokenomics section below.

Figure 4A:
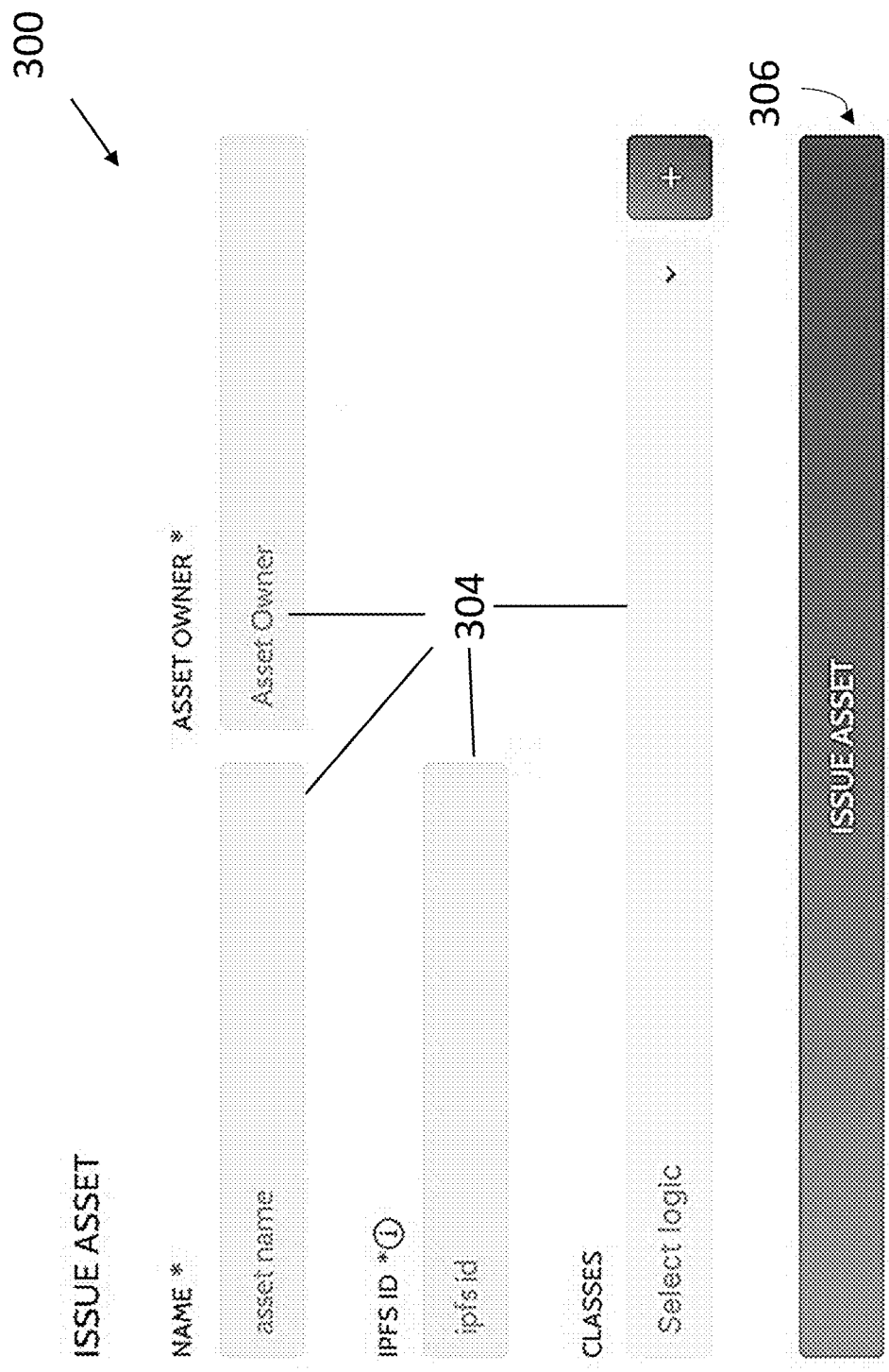
FIG. 4a illustrates a Graphical User Interface (GUI) for inputting data for object creation.

FIG. 4*a* illustrates a Graphical User Interface (GUI) for inputting data to for object creation 300. GUI 300 permits a user to provide a name, owner address, and a file ID at 304. The file ID points to an Application Binary Interface (ABI), which is a document that contains the names and types of the function signatured enabled by the class template in an easily parse-able format providing a translation between human-intended method calls and smart-contract functions. Class defined smart contract functions have strict conventions about how function signatures are optimized and often difficult for a human to decipher. Advantageously, the ABI maps from human readable forms to the precise names and types associated with the functions. In one embodiment, the asset is created by selecting button 306, which is operable to formulate and request signing of a transaction posted to the class registry 104 and results in the creation of the class.

Figure 4B:
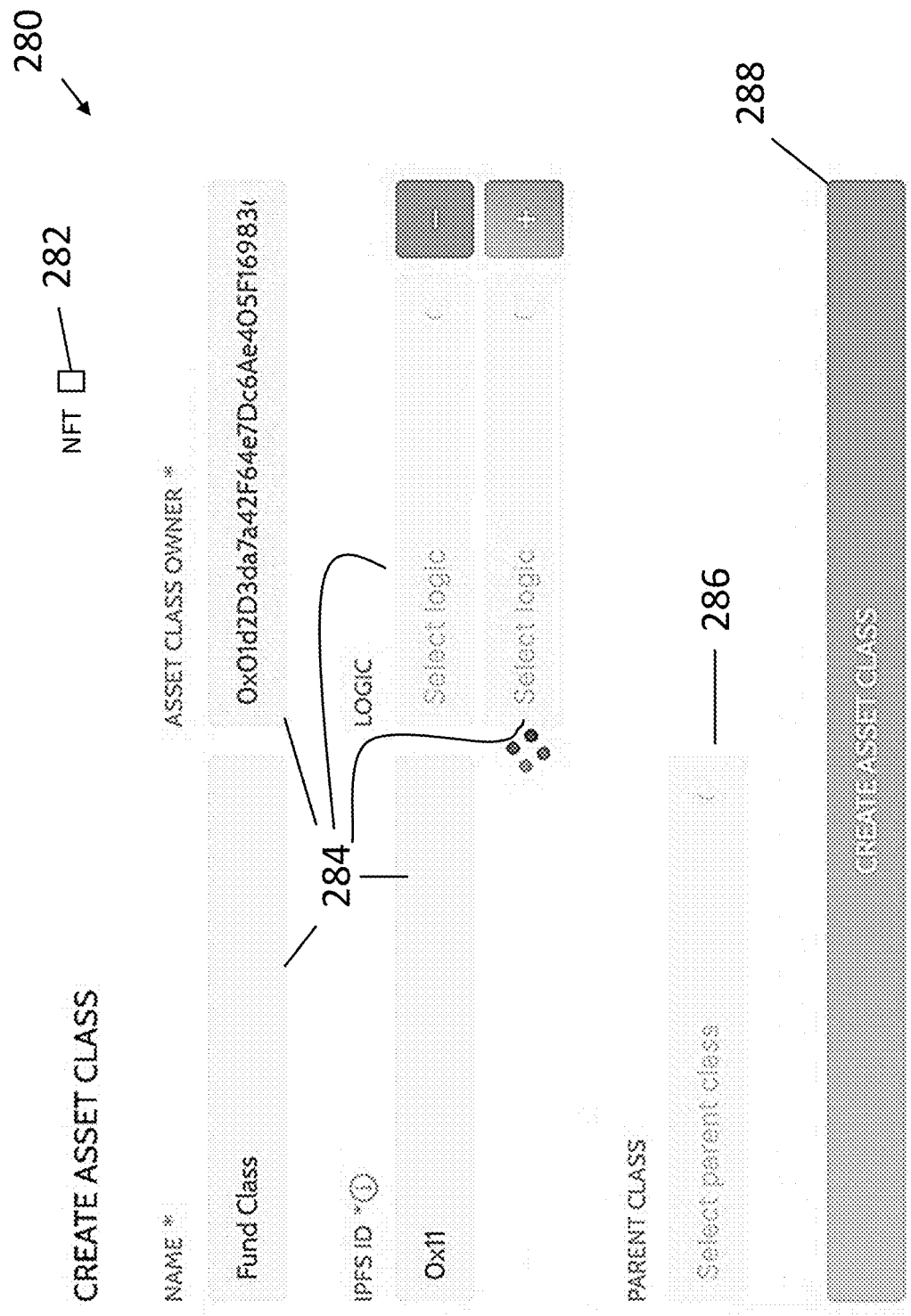
FIG. 4b illustrates a GUI for class creation according to one embodiment of the present invention.

FIG. 4*b* illustrates a Graphical User Interface (GUI) for class creation 280 according to one embodiment of the present invention. In one embodiment, the GUI for class creation 280 is operable to create individual items and/or objects. In one embodiment, the GUI for class creation 280 is operable to create an item as a non-fungible token (NFT), which implements an interface that enables transfer of ownership using a standardized wallet interaction pattern. This is a selectable option that can be made by click selecting checkbox 282. In the embodiment where the item is created as an NFT, a record is created in the on-chain table to deploy a non-fungible token and implement an associated token standard interface, for example, the ERC-721 (or equivalent) interface. The NFT token standard interface allows the object to respond to a transfer request from its owner's wallet. In one embodiment, the GUI 280 for class creation includes a name field, an Interplanetary File System Identification (IPFS ID) field, an asset class owner field, a selectable logic field (all of which are represented by 284). In one embodiment, the GUI for class creation 280 includes a select parent class button 286, and a create asset class button 288 to create the item. In one embodiment, the parent class button 286 is operable to cause the item (subject to creation by the GUI 280) to inherit class behaviors of the parent class selected by the parent class button 286.

Object properties are similar to functions that have their procedures and variables altered without directing editing the property code itself. In one embodiment, the D-TCP 100 is operable to link object properties to a plurality of data types described in the present application. In one embodiment, properties may only be assigned by an authorized party (which is determined by a trust system called attestation). In one embodiment, the D-TCP 100 is operable to assign a value to represent attestation of a property of an object. An attestation value is a value assigned to a property by an authorized party. In one embodiment, the attestation value is assigned by a reference to one or more objects. In one embodiment, the attestation value has an expiration. In one embodiment, an object's properties have a plurality of specific data types, such as, a string, integer, decimal, Binary Large Object (BLOB), pointer, and other data types known in the art. In one embodiment, object properties are scalar or arrays. In one embodiment, properties are marked as read only, required to be defined upon object creation, and cannot be modified by the assigned smart contract. The type and structure of a property is stored in AttributeRegistry 112*a*. In one embodiment where smart contract logic is linked to a class, the D-TCP 100 is operable to declare expected properties that include identifying key and names. In one embodiment, the declared properties to the class template are stored in the AttributeRegistry 112*a* by specifying the read and/or write status assigning the permission model.

In one embodiment, the D-TCP 100 is operable to link a property to an existing property from the AttributeRegistry 112*a*. In one embodiment, the property is able to be linked to the existing property without a linked logic publishing the property. The property linkage is stored in a corresponding class template in the Class Registry 104 in the ClassProperty data format shown in FIG. 3*b*, including a propertyKey as an identifier. In one embodiment, in order to link a property to an existing property of the AttributeRegistry 112*a*, a request is sent to middleware to get or set the property using the propertyKey as an identifier. In one embodiment where the property has been mapped by the class owner and/or creator, the request if forwarded to the AttributeRegistry 112*a* to acquire the property value mapped using the propertyId and the itemId. A nonlimiting example of code for implement the described property setting functions is shown in Appendix 7.

As a nonlimiting example of the property setting function, one smart contract for loans depends on an interest rate property and another smart contract calculates the interest rate property based on collateral. Both smart contracts operate on the interest rate property for the object. In this case both smart contracts publish the interest rate property. At the class level, the class owner connects these properties linking them to one propertyId in the AttestationRegistry 112*b*.

FIG. 4*c* illustrates a GUI for property creation 320 according to one embodiment of the present invention. The GUI of FIG. 4*c* includes a plurality of text fields, and/or drop-down boxes to define the property to be created. In one embodiment, the GUI of FIG. 4*c* is operable to receive input of a property name, a control context (as described below), a source (if an existing control context is desired), a parent property from which values and controls are inherited, a data type (Boolean, int, decimal, string, datetime, object, file, etc), an external ID (the means by which the property is referenced in third party systems), an Address on Refuse, an expiration time (amount of time before an assigned value becomes stale), a description, and/or a property indexing key, which are represented by 424. Property context defines the rights control settings (described below).

Figure 5:
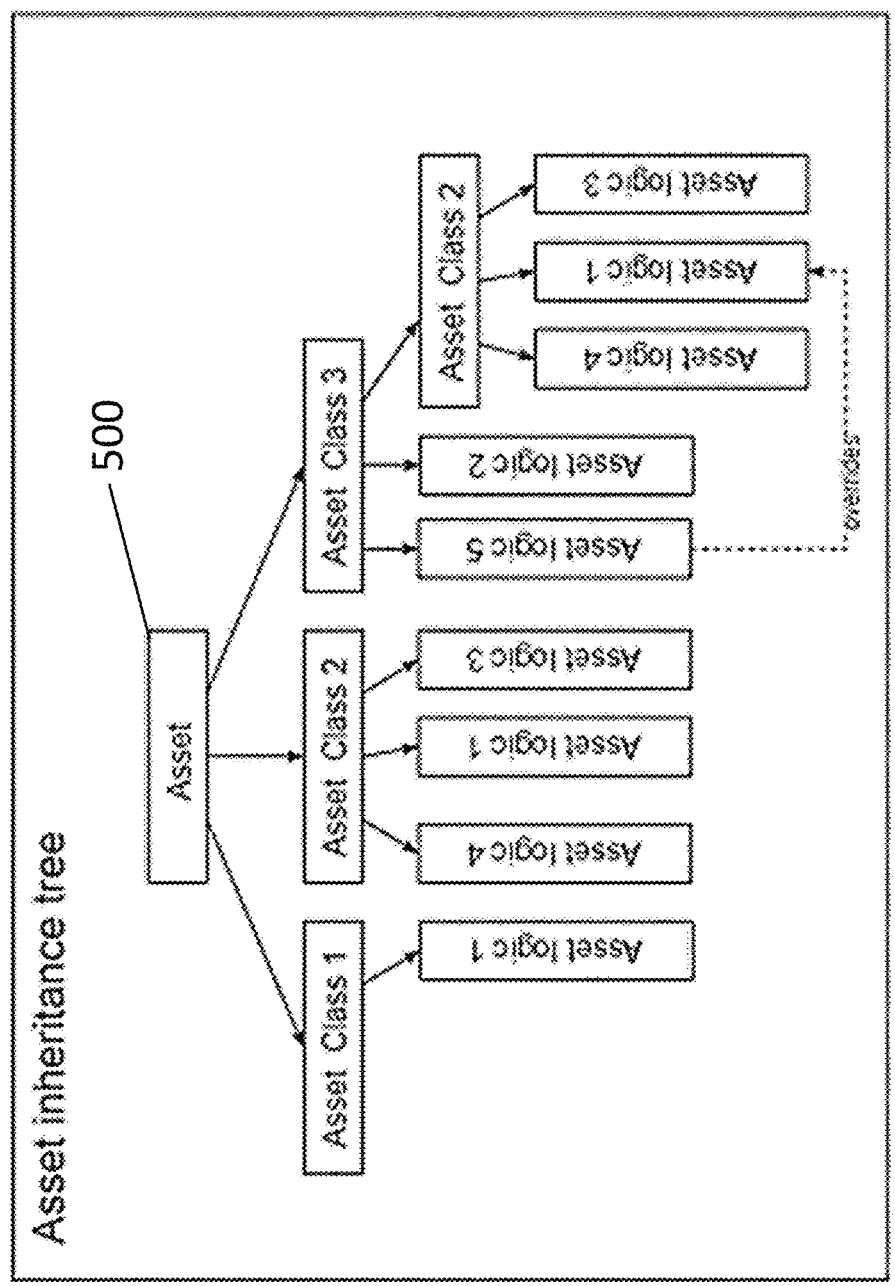
FIG. 5 illustrates a logic map of an asset inheritance tree according to one embodiment of the present invention.

FIG. 5 illustrates a logic map of an asset inheritance tree according to one embodiment of the present invention. In one embodiment, inheritance data (in the data format illustrated in FIG. 5) is stored in Item Registry 102 and Class Registry 104. As illustrated by FIG. 5, asset 500 (e.g., an NFT created through the platform) inherits attributes and logic from 3 different classes (asset class 1, asset class 2, and asset class 3). Note that asset class 3 inherits attributes from asset class 4, which includes attributes that will also be inherited by asset 500. Each asset class is associated with various logic stored in logic registry 106. Note that Property/Function override allows a class to inherit an attribute or logic from another class but override, i.e., implement differently, certain functions or properties. This relationship is illustrated in FIG. 5 in which asset class 3 overrides the behavior of asset class 4 as implemented by logic element 1 by substituting logic element 5.

In one embodiment, class template stores a logic map for a class in the format shown in FIG. 5. Asset logic addresses and signatures are fetched from Logic Registry 106. Each class template maps the address and signature of target functions and/or logic and adds a permission structure from control structures, as disclosed in U.S. patent application Ser. No. 17/677,657, which is incorporated here by reference in its entirety, to the class template. Advantageously, because each object in the D-TCP 100 stores a class linkage, it is able to fetch routing instructions for functions, events, and error messages associated with the class. In one embodiment, after an object has obtained and verified the logic address from the appropriate class template, the logic path for the class is cached in Item Registry 102. Advantageously, Other objects of the same class are able to call the logic directly from Item Registry 102.

Figure 6:
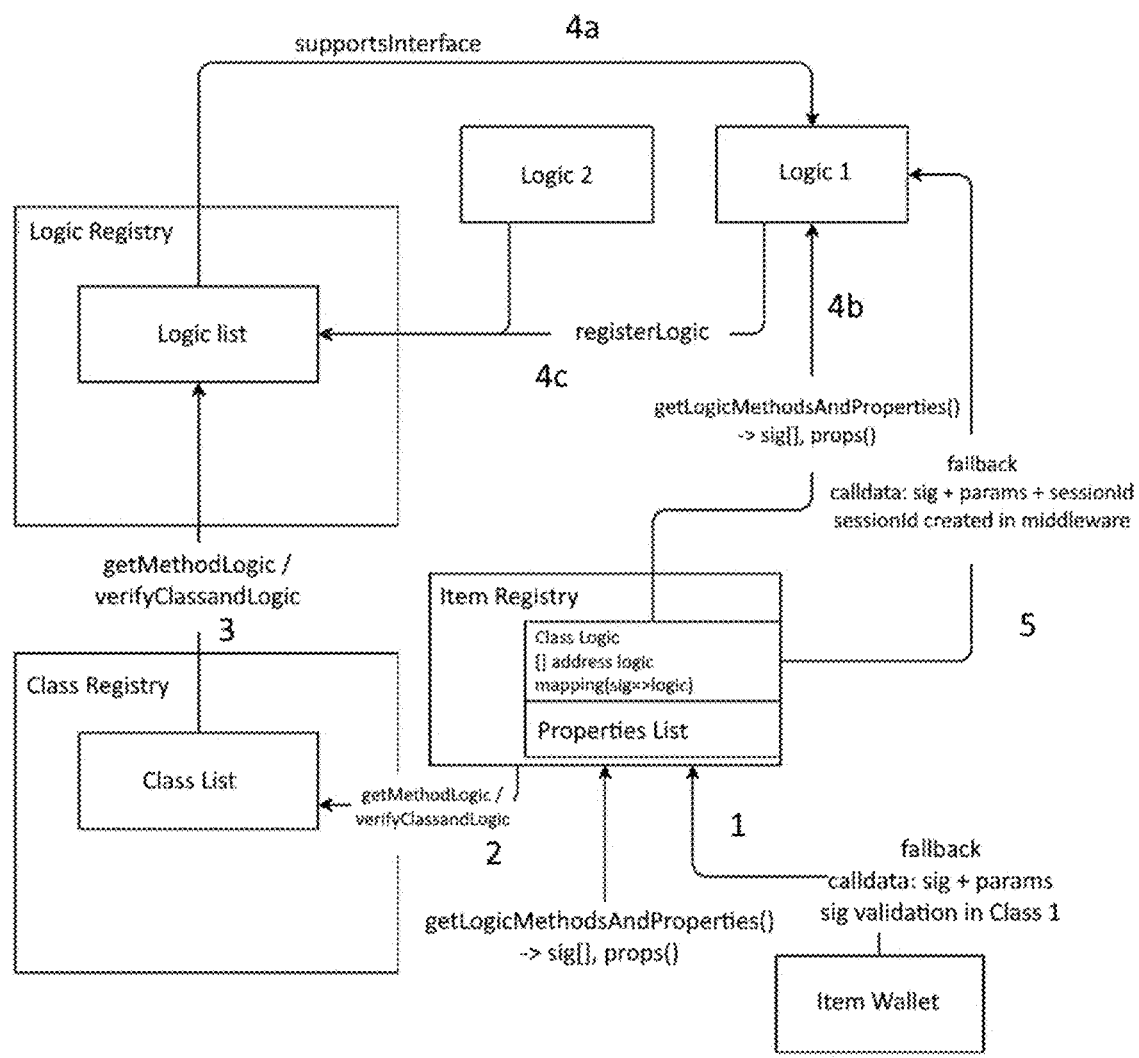
FIG. 6 illustrates a flow diagram for mapping a function for a request for execution based on a class template according to one embodiment of the present invention.

FIG. 6 illustrates a flow diagram for mapping a function from a request execution based on a class template according to one embodiment of the present invention. FIG. 6 illustrates the background process of the D-TCP 100 for implementing logic upon request by a user to include specific logic during object creation. FIG. 6 illustrates the proxy behavior used to map classes to smart contract logic. In one embodiment, at step 1, the item wallet associated with the requesting user (i.e., the owner of the logic object to be created) is validated based on its signature by the Item Registry 102. The item wallet passes a data structure that includes request parameter (a logic class, logic address, and/or logic properties) to the Item Registry 102. In one embodiment, at step 2, the class associated with the object is queried to obtain and verify the method signature using the getMethodLogic command. In one embodiment, at step 3, the Logic Registry 106 is queried to verify that the smart contract logic supports the signature of the request. In Steps 4a-4c the address for target logic is queried and, if valid, is stored in a cache in the Item Registry 102 to simplify future calls by objects of the same class (represented by Logic 1 in this example). In one embodiment, at step 4a, the Logic Registry 106 queries the smart contract to verify the designated interface is supported. On success, at step 4b, the Item Registry 102 queries the logic directly based on the address and signature identified in step 4a to verify that the smart contract supports the target function signature of the user request. Once verified, at step 4c, the target function signature for the class is registered in the Item Registry 102 cache. Subsequent requests for this function for objects using the same class template can immediately jump from step 1 to step 5 following the caching process described. In one embodiment, at step 5, a session is created and the request is routed to the target function for execution by the smart contract mapped via the class template. In summary, a request is initiated from an initiator's wallet and sent to the object subject to the request's address (i.e., the smart contract wallet address). While the smart contract associated with the object is operable to process the request directly, often the request is forwarded to the middleware to determine if the request is authorized and routed to the proper smart contract address with the function as defined by the object's template for execution. Therefore, the item wallet and associated middleware are operable to act as a proxy to route the requests to the desired logic for execution.

In one embodiment, the Item Registry 102 and/or its associated smart contract ItemRegistry is queried to determine if a specified object implements a class, interface, function, event, and/or property. In one embodiment, Item Registry 102 and/or ItemRegistry is queried using the Implements[Behavior](itemId, behaviorId) function, where itemId is the identifier for the object and behaviorId is the identifier for the class, interface, function, event and/or property. The Implements[Behavior](itemID, behaviorID) function is operable to implement the desired behavior (identified by behaviorID) to the desired item (identified by itemID). Then, ItemRegistry consults the Class Registry 104 to determine if the class template provides direct or indirect support for the requested behavior. As a nonlimiting example, a requestor (user of the D-TCP 100) may wish to know if an specific object supports the fund class. The requestor initiates a ImplementsClass(itemID, classID) call to the Item Registry 102 with itemID representing the object and classID represent the fund class template. If the object is assigned a class template that is or inherits from the fund class the response (to the call) is true. If the object is not assigned to or inherits from the fund class the response is false.

In one embodiment, The ItemRegistry.Implements[Behavior] function is used by 3rd party systems to enforce strong typing. In one embodiment, the AttestationRegistry 112b enables the assignment of objects as properties, where the object is expected to implement the behaviors of a specified class or interface. For example, a loan object may have a property "Collateral" where any assigned object is expected to implement the behaviors of the collateral class (e.g., pricing and forward/release of collateralized assets). If an object is assigned to this property (using the object's itemId), the AttestationRegistry 112b will validate that the assigned object implements the desired behavior and reject the assignment if it does not. This allows the implementing smart contract for the loan to call the expected collateral functions for an assigned collateral object with the confidence that the collateral object can handle the desired request. Advantageously, this mechanism assures strong typed assignments.

In one embodiment, properties and functions are restricted so they may only be changed or executed by authorized persons. Due to the lack of a centralized data administrator in the D-TCP's 100 ecosystem, the means to assign rights to authorized persons must be flexible and intuitive. Object ownership may change frequently. As a result, the rights framework must be adaptable to changes in control. To meet these challenges, private, protected, and public control patterns for properties and functions are implemented and extended as described below. Each function described below is operable to implement the control patterns for properties and functions in the way described following the functions name. In one embodiment, the D-TCP 100 is operable to implement the described control settings. In one embodiment, control settings are recorded in a class template for each property and function. In one embodiment, the D-TCP 100 includes the control settings (sometimes referred to as authorization models) for functions and properties as set forth below:

Private—internal. Reserved for control by versions of a smart contract in the External Data Pattern. This type of property is read only for the class template and does not require class configuration.

Private—external. Editable/executable by smart contracts, controlled by the class. This setting allows one smart contract mapped to the class to update properties for another smart contract mapped to the class if the properties are connected. In other words, one logical element within the class may alter property for another logical element. This setting is used to permit communications between logic implemented separately. For example, one smart contract may be used to calculate interest rates, while another uses the interest rate to calculate monthly principle in interest where the logic is connected to the Loan class and the properties are mapped together.

Protected—constant. The class owner specifies the value which is constant for all objects of the class.

Protected—ownerControlled. Editable/executable by item owner. Since most objects are transferable as NFTs and the owner can be known at any time, this control pattern makes rights management practical for frequent ownership transfer of an object between parties.

Protected—creatorControlled. Editable/executable by item creator or designated entity via AttestationRegistry 112b source context. For this control mechanism, a unique AttestationRegistry 112b source is created on instantiation of an object in the class. Advantageously, this allows the object creator to manage and delegate rights using control structures as defined in the U.S. patent application Ser. No. 17/677,657.

Protected—policyControlled. Editable/executable by consulting with the Compliance Oracle 112 to evaluate the right based on attribute-based access control and configurable policies.

Protected—classControlled. Editable/executable by the wallet specified by the class owner used for execution of "class level" triggers, roles, or other class-wide "global" variables.

Protected—external context. Editable/executable controlled by AttributeRegistry 112a context or Compliance Oracle 112 policy. Usually, the values for these properties are set by parties not affiliated with the ownership structure of the class or object.

Public—Editable/executable by any party.

In one embodiment, Item Registry 102 is operable to assess the authorization of the requester making a function request. In one embodiment, function execution rights (i.e., the authorization being assessed by the Item registry 102) are configured and recorded by the class template by storing an authorization model and/or control setting with each function identifier. In one embodiment, the default authorization model for a function is Protected—ownerControlled. This authorization model ensures the request is made by the current owner of the item before executing. More complex permission patterns, such as the Protected—policyControlled authorization model, involve consulting configurable policy as disclosed in U.S. application Ser. No. 16/143,058.

In object-oriented programming (OOP), inheritance is the mechanism of basing an object or class upon another object or class, retaining similar implementation. Inheritance enables deriving new classes from existing classes such as super class/property or base class and then forming them into a hierarchy of classes. In most class-based OOP languages, a "child object" created through inheritance acquires all the properties and behaviors of the "parent object" from which it is derived. Inheritance enables programmers to create classes that are built upon existing classes, to specify a new implementation while maintaining the same behaviors, to reuse code and to independently extend original software via public classes and interfaces.

In one embodiment, class templates in class registry 104 enables class inheritance on a decentralized network. In one embodiment, the D-TCP 100 enables one class to inherit from another upon reference of the parent class template during class creation. The child class stores this reference as a data item in its template. In one embodiment, the child class extends the behavior of its parent by adding additional properties and/or by mapping new logic from Logic Registry 106 to the child class. In one embodiment, the child class overrides the parent's behavior by specifying new mapping of functions or properties. In one embodiment, where a request for inheritance is routed using a class template, the Class Registry 104 initially checks for extensions and/or overrides and then defaults to the parent class template for routing instructions. Advantageously, class inheritance provides users a simple mechanism to create, extend, and reuse programmed financial behaviors that can be combined on blockchain ledgers without coding—or extended with light coding of unique features.

Similarly, the D-TCP 100 enables upgrading of classes. In one embodiment, to upgrade a class, the D-TCP 100 receives a specified change to a class template and saves the change. In one embodiment, the specified change is received by a class owner. This template is then saved as a new version of the same class. The old version is retained. In one embodiment, asset owners explicitly choose the use of the upgraded class template by accepting the new version, otherwise request will be routed as before using the proxy mechanism described below. Advantageously, this acceptance requirement protects asset owners from undesired changes to object processing.

Figure 7:
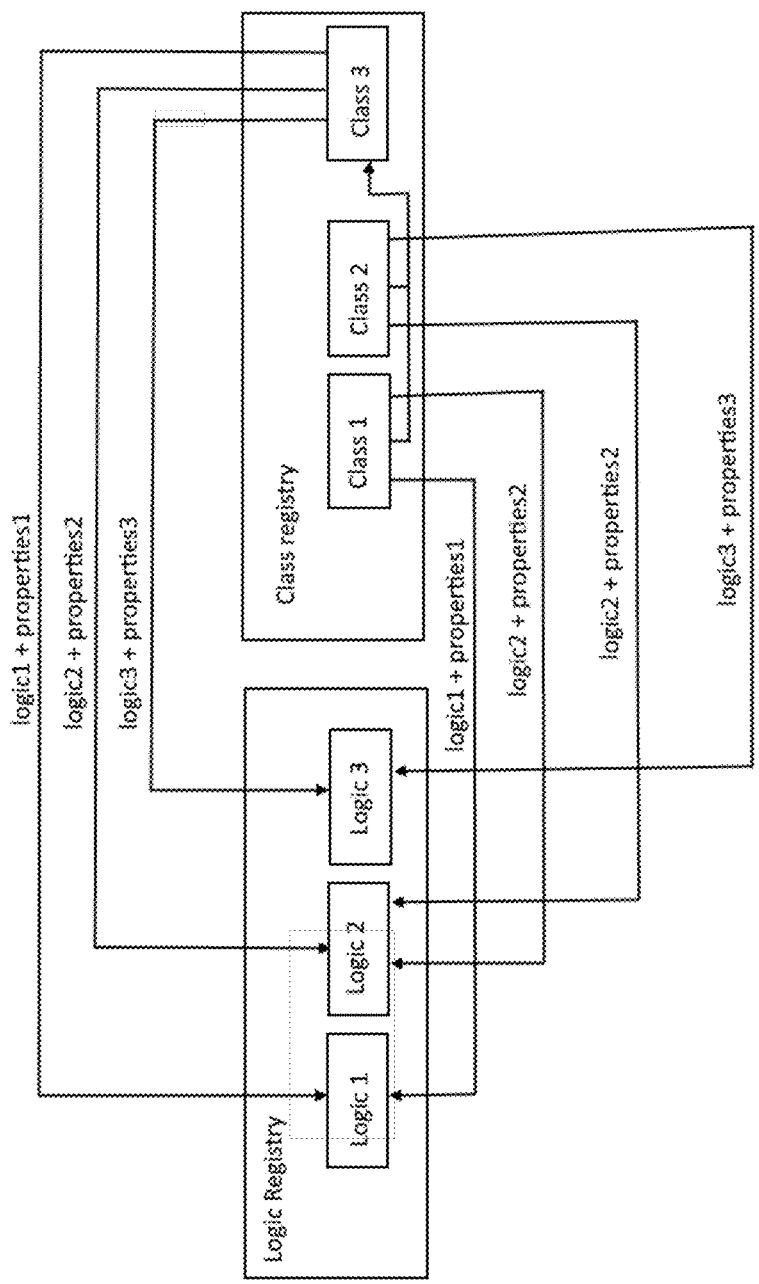
FIG. 7 is a schematic illustration of an example linking/association of classes with logic and properties for classes with inheritance.

FIG. 7 illustrates an example of logic linking for class inheritance according to one embodiment of the present invention. In FIG. 7, Class 3 inherits logic and properties from Class 1 and Class 2. FIG. 7 further illustrates logic 2 and property 2 of Class 1 being overridden by that of Class 2.

Figure 13:
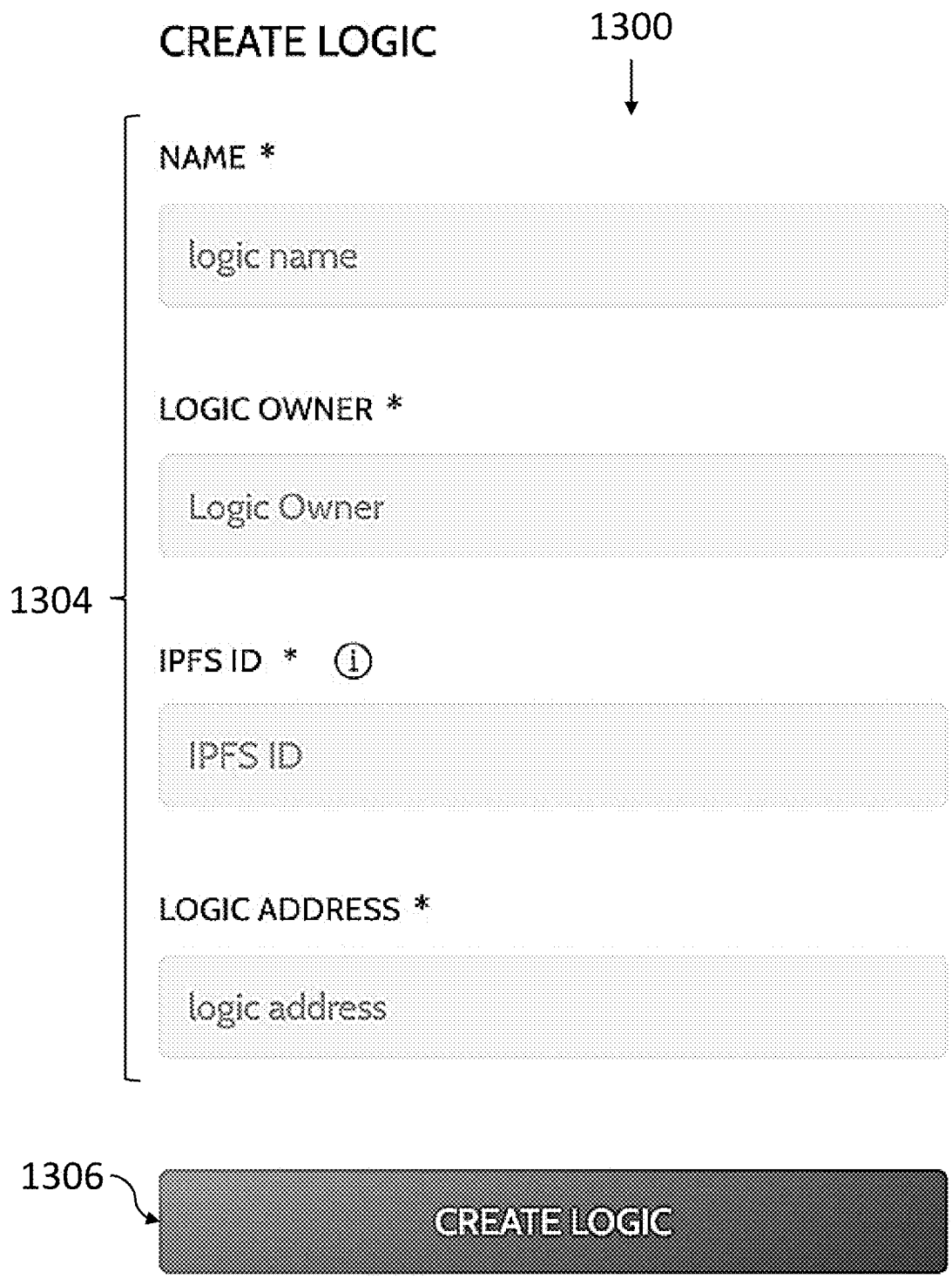
FIG. 13 illustrates a logic creation GUI according to one embodiment of the present invention.

FIG. 13 illustrates a logic creation GUI 1300 according to one embodiment of the present invention. FIG. 13 illustrates a mechanism of the D-TCP 100 by which a user of the platform publishes code to the Logic Registry 106 by populating a form. In one embodiment, the logic creation GUI 1300 includes a text field for a logic name, a logic owner, a IPFS ID field, link to an ABI file used to define interaction with the logic, and/or assign the logic address in 1304. The logic is registered in the Logic Registry 106 upon clicking the Create Logic button 1306 and signing the formulated transaction using an authorized wallet address. See Appendix 8 for sample code for the implementation of the Logic Registry interface for registering new logic.

Logic contributors may utilize the ExternalData pattern, as described below, to facilitate upgradability of registered smart contract logic. To use ExternalData, the smart contract publishes properties that are reference by a unique key, propertyId. Values are stored in ExternalData storage. The logic owner may register upgraded logic referencing these same keys, providing the new version of the smart contract access to the same data and reducing data migration costs. Only logic owners may map versions of a contract to the specific propertyIds to prevent leakage between smart contracts.

Objects created in the Item Registry 102 may require actions triggered by external events based on time, other smart contract activity, off-chain or external events, user triggering and/or other initiation methods. In one embodiment, on creation, the object registers a plurality of triggers. In one embodiment, the plurality of triggers provide instructions detected by an off-chain orchestrator 114 to detect and respond to the external triggers of the object. Triggers are stored by Item Registry 102 in accordance with the data structure 220c as shown in FIG. 3a. Data structure 220c defines itemId for which the trigger is registered, the triggerType (temporal, event based, user initiated, etc), the task to be performed when the trigger is detected, and/or other trigger instructions (for example, frequency of the trigger, or the signature for the triggering event). In one embodiment, when a trigger is registered, one or more wallets are designated in data structure 220d that are authorized to sign a transaction initiating the trigger's action.

In one embodiment, Orchestrator 114 is operable to detect triggers associated with an object or a class and execute the associated function. In one embodiment, the Orchestrator 114 is a cron with the authority to sign a transaction. Cron is a utility program that allows the input of commands for scheduling tasks repeatedly at a specific time. Tasks scheduled in cron are called cron jobs. Cron is a daemon—a background process executing non-interactive jobs. A daemon is always idle, waiting for a trigger to request it to perform a particular task. The trigger can be input on any computer on the network. The task that is to be executed when the cron is fired and when it should be executed is set by a trigger.

In one embodiment, Orchestrator 114 is operable to detect registered triggers, listen for registered triggers, and/or wait for the triggering event, and/or submit transactions to the Item Registry 102 to affect the desired action. In one embodiment, triggers are specified by a class template and are common to all objects of the class. The data structure for attaching a trigger to a class is illustrated in FIG. 3b. In one embodiment, on object creation and assignment to a class that includes at least one trigger, the class trigger is automatically registered for the object. As a nonlimiting example, a loan class template may assign a trigger for all objects in the class to check back once per month and update the principal and interest for the loan, and/or to update the principal and interest when a payment is made to the loan wallet. For each object that is created for the class, this trigger is registered, the Orchestrator 114 detects its assignment and awaits the trigger for processing. When the time or event occurs, the Orchestrator 114 executes the function, exposed by the Loan class template, to UpdateTerms.

In one embodiment, trigger behaviors are published directly through the logic's self-describing signature. In one embodiment, recommended triggers are provided by the D-TCP 100 with functions, events, properties, etc of an object during object creation. In one embodiment, users of the platform are provided the means to accept or add to recommended triggers by saving in the class template.

In one embodiment, a trigger is configured via the class template in ClassRegistry or by directly adding a trigger in Item Registry 102. Advantageously, this mechanism enables the ability for objects to self-describe triggering behavior through ItemRegistry, ClassRegistry, or LogicRegistry, and for a user to configure this behavior without coding.

The platform provides for the composability of digital assets by which classes are formed by bundling logic objects (sometimes referred to as "logic elements") that are in the form of smart contracts. These templates enable routing of function calls (e.g., state change requests) for instantiated objects that have been assigned the class template via a blockchain based proxy (i.e., the middleware). In one embodiment, the D-TCP 100 is operable to utilize blockchain based proxies. One disadvantage of DLT technology is that once a smart contract has been deployed, its source code cannot be altered. In order to combat this, the present invention utilizes blockchain based proxy contracts. A blockchain based proxy contract enables the use of newly deployed smart contracts overtop of or through previously deployed smart contracts as if the previously deployed smart contract has been upgraded. Blockchain based proxy contracts are operable to "intercept" calls to a previously deployed smart contract to first go through the newly deployed proxy contract, then returned to the previously deployed smart contract. This enables a previously deployed smart contract to utilize newly created smart contract functions and logic. Blockchain based proxy contracts are further operable to delegate function calls from one smart contract to another, where the initially called smart contract is called to execute a function that it does not support. Rather than simply failing the function call or returning an error, blockchain based proxy contracts are operable to execute the function on a different smart contract that does support the function call and return the function to the initially called smart contract. This is a concept known as fallback functions. The D-TCP 100 is operable to utilize blockchain based proxy contracts in this way. Generic blockchain based proxy operations are understood by practitioners of the art.

Smart contracts are immutable. Therefore, it is not possible to upgrade the code of a deployed smart contract. However, the disclosed platform is operable to leverage the concept of a proxy to configure a computing architecture that enables configuration to upgrade or extend the behaviors associated with objects by mapping newly deployed contracts. In one embodiment, the proxy architecture of the platform routes message calls through smart contract-based middleware based on configured class templates, to route the calls to the latest deployed contract logic. To upgrade a previously deployed smart contract a new version of the contract is deployed, and the proxy contract is updated to reference the new contract address. An example of smart contract code for implementing the proxy model is found in Appendix 1.

The D-TCP 100 is operable to provide the means to define and modify object behaviors without the need for coding and enable scalable management of objects in a decentralized network without a central authority to define object schema and behaviors. The D-TCP 100 includes a request capture and forwarding system to provide attribution and authorization context; a plugin framework that enabled new smart contract logic to be registered, mapped, and confirmed; a smart contract based middleware to authorize and route requests to implement logic; a session management framework to prevent man in the middle attacks or unauthorized use of controlled code; a framework to inject code execution dependencies for specialized functions that vary across objects in a class; and a flexible context based permission model to enable data updates and other state changes by authorized parties. Each element of the D-TCP is described in more detail below.

Figure 14:
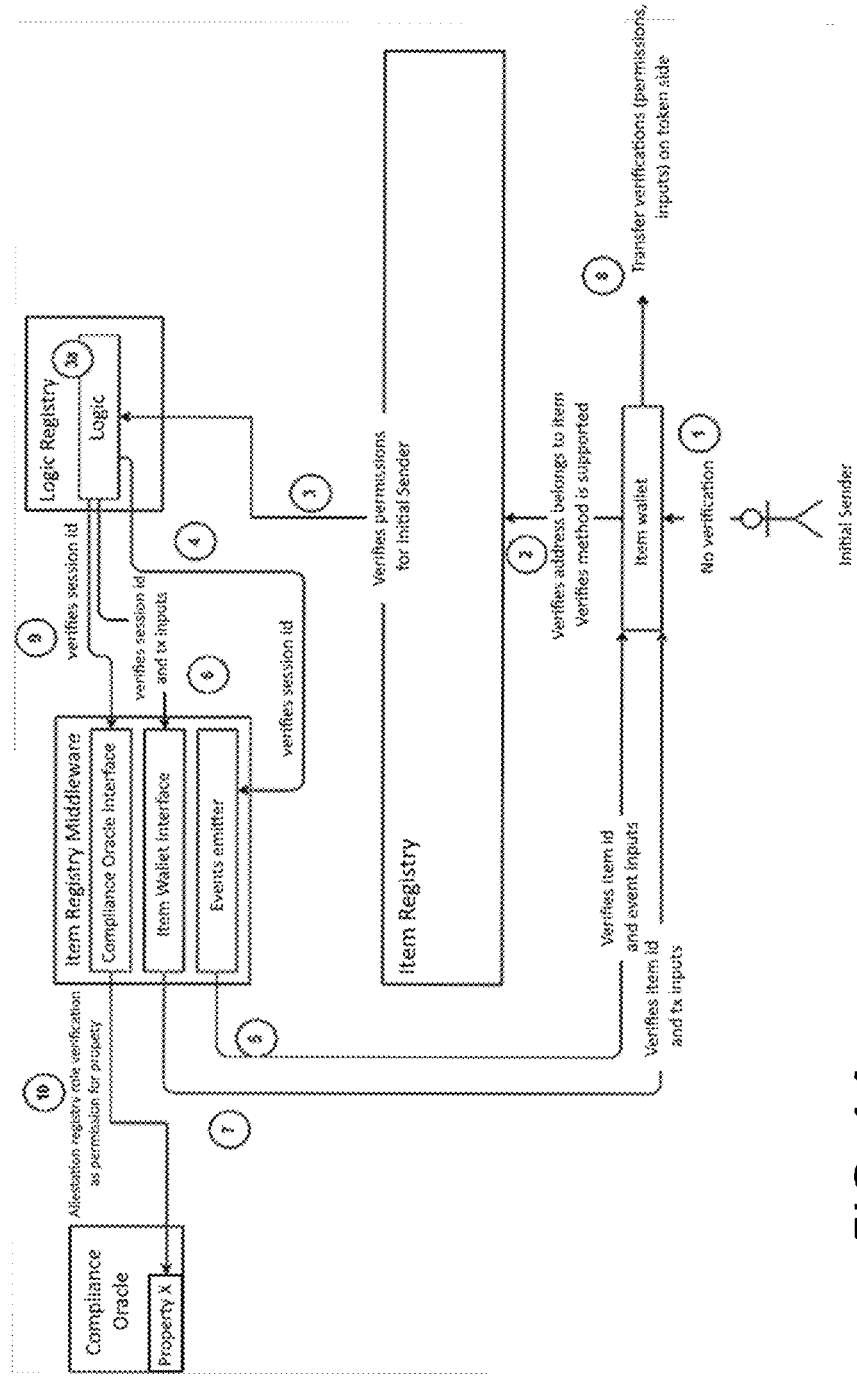
FIG. 14 illustrates a flow diagram of the permission decision making and mechanism for the execution of a requested state change on the D-TCP according to one embodiment of the present invention.

FIG. 14 illustrates a flow diagram of the permission decision making and mechanism for the execution of a requested state change on the D-TCP 100 according to one embodiment of the present invention. FIG. 14 highlights key permission decisions enforced by the D-TCP 100 for a state change, which is represented by the numbered steps of FIG. 14. FIG. 14 expands upon the proxy behavior enabled by D-TCP 100. FIG. 14 illustrates the security functions of the D-TCP 100 facilitated by the middleware. FIG. 14 illustrates an example process of the permission decision making, represented by the circle numbers of FIG. 14. In one embodiment, the middleware is operable to conduct the plurality of steps illustrated in FIG. 14. At step 1, the ItemWallet receives a request (from a "Sender" as illustrated in FIG. 14) to initiate a state change (such as a transaction). Traditionally, in a permissionless DLT, any user may submit any request for execution of a transaction. The accessibility and ease of use of DLTs provides many advantages to global adoption but places a burden on code execution that ensures only authorized state changes are allowed. Advantageously, the D-TCP 100 is operable to ensure that requests for state changes are authorized based on a flexible, scalable, and decentralized authorization framework without placing a heavy burden on code execution. At step 2, the ItemRegistry verifies that the object associated with the requested state change is associated with the ItemWallet designated in the request and verifies that the requested method is supported. At step 3, the ItemRegistry evaluates the permission of the sender associated with the ItemWallet to execute the desired state change. The ItemRegistry evaluates the permission of the sender based on context assigned to the action (as described above), and creates a session identifier to ensure routed requests occur in the context of an authorized session (the current session for state change that is being verified). At step 3a, the referenced smart contract verifies that an authorized session exists for execution of the state change. This is to ensure requests that have not been routed via the D-TCP 100 authorization structure are not executed and return an error message. At step 4, the middleware verifies that the event or error message is initiated by registered logic and is occurring in the context of an authorized session. At step 5, the ItemWallet verifies that the itemId and event inputs match the referenced wallet (ItemWallet). In one embodiment for ItemWallet transactions, at step 6, the middleware verifies that the request initiated by registered logic is occurring in the context of an authorized session. At step 7, the ItemWallet verifies that the itemId and transaction inputs match the referenced wallet. At step 8, the external smart contract associated with the token transfer of the transaction sought applies its internal authorization logic, if applicable. At step 9, the middleware verifies that the data request is occurring in the context of an authorized session for data storage purposes. In one embodiment at step 10, the Compliance Oracle 112 verifies the authorization to read or write data based on the assigned context.

Figure 8:
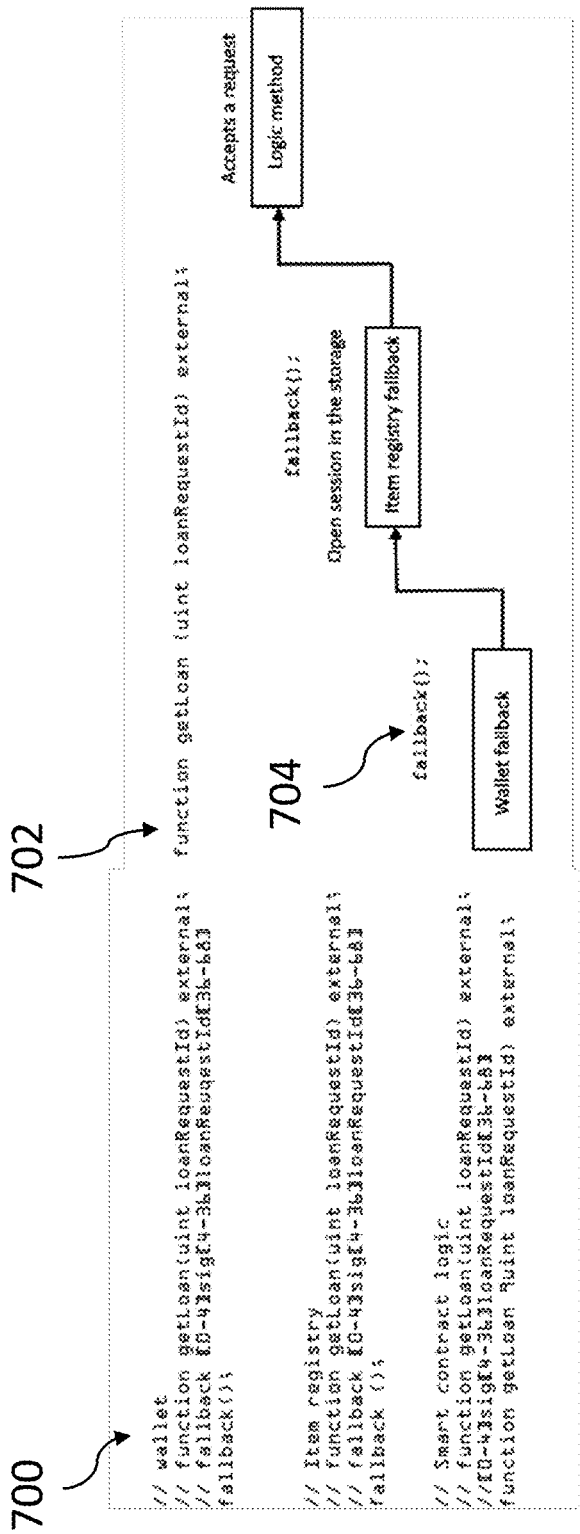
FIG. 8 illustrates an example process for code injection for a specialized function request by the D-TCP according to one embodiment of the present invention.

FIG. 8 illustrates an example process for code injection for a specialized function request by the D-TCP 100 according to one embodiment of the present invention. In one embodiment, a request is initiated by publishing a signed transaction request to a blockchain node. In the example illustrated by FIG. 8, information about a loan associated with a particular loan request is being requested through the function shown at 702. The D-TCP 100 is operable to sign and publish transaction to a DLT using well-known and understood methods by one of ordinary skill in the art. In one embodiment, a published transaction is executed via the ItemWallet, includes code 700 and uses the fallback function at 704. In one embodiment, the fallback function at 704 is a catch-all interface operable to capture all inbound function requests that do not map to a defined schema. In one embodiment, the code executed by the fallback function 704 enables generic processing of all non-specific inbound requests and is operable to route all inbound requests via the proxy or middleware to specific smart contracts that execute functions associated with the request signature.

In one embodiment, the published transaction (of the request referenced in FIG. 8) includes the source wallet, a 4-byte function identifier, and other data specific to the desired function. Advantageously, because the published request includes the source wallet, which is linked to a specific object in Item Registry 102 through an identifier (ItemId), the request is routed to the fallback function of Item Registry 102 by the middleware. Advantageously, by routing through the ItemWallet, the context of the request is set and the permission structure unique to the object is applied for attribution and authorization. The ItemRegistry assesses the authorization status of the requestor for the specific object instance based on permissions for the requested function call and, if authorized, creates an open session for the request and obtains the smart contract address for routing the call based on the function identifier. See Appendix 9 for Request Permission interface sample code. Once authorized, the call for the transaction is routed to the implementing smart contract for execution. In one embodiment, where the function is a controlled function (one that results in a state change), the implementing smart contract validates the existence of the open session and executes the code for the requested function. See Appendix 1 for a sample implementation of Item Registry Proxy operations code.

Figure 9:
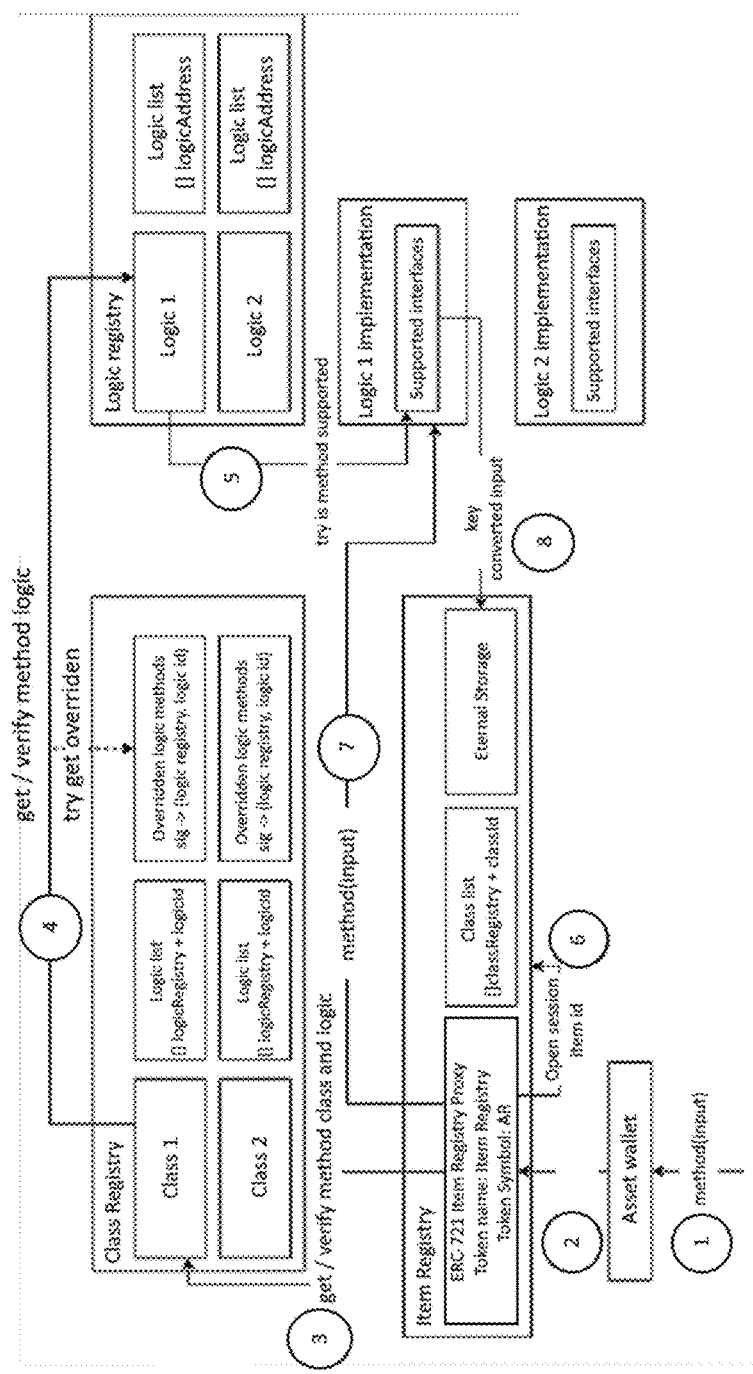
FIG. 9 illustrates a flow diagram for the sequence of module interactions for enabling pluggable logic through the D-TCP according to one embodiment of the present invention.

FIG. 9 illustrates a flow diagram for the sequence of module interactions for enabling pluggable logic through the D-TCP 100 according to one embodiment of the present invention. FIG. 9 illustrates a plurality of steps associated with the sequence of module and/or smart contract interactions for enabling pluggable logic by the circled numbers included in FIG. 9. In one embodiment, the Item Registry 102, Class Registry 104, and Logic Registry 106 of the D-TCP 100 are operable to functionally interact in a way to enable pluggable logic. Pluggable logic enables a "plug and play" framework where users are able to select and insert desired object behaviors from a list smart contract interfaces of the platform to objects and classes. Pluggable logic refers to a low-code development process where users of the platform are able to create bespoke object or class behaviors without having to add additional code by viewing a selectable list of smart contract interfaces. The D-TCP 100 enables a seamless combination of logic so there are not underlying issues in the underlying code associated with logic combinations. The background process for enabling pluggable logic is illustrated by FIG. 9.

In one embodiment at steps 1 & 2, the request (for "plugging" in logic) is routed as defined in the Basic Function Request description above. The cached route information is a combination of classId, smartContractId, and 4-byte function identifier. In one embodiment, where the route has not been cached, the request proceeds to step 3 to determine the path to the requested function and validate its existence. At step 3, the ItemRegistry requests a pointer to the function from Class Registry 104 using the classId associated with the object associated with the request. Based on the classId, the ClassRegistry retrieves the class template and determines the smart contract associated with the request. At step 4, the Class Registry 104 verifies that the referenced logic has been published to the Logic Registry 106. In one embodiment, the class is inherited from a parent class (describe in class template structure), the designated class template is operable to check for overriding functions and if not present, points to the parent class to obtain the associated mapping. At step 5, the reference smart contract (containing the request function) is queried to see if the desired function is supported. Following step 5, the plugin is validated, and the function is registered for future use by storing the routing information for the function associated with the class in the Item Registry 102 route cache. In one embodiment, a function request is internally cached in the Item Registry 102 and a subsequent function request (identified by a 4-byte identifier in the request) for the same function utilizes the routing information of the internally cached function request and the process skips to step 6. In one embodiment where a validated plugin is called, a session is opened, as shown in step 6, using the method described in the Basic Function Request description. At step 7, the function request is routed to the targeted logic for execution. In one embodiment, represented by step 8, storage is called by the target function and is used to provide continuity between smart contract versions. This pattern and other requests routed back to the middleware of Item Registry 102 are described below.

Advantageously, ItemRegistry performs critical middleware tasks to route requests to internal and external logic while maintaining the security controls and accountability of the system. This enables composable data schema and application functionality without the need for a centralized database administrator or system architect normally responsible for the security posture of a system and eliminates the requirement for identity and access management systems that create walls between enterprises.

Advantageously, the D-TCP 100 middleware enables secure interaction between objects and external smart contracts by ensuring that request routing is intentional, registered, authorized, and consistent with a valid session. In one embodiment, the D-TCP 100 is operable to ensure that requisite functions and services are triggered, such as event logging. Advantageously, the D-TCP 100 middleware enables complex operations involving situations where one object has rights to affect another object in one or more ways. An example of a complex operation occurs where one object of the D-TCP 100 owns another object (for example, a fund that owns one or more performing loans) or where one object has another as a property (for example, a loan may have assigned a collateral object to support its implementation). In order for a controlling object to execute a function on another object or data that it owns or otherwise controls, the source of the request must be traceable to the originating request to prevent an injection attack (unauthorized logic attempting access) on the controlled object or data.

Figure 10A:
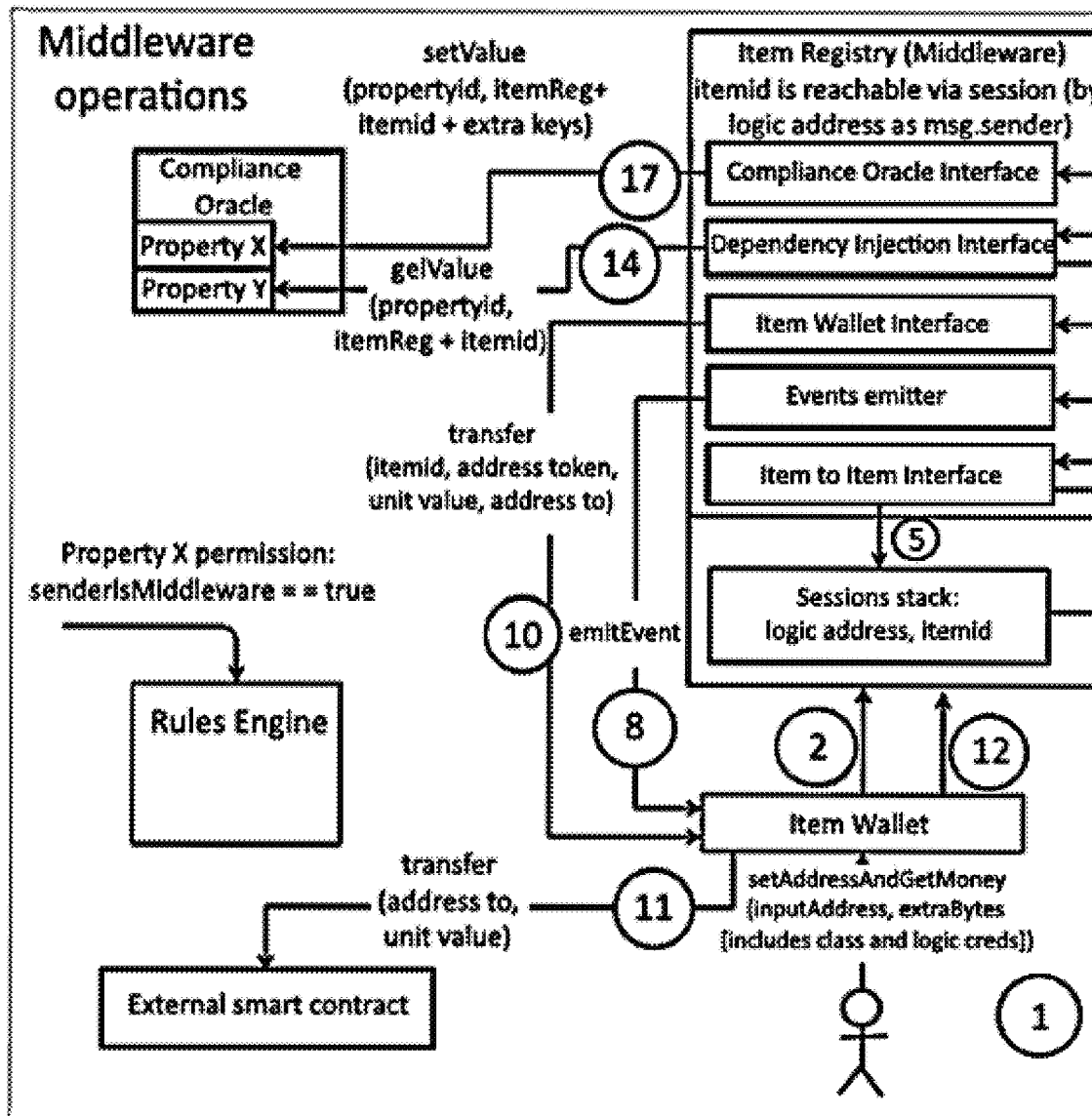
FIG. 10a illustrates a flow diagram of an example sequence of the D-TCP middleware operations according to one embodiment of the present invention.
Figure 10B:
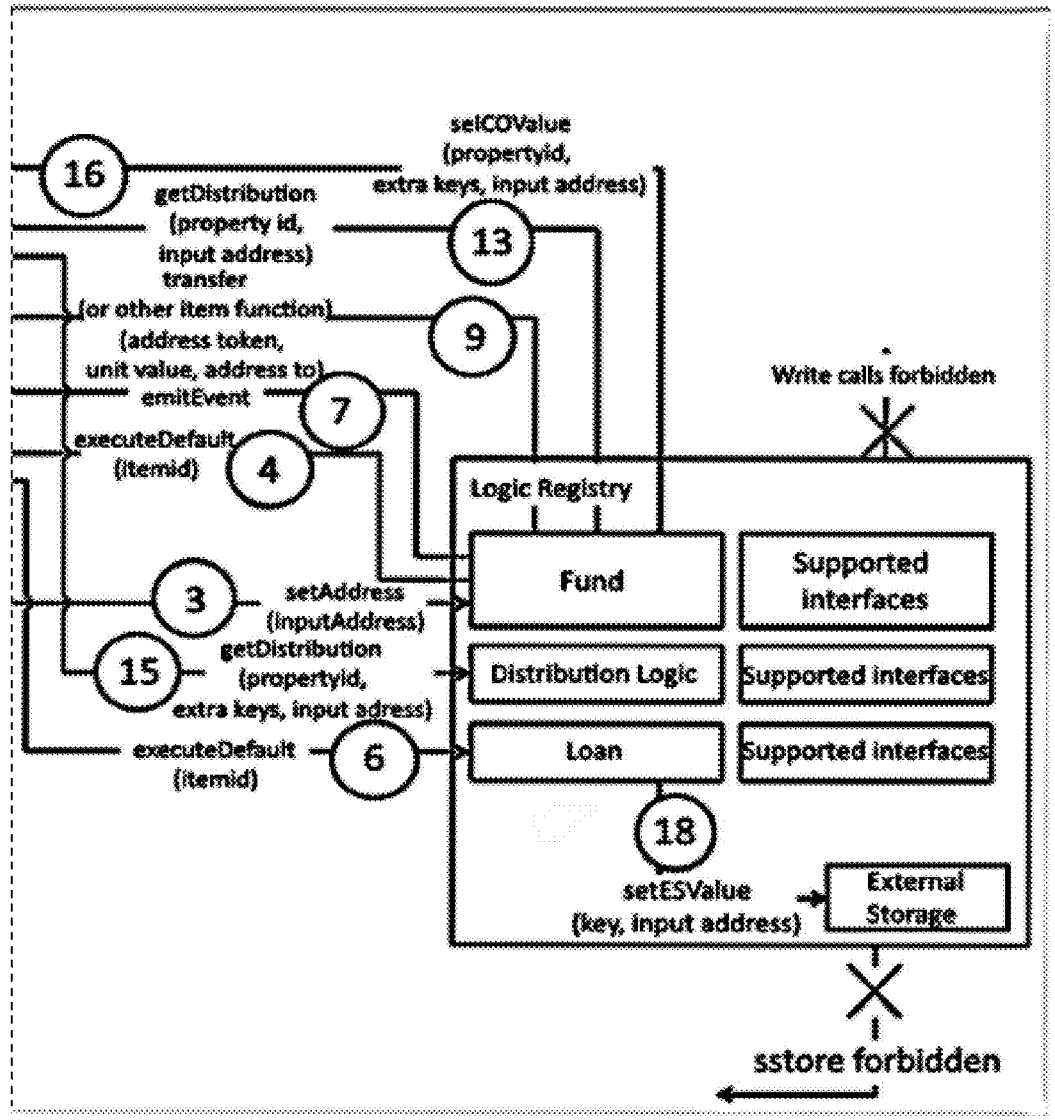
FIG. 10b is a continuation of FIG. 10a and illustrates a flow diagram of an example sequence of the D-TCP middleware operations according to one embodiment of the present invention.

FIG. 10*a* and FIG. 10*b* illustrate a flow diagram of an example sequence of the D-TCP 100 middleware operations according to one embodiment of the present invention. The middleware is operable to effectuate the plurality of instructions of the configurable templates. FIG. 10*a* and FIG. 10*b* illustrate a plurality of steps associated with the D-TCP 100 middleware operations by the circled numbers of FIG. 10*a* and FIG. 10*b*. In one embodiment, function requests are initiated and routed to smart contracts registered in the Logic Registry 106 at steps 1-3 as described in the basic function request pattern by the middleware. In one embodiment, Logic Registry 106 does not permit and prevents calls to unregistered smart contracts or data stores in order to combat malicious smart contract code that could improperly route user-initiated calls. In one embodiment, where external calls and/or data write operations are required as part of function execution, the external calls and/or data write operations are called via the middleware functions enacted in the ItemRegistry using one or more of the patterns shown in FIG. 10*a* and FIG. 10*b*. In one embodiment, the external call and/or data write operations are: Item-to-Item interface, Events-Emitter, Item-Wallet interface, Dependency-Injection interface, Compliance-Oracle interface, and/or External-Storage interface.

In one embodiment, the Item-to-Item Interface pattern is operable to route function calls between objects in the Item Registry 102. In one embodiment, the Item-to-Item Interface pattern is operable to route function calls between one object and another object that it controls. An example of such a case is where a fund owns one or more loans as an asset where both the fund and the loans are objects in the D-TCP 100. In one embodiment, the Item-to-Item Interface pattern is operable to route function calls between one object that is a property of another controlling object. An example of such a case is where a loan object has an associated collateral object. In one embodiment, during the execution of logic from one object (represented by step 3), the logic requires execution of logic from a controlled object, the executing smart contract calls the Item-to-Item Interface of the ItemRegistry and passes the details of the proposed transaction to the Item-to-Item Interface pattern in the request (represented by step 4). In one embodiment, the Item Registry 102 middleware is operable to validated the sessionID and permission for the executing thread and created a new session for the controlled object (represented by step 5). Following validation, the request is passed to the target smart contract via the proxy based on the controlled object's class template (represented by step 6).

In one embodiment, the Events-Emitter pattern is operable to publish events and errors associated with an object. Advantageously, to provide a consistent listening point for events and errors associated with end user transactions, object events are published from the Item Wallet 120 smart contract utilizing the Event-Emitter pattern. The Event-Emitter pattern is operable as a relay system that publishes events and errors occurring in the target smart contract to detect and publish the activity via the ItemWallet, which is the point of interaction for the initial request. In one embodiment, a function is called by the initiator (step 3) and emits an event (step 7). This event is detected by the Events-Emitter of Item Registry 102. Following detection, the Event-Emitter pattern is operable to throw an event to be detected by the ItemWallet (Step 8). The ItemWallet smart contract is then operable to throw the event referencing the affected wallet address. See Appendix 11 for detailed implementation of the Event-Emitter pattern function and Appendix 12 for the Item Registry Emitter code.

In one embodiment, the Item-Wallet interface pattern is operable to operate value and/or execute functions via the object's wallet. In one embodiment, the Item-Wallet interface pattern is implemented by a call to one or more external smart contracts to transfer value from the initiating object's wallet. In one embodiment, the initiator calls a function that executes a transfer of an ERC-20 asset from a fund's wallet, at step 9, the executing code calls the Item-Wallet interface pattern of the ItemRegistry and/or Item Registry 102 Middleware. In one embodiment, at step 10, the ItemRegistry and/or Item Registry 102 Middleware validates the session assigned to the request and, if valid, call the ItemWallet to execute the request. In one embodiment, at step 11, the ItemWallet executes the request by calling the proper function, required to transfer the asset, in an external smart contract. In one embodiment, at step 12, the Item Wallet 109 and/or ItemWallet calls other supported actions. In one embodiment, at step 12, the Item Wallet 109 and/or ItemWallet calls a request to transact with other item Registry 102 objects.

In one embodiment, the Dependency-Injection interface pattern is operable to substitute one or more logic functions with another logic function by utilizing smart contract interfaces and permits pluggable logic to further implement diversity of implementation of functions between objects (i.e., polymorphism). In one embodiment, the Dependency-Injection interface pattern is operable to implement a design pattern in which an object and/or function is able to receive other dependent objects and/or functions for use without having to know how to construct the dependent objects and/or functions. This is discussed in greater detail below. In one embodiment, where two different instances of a fund class implement different logic for distributions with the first instance using default logic and the second instancing using specialized logic, a dependency injection point is declared. In one embodiment at step 3, a function called by the initiator includes a dependency injection point and the Dependency-Injection interface pattern is requested (represented by step 13). In one embodiment, once the session is validated, the item registry 102 queries the Compliance Oracle 112 for the value assigned to the property representing the injection point (represented by step 14). In one embodiment, the property representing the injection point includes the address of the implementing smart contract for the desired function. In one embodiment, no property is assigned and the control returns to the calling function and/or an error is thrown. In one embodiment, the endpoint is defined and the request is routed to the desired function in the designated smart contract (represented by step 15). On completion, control and resulting data is returned to the calling function.

In one embodiment, the Compliance-Oracle interface pattern is operable to write data to the Attestation Registry 112*b*. In one embodiment, Compliance Oracle 112 and associated Attribute Registry 112*a* include smart contracts operable to manage storage and update of data to be used by authorized smart contracts. Advantageously, the smart contracts included in Compliance Oracle 112 and Attribute Registry 112*a* permit complex rules for the management of data including policies for read and write access. Basic operations of the Compliance Oracle 112 in accordance with disclosed implementations are described below. In one embodiment, trust between the Item Registry 102 and Compliance Oracle 112 is required.

In one embodiment, the Compliance-Oracle Interface pattern is operable to write data to the Compliance Oracle 112 for display or use by the object and smart contracts associated with the object's class. At step 3, a request is placed to the Compliance-Oracle Interface by the function called by the initiator. At step 16, the request includes the desired property, additional key data, and write data. At step 17, the session is validated and the ItemRegistry initiates a request to Compliance Oracle 112 to write data to the desired property. In one embodiment, read and/or write access to properties is set based on the class template and controlled using a range of techniques described below. Two important patterns are protected-owner controlled and private-external write permission. In one embodiment, protected-owner controlled rights default to the object owner but may be updated by the owner via compliance oracle 112. In one embodiment, private-external rights are controlled at the class level, meaning smart contracts assigned by the class in a valid session may set the variables without additional permissions.

In one embodiment, the External-Storage interface pattern is operable to permit data operations by a Logic Registry 106 smart contract where the smart contract operates on private internal data (described in more detail below), such as data specific to a smart contract implementation or any of its upgrades. A smart contract writing to the external data store within the Logic Registry 106 calls the setESValue function supplying key and data information at step 18.

FIG. 11 illustrates an example of an interface specification 1000 for smart contract interactions with External Data that is shared between versions of a registered smart contract according to one embodiment of the present invention. The Get, Set, and Delete functions illustrated in FIG. 11 are operable to read and write data from a smart contract registered in logic registry 106 to ensure the data is persisted across smart contract versions. In one embodiment, each version of a smart contract is granted access to the read and write data based on the key controlled by logic registry 106 and shared across all associated smart contract versions.

Session operations in the D-TCP middleware, as described above, are the mechanism by which security is assured when routing control between smart contracts. Advantageously, the session operations are designed to prevent unauthorized execution and "man in the middle" attacks (i.e., logic that routes an authorized request to an unauthorized execution location). Smart contracts executing controlled logic (i.e., non-public functions) should have a mechanism to ensure the request came from an authorized source, and in some cases, require knowledge of the initiator of the request. In one embodiment, non-public functions are operable to verify that requests and/or calls for logic from logic registry 106 are linked to an open session by matching the request with an entry in the session stack, rather than from any other source. In one embodiment, Item Registry 102 uses the session stack to register authorized requests. In one embodiment, the receiving logic registered in the logic registry 106 validates the existence of a proper entry in the session stack to authorize the execution of a desired function. See Appendix 2 for an example of implementing code for session operations.

Figure 12A:
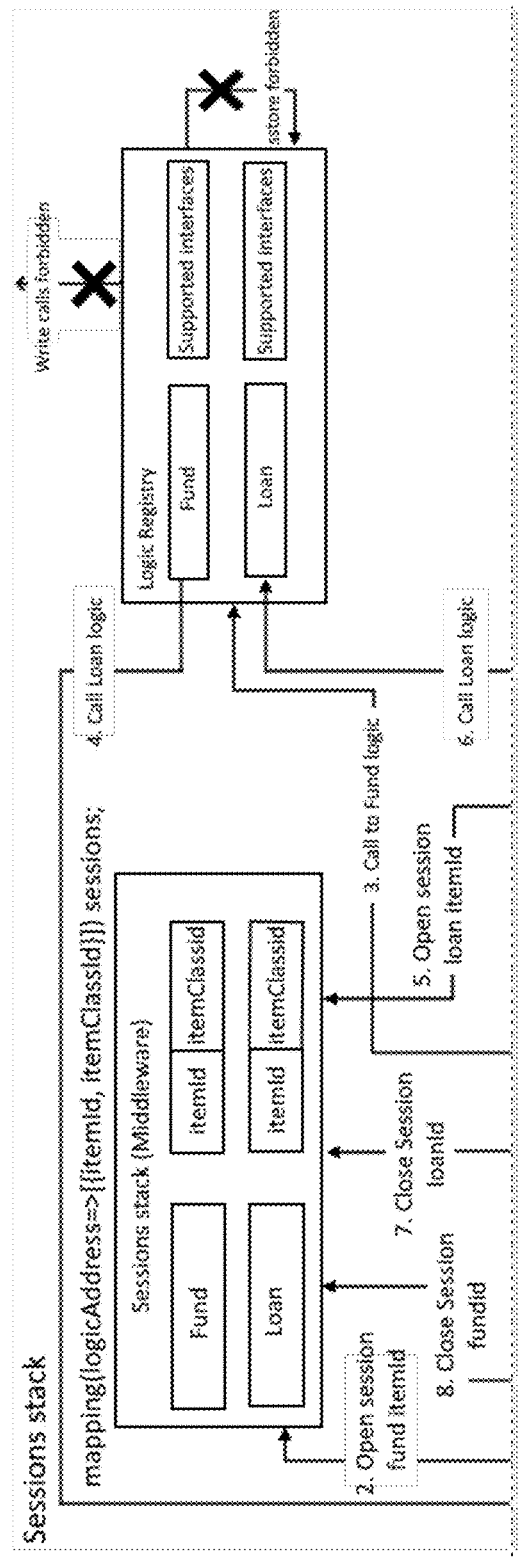
FIG. 12a illustrates an example session stack for session operations for a transaction involving multiple objects according to one embodiment of the present invention.
Figure 12B:
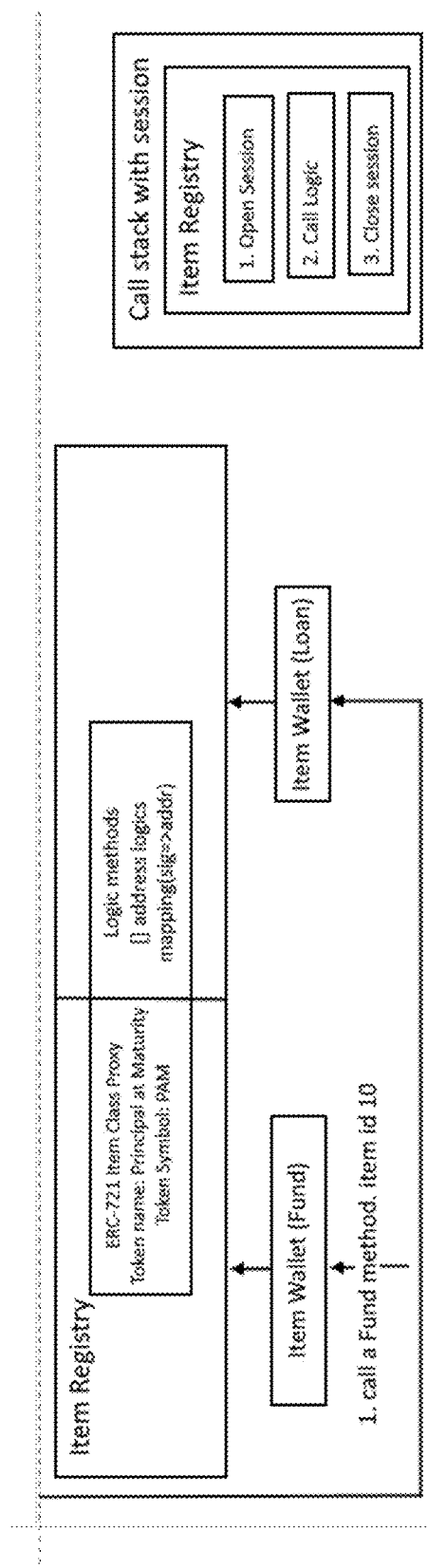
FIG. 12b is a continuation of FIG. 12a and illustrates an example session stack for session operations for a transaction involving multiple objects according to one embodiment of the present invention.

FIG. 12*a* and FIG. 12*b* illustrate an example session stack for session operations for a transaction involving multiple objects according to one embodiment of the present invention. FIG. 12*a* and FIG. 12*b* illustrate the logical flow of the example transaction through the arrows of FIG. 12*a* and FIG. 12*b*. At step 1, a request is initiated (by an initiator, e.g., a fund owner) by calling the ItemWallet as described in the Basic Fund Request section. This request is routed to the ItemRegistry. At step 2, the request is first validated by the middleware and then the Item Registry 102 creates a new session identifier in the Session Stack. In one embodiment, the session identifier includes an itemId, an item classId, an initiator, and/or a source contract. At step 3, Item registry 102 routes the request for execution to the designated function implemented by the smart contact based on the associated class template. In one embodiment, the receiving smart contract validates the session by checking the session stack and then executes the desired function. In the example illustrated by FIG. 12*a* and FIG. 12*b*, the transaction function requires execution of logic from a controlled object that implements the loan class and associated contract. In one embodiment, to call a function exposed by the controlled object, a request is generated containing the controlled object's wallet, the function identifier, and function parameters as described above (represented by Step 4). The request opens a session, represented by step 5 and routes the request to the Logic Registry 106 as described previously, represented by step 6. Following execution, the sessions opened for processing the request via the Loan (Step 7) and fund (Step 8) are closed. the loan session opened for processing the request is closed, represented by step 7, and the fund session opened for processing the request is closed, represented by step 8.

The phrase "dependency injection" (DI) refers to a software programming technique in which an object receives other objects that it depends on, called dependencies. Typically, the receiving object is called a "client" and the passed-in ('injected') object is called a "service." The code that passes the service to the client is called the "injector." The injector tells the client what service to use [injection is performed by the party with edit rights to the property containing the path to the implementing logic]. In one embodiment, the injector is the Item Registry 102 middleware.

DI can be used to maximize code reusability while allowing highly specific elements to be substituted efficiently on a case-by-case basis. For example, financial funds might exhibit similar and predictable behaviors for most functions but vary broadly in asset management strategies and distribution rules. Through DI, general fund logic can be reused while specific logic for asset management and distributions may be injected, or "plugged in" to handle the complexity and uniqueness of each implementation. A novel data structure and implementation model is required to permit dependency injection on DLT networks. The base behavior of an object is defined at object creation. However, the present invention enables a new behavior to be injected by an authorized entity at any time.

The D-TCP 100 is operable to enable smart contract logic posted to the logic registry 106 to publish dependencies (i.e., points in the code execution where logic is expected to be plugged in). In one embodiment, a published dependency is a property with a declared interface and/or class where the declared interface is selected from a list of supported interfaces published to interface registry 108 and identified by a logical element. The dependency property contains the address of logic that implements the interface and/or class and the logic executes when the client function code encounters the injection point.

In one embodiment, in order to enable code to be injected during function execution, the property points to a smart contract operable to implement the declared interface. In one embodiment, support for the declared interface is verified when the property defining the dependency is set using a verification pattern in the manner discussed with respect to FIG. 8.

In one embodiment, when logic publishing a dependency is mapped to a class, the class registers the dependency as a property and specifies the permission structure for the property. In one embodiment, the dependency is specified by the object owner on creation and is exclusively read. As a nonlimiting example, a lending pool operator may inject the loan execution logic (e.g., variable vs fixed) offered by a pool on the creation of the pool or even the issuance of a loan.

In one embodiment, the D-TCP 100 is operable to dynamically inject the logic of one smart contract into the execution of another. As an example of the use of such a functionality, a user may have a generic fund structure to manage assets and wish to inject into the trade execution logic of the fund specific logic that implements an indexing strategy for the S&P500. A second fund may use the same logic but dynamic injection enables substitution the Dow Jones Industrial Average (DJIA) strategy for trade execution.

In one embodiment, the D-TCP 100 includes economic behaviors to exchange value between participants and create economic incentives for ecosystem growth. In one embodiment, the D-TCP 100 introduces a method to incentivize economic behavior encouraging the growth of the ecosystem and the decentralization and autonomy of the governance of the disclosed invention. By covering governance mechanisms and financial incentives, the D-TCP 100 enables a vision of alignment between various stakeholders in the system using a fungible token representing the utility of the contributions of ecosystem participants and enabling the exchange of value in the protocol. In blockchain parlance, the economics facilitating the exchange of utility on a blockchain network within an ecosystem and using a token is called it tokenomics. In one embodiment, the token factory 110 is operable to create utility tokens, used as a form of currency, a payment, or to satisfy a fee in the D-TCP 100. In one embodiment, the utility tokens of the D-TCP 100 are operable to enable: the exchange of value between participants, access to services, decentralized financial functions, security and certification functions; and/or governance of the ecosystem including decisions to upgrade key elements of the ecosystem. The tokenomics and related behavior incentives enabled by the D-TCP 100 can be used in whole or in part. Further various other incentive mechanisms, economic and otherwise, can be used in connection with disclosed embodiment.

Participants of the D-TCP 100 ecosystem include: Protocol Developers, Logic Creators, Logic Validators, Class Creators, Asset Creators, and/or Asset Users.

Protocol Developers (PD) of the D-TCP 100 develop and maintain core elements of the ecosystem including the Registries and D-TCP 100 functionality.

Logic Creators (LC) are individuals and companies who have deployed smart contract logic and registered it in the Logic Registry 106.

Logic Validators (LV) are individuals that review and validate registered logic using manual or automated processes to ensure a proper fit for the ecosystem and are assigned via the ecosystem governance model, which may be centralized or decentralized. This role is critical as it becomes the gatekeeper for the form and function of the ecosystem.

Class creators (CC) are individuals and/or companies authorized to create class templates in the Class Registry 104.

Asset creators (AC) are individuals and/or companies authorized to create objects in the Item Registry 102.

Asset users (AU) are individuals and/or companies who use or own created objects.

Figure 16:
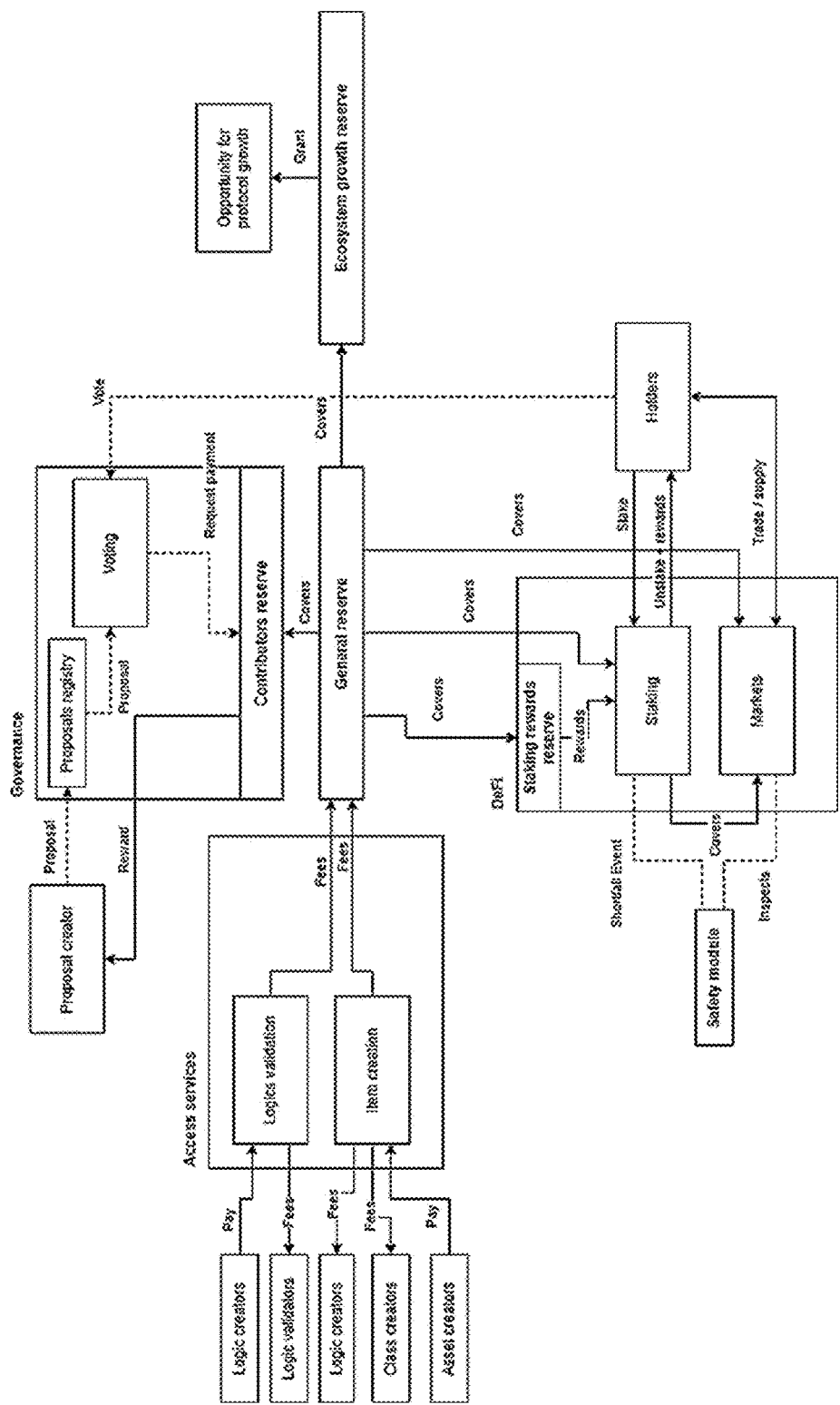
FIG. 16 illustrates a flow diagram for value transfer and governance authority for economic incentives facilitated by the D-TCP according to one embodiment of the present invention.

FIG. 16 illustrates a flow diagram for value transfer and governance authority for economic incentives facilitated by the D-TCP 100 according to one embodiment of the present invention. FIG. 16 illustrates the D-TCP's 100 ability to facilitated and enable an environment for encouraging growth of the D-TCP's 100 registries through economic incentives. The D-TCP 100 is operable to incentives the creation, customization, modification, and publishment of items to the Item Registry 102, classes to the Class Registry 104, logic to the logic Registry 106, and interfaces to the Interface Registry 108 by charging a user a fee for the use of such components and forwarding the fee to the original creator of such components. Advantageously, the economic incentives result in a large number of usable components published to the D-TCP 100, by individuals seeking compensation for their efforts. In one embodiment, the token factory 110 is operable to issue a fungible token, the utility token. In one embodiment, the utility token is used as the "fee" illustrated in FIG. 16. The utility token is used as a fee for the following actions: Logic certification, Object creation, and/or Object use. In one embodiment, the ecosystem charges a tax on the fees. In one embodiment, the tax is used to fund the general welfare of the ecosystem including protocol development and transferred to a digital wallet of the D-TCP 100 and/or an administrator wallet. In the description that follows, the utility token is the fungible token used as a fee for a plurality of actions and/or functions. FIG. 16 illustrates and example of the App Store model for smart contract logic discussed in the present application.

In one embodiment, the D-TCP 100 enables LCs to set a price for the use of smart contract logic they have created when registering the smart contract logic in the logic registry. Similarly, the D-TCP 100 enables CCs to set a price for use of the classes they have configured. Advantageously, this enables competition to be created where the CCs and LCs are looking to profit from the use of deployed or configured functionality but not set a price that is too high and discourages potential use from ACs.

In one embodiment, to certify registered logic, the utility token is used as payment for certification. In one embodiment, the payment is received and/or held by the logic registry 106. In one embodiment, the logic registry 106 forwards the utility to a LV upon completion of the certification task. The price for certification may depend on a number of factors such as the size and complexity of the smart contract code, the price charged for use, or other factors and may be negotiated separately. However, the D-TCP 100 is operable to enable LV's to customize the price for logic certification.

In one embodiment, when creating an object via the item registry 102 that utilizes and/or references a class template of the class registry 104 (one that was created by a CC), an AC pays fees for the use of the class template. The class includes registered logic. In one embodiment, the class associated with the class template being used by the AC in creating the object includes registered logic, which results in both the LC and CC being paid with the utility token based on this transaction when respective functionality is used. In one embodiment, where logic or a class is presented multiple times in an asset-fees are paid only once.

Advantageously, due to the fee customization enabled by the D-TCP 100 the ability to command higher fees for more valuable functionality incentivizes CCs and LCs to produce high quality workmanship. Advantageously, this ecosystem enabled by the D-TCP 100 provides rewards for time, efforts, and higher gas consumption by contributors. In one embodiment, AUs 1 leverage created objects. In one embodiment, behaviors encoded in objects include additional fees for use. Advantageously, to encourages the AU to minimize costs and limit fees charged by ACs, LCs and CCs, which dissuades creating unreasonably complex and expensive logic and class functions and leads to logic optimization.

In one embodiment, a fungible utility token is used for ecosystem governance leveraging decentralized voting methods that are understood by those of ordinary skill in the art. In one embodiment, the D-TCP 100 enables authorized users to present executable and suggestion proposals for utility token rewards to support governance of the D-TCP 100 economic ecosystem. In one embodiment, proposal execution rewards are funded from the general fund for the ecosystem.

In one embodiment, executable proposals are executable code and not a formal suggestion letter or any other type of change proposal. Executable proposals include: Updating protocol contract storage and functionality; Removal of logics, classes, assets from registries; Changing fee structures; Changing ecosystem variables and parameters; and/or Changing logic certification methods or certifiers.

In one embodiment, a base proposal reward rate in utility tokens is applied to an executable proposal. In one embodiment, the creator of the executable proposal is enabled by the D-TCP 100 to applied a customized reward rate in utility tokens for the proposal. In one embodiment, executable proposals are subject to a time gated voting period, and any utility token owner can vote (1 token=1 vote) for or against its acceptance including requested reward. In one embodiment, the D-TCP 100 enables different governance and quorum models are possible. In one embodiment, if at least 50% of all current holders have voted affirmative, the proposal becomes accepted. After acceptance, the proposal will be applied to protocol and, in one embodiment, only after a Time lock of a specified number of days.

In one embodiment, the D-TCP 100 enables the submission of suggestion proposals. Suggestion proposals are not executable code, rather they are a formal description of what is suggested to be done to the D-TCP 100 and/or any of its contents submitted to PDs. In one embodiment, a customizable reward rate in utility tokens is applied to the suggestion proposal's acceptance and/or implementation. In one embodiment, a base rate of utility tokens is applied to the suggestion proposal's acceptance and/or implementation. In one embodiment, suggestion proposals are evaluated by the same governance structure that executable proposals are evaluated. In one embodiment, if a suggestion proposal is accepted, its creator receives a reward of utility tokens and the PD team implements the content.

After implementation the suggestion proposal becomes executable and submitted by the core PD team to governance with pre-approved reward. After proposal approval, the core PD team is the beneficiary of rewards. In one embodiment, utility are staked within smart contracts and serve as an indication of a commitment to the protocol and act as its insurance. In one embodiment, staked utility tokens function as a security deposit, that provides insurance to protocol standards and deters malicious behavior. In one embodiment, as a reward for the benefits of this pool, utility token stakers receive a dividend on their deposit on a periodic basis. In one embodiment, removing one's stake requires a configurable cooldown period.

Utility token holders can participate in markets for any authorized DeFi and Centralized Finance (CeFi) projects, trading utility tokens on exchanges, providing them to liquidity pools, etc. in or outside of the composable ecosystem. Market making activities for the utility token may be supported directly from the General Reserve. A portion of the utility tokens can be used to incentivize ecosystem growth including incentivizing collaborations with other projects, delivery of important or desirable behaviors to the logic registry, creation of important and valuable projects that may accelerate protocol growth, and referral rewards.

In one embodiment, the D-TCP 100 is operable to facilitate the certification of published logic. Certified logic is logic that has been attested to and is authorized to be used on the D-TCP 100 platform. In one embodiment, for logic to be qualified for certification, logic published to the logic registry 106 needs to be "self-describing." Self-describing logic is logic that includes declared supported interfaces, properties, functions, events, dependencies, triggers and/or other data as required for composability, such that one logical element is operable to interact with another logical element without being specifically altered to do so. Additionally, logic needs to support the session model in order to reject unauthorized requests for controlled (non-public) functions. In one embodiment, contributed logic to the Logic Registry 106 is reviewed to ensure no external calls, except calls to the D-TCP are made to prevent injection of undesirable or unauthorized behavior outside the scope of the D-TCP. In the D-TCP 100, certified logic is logic that has published functions, events, properties, and injection points (i.e., "plugin points") so that smart contracts and other logic interacts with the certified logic in predictable ways.

Figure 17:
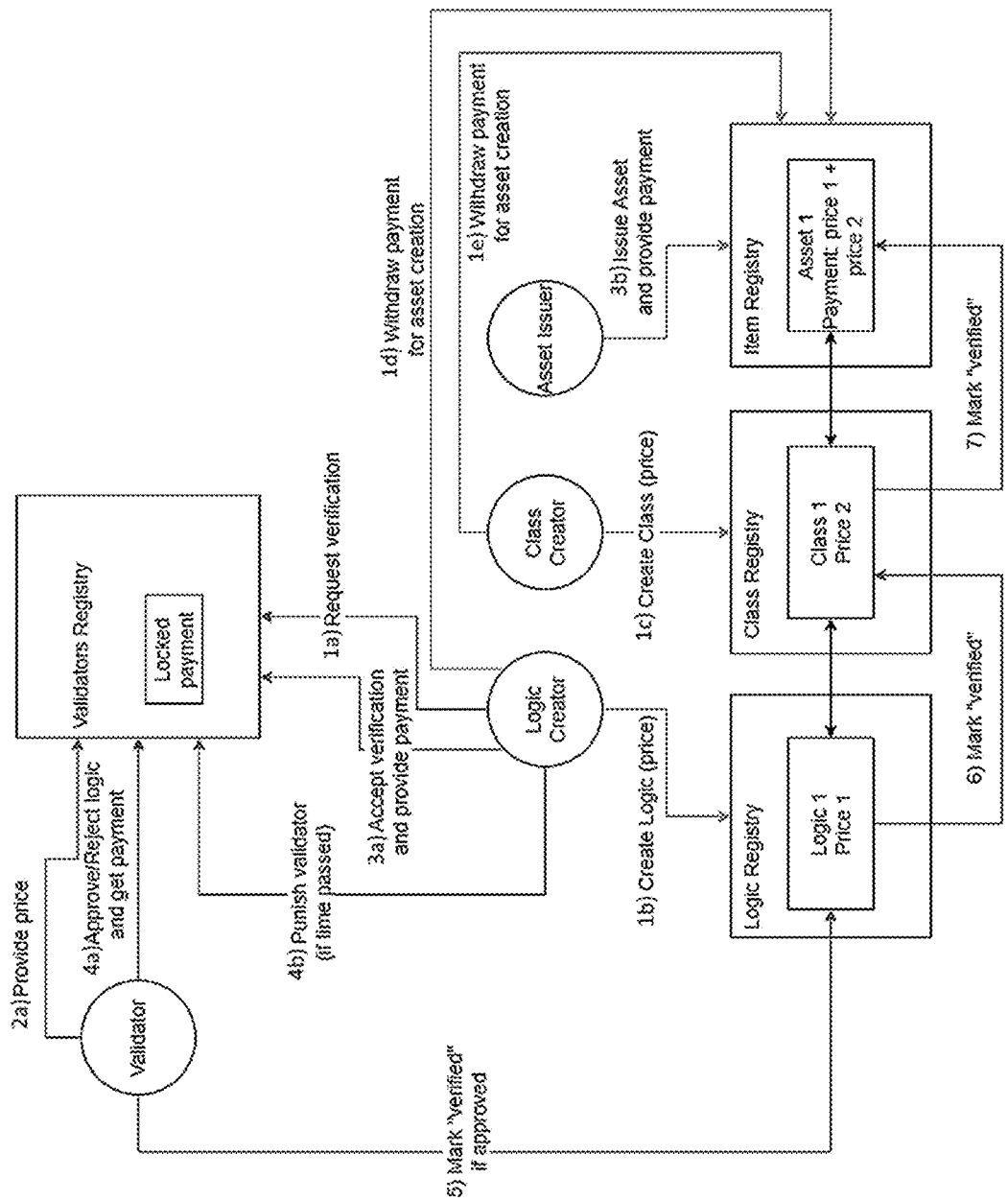
FIG. 17 illustrates a logical flow diagram of action and value exchange for logic certification according to one embodiment of the present invention.

FIG. 17 illustrates a logical flow diagram of action and value exchange for logic certification according to one embodiment of the present invention. FIG. 17 highlights the verification process for certifying registered logic as discussed above. In one embodiment, the D-TCP 100 is operable to enable a certification process for logic, smart contract, objects, items, classes, and/or class templates, that, once completed, ensures users of the platform that the specific logic, class, etc. has been verified by authorized users of the platform and is operable, safe, configurable, and functional for use. In one embodiment, the verification process, which results in certified elements, is illustrated by the plurality of steps illustrated in FIG. 17. In one embodiment, at step 1a, the D-TCP 100 receives a request, usually by a LC, for certification of registered logic. In one embodiment, at step 1b, logic is created with a price and/or fee attached for the use of the created logic. In one embodiment, step 1a is simultaneous with step 1b. In one embodiment, at step 1b, logic is created, usually by a LC, and published to the logic registry 106. In one embodiment, at step 1c, a class is created with a price and/or fee attached for the use of the created class. In one embodiment, the process illustrated by FIG. 17 begins with class creation (represented by step 1c) rather than with logic creation (represented by step 1b). In one embodiment, the verification process proceeds based on class creation (i.e., the entire class is being verified). In one embodiment, at step 1d, payment and/or a fee is charged for creation of logic that is associated with an item in the Item Registry 102 (i.e., an item from the Item Registry 102 was used to create the logic). In one embodiment, at step 1e, payment and/or a fee is charged for creation of a class that is associated with a class and/or class template in the Class Registry 104 (i.e., a class or class template from the Class Registry 104 was used to create the class). In one embodiment, the verification process proceeds based on logic creation (i.e., the logic is being verified). In one embodiment, at step 2a, the D-TCP 100 receives a price, usually provided by a LV for the certification of the code. In one embodiment, at step 3a, the D-TCP 100 receives a rejection or acceptance, usually provided by the LC who created the logic, of the price terms for code certification and post payment to the Validator's Registry. In one embodiment the payment is posted to the CertifierRegistry illustrated in FIG. 3c, which is a smart contract that enables the creation and management of Logic Validators (LVs) as well as the escrow and distribution of utility tokens associated with the validation process. In one embodiment, payment is posted by a transfer of utility tokens to a digital wallet associated with the LV. In one embodiment, at step 4a, the D-TCP 100 receives an approval or rejection, usually by the LV, of the submitted logic and receiving payment on judgment. In one embodiment, at step 4b, the D-TCP 100 punishes a LV for failure to approve or reject logic and/or a class within a predetermined and/or specified timeframe. In one embodiment, at step 5, logic certifications and/or verifications associated with created logic and/or a created class is recorded in the Logic Registry 106. In one embodiment, at step 6 and 7, logic certification events are published to the Class Registry 104 and Item Registry 102. In one embodiment, the logic certification events published to the Class Registry 104, and Item Registry 102 are associated with the certified logic, such that and class of the Class Registry 104 and/or item of the Item Registry 102 that includes the certified logic includes an indication that the logic has been certified. In one embodiment, at step 3b, an asset issuer is provided payment for publishing an asset to the Item Registry 102.

Figure 15A:
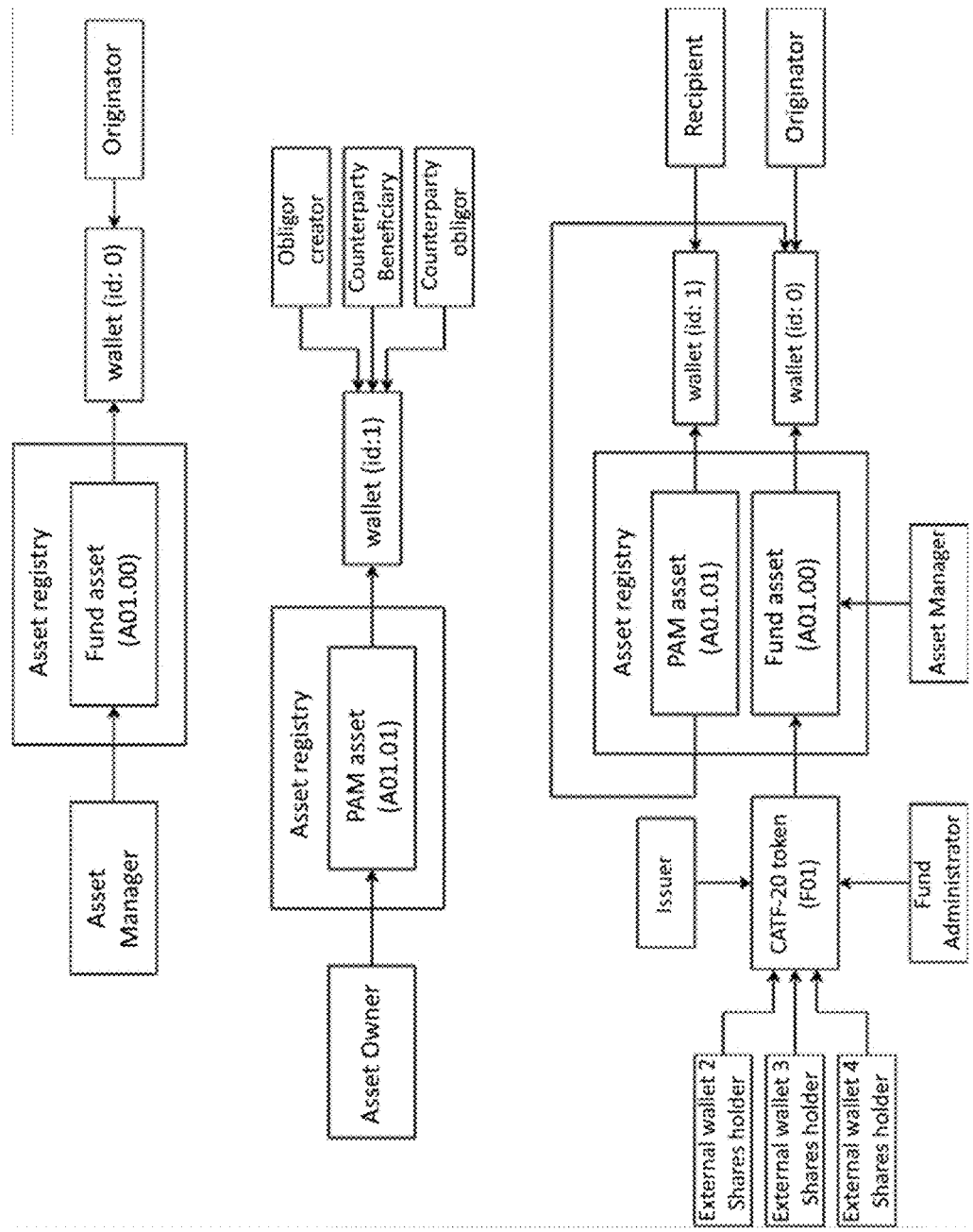
FIG. 15a illustrates object relationships for a specific application using configurable objects built by the D-TCP according to one embodiment of the present invention.
Figure 15B:
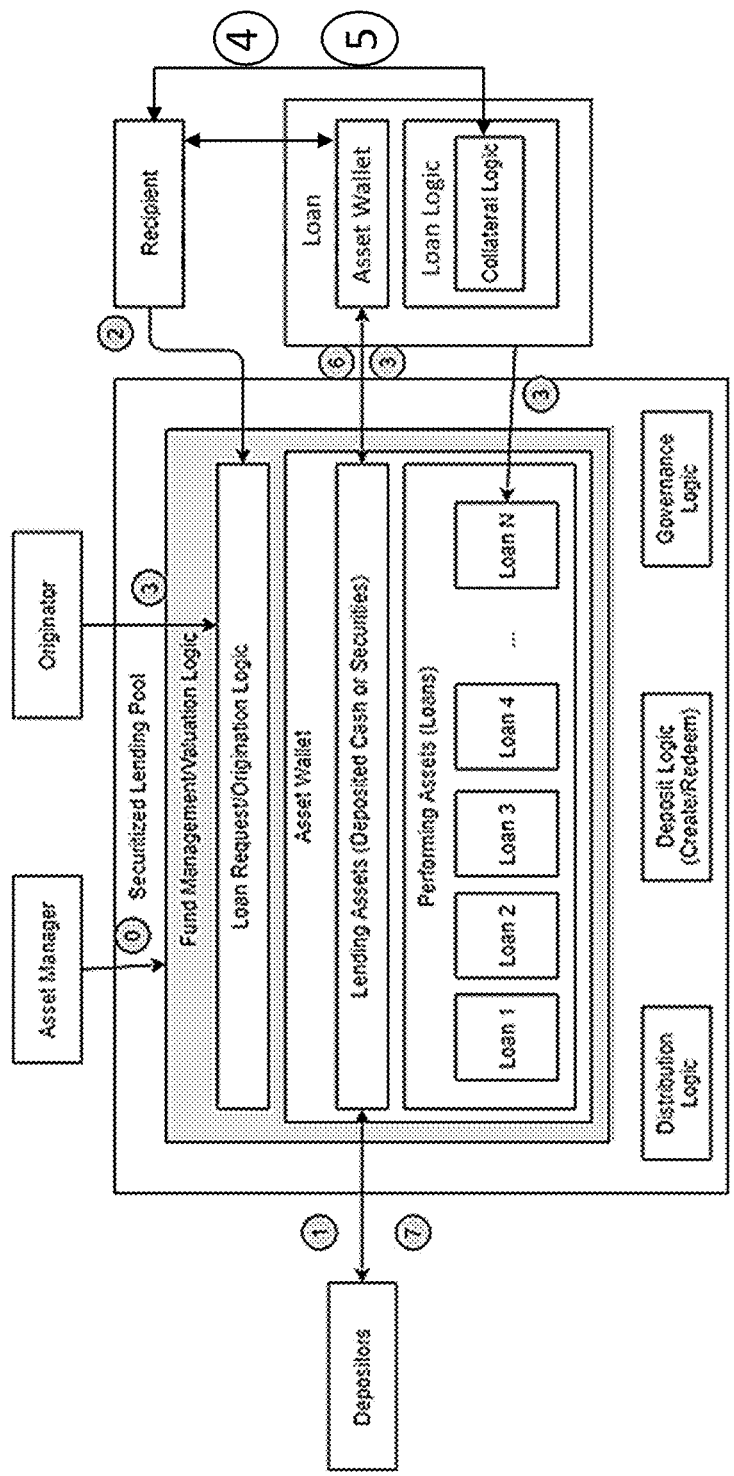
FIG. 15b illustrates a flow diagram of a process for implementing a specific application using configurable objects build by the D-TCP according to one embodiment of the present invention.
Figure 15C:
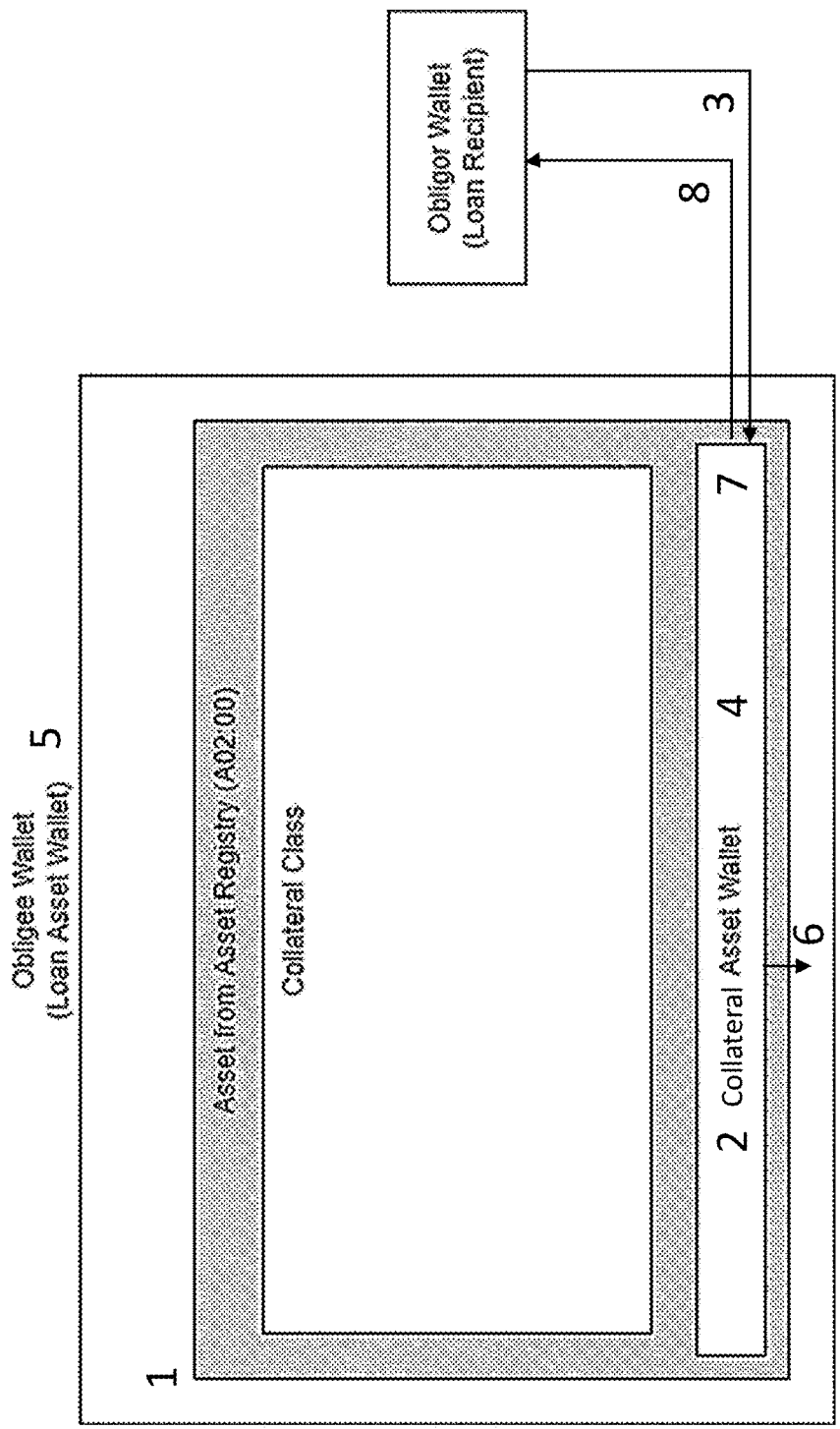
FIG. 15c illustrates collateral management functions build using the D-TCP 100 according to one embodiment of the present invention.

In one embodiment, the D-TCP 100 is operable to facilitate securities lending. While facilitating securities lending is a specific application of the present invention, one of ordinary skill in the art will appreciate that the discussion that follows is a nonlimiting example of the capabilities of what the D-TCP 100 is able to create, as applied to facilitating securities lending. FIGS. 15a-15C illustrate a plurality of mechanisms for accomplishing this specific application. In this example, the D-TCP 100 receives 4 smart contracts, which are published to a distributed ledger and registered via the logic registry 106. These smart contracts represent independent, composable functions common in banking settings: fund functionality, loan functionality, collateral functionality, and loan request/origination logic.

FIG. 15a illustrates object relationships for a specific application using configurable objects built by the D-TCP 100 according to one embodiment of the present invention. In one embodiment, the Class Registry 104 enables the behaviors of the registered logic to be composed into three classes that implement an investment bank's securities lending example. First, the loan and collateral classes are composed from the interfaces exposed by the loan and collateral smart contracts. Appendix 13 provides an example implementation of a loan class interface used for composition. Appendix 14 provides an example implementation of a fund class interface used for composition. Then, the lending pool class if formed by combining the logic of a fund and loan origination logic where the loan origination logic is plugged in for the funds asset management strategy. An instance of the lending pool is created by creating an object in item registry 102 referencing the lending pool class template. The instantiated lending pool is then attached to a fungible token representing a depository receipt for securities deposited to the fund to support lending operations. The lending pool object has an assigned wallet enabling automation of the treasury functions of the fund. FIG. 15a illustrates a high-level relationship between objects in this example.

FIG. 15b illustrates a flow diagram of a process for implementing a specific application using configurable objects build by the D-TCP 100 according to one embodiment of the present invention. More specifically, FIG. 15b illustrates the capability of the D-TCP 100 to enable a user of the platform to create a system for securities lending (i.e., a securitized lending pool). In one embodiment, at step 0, an asset manager wallet, which "owns" the asset object that represents the fund, sets rules for the securitized fund. In one embodiment, the D-TCP 100 enables the asset manager to set customized rules for the securitized fund. In one embodiment, the rules are conventional business rules for governing use of the fund and for actions to be taken by the fund. The D-TCP 100 then enables the asset manager to create securities lending object assets (in the manner described above based) based on the rules. In one embodiment, at step 1, the D-TCP 100 is operable to enable depositors to deposit assets to the asset wallet for lending and in exchange receive tokens representing shares of a lending pool (i.e., depository receipt). In one embodiment, at step 2, the D-TCP 100 is operable to enable a loan recipient to requests a loan from the asset manager. In one embodiment at step 3, the loan originator approves (or denies) the loan request. In one embodiment, the D-TCP enables the identity of the loan originator to be assigned by the asset manager. In one embodiment, following approval of the, a NFT of the loan asset is created and added to the fund (i.e., the asset manager's wallet). The loan asset NFT is assigned a collateral object operable to facilitate collateral operations. Then, share tokens are transferred from the lending pool's wallet to be escrowed in the loan asset object for distribution on acceptance of the loan. If the loan is not accepted with a time frame the shares to returned to the lending pool and the loan is canceled. In one embodiment, at step 4, the loan recipient posts required collateral to the loan's collateral object, thereby accepting the loan and releasing corresponding loaned assets to the recipient's wallet. After a time, at step 5, the loan recipient makes a payment against the loan. At 6, the loan payment is processed by the loan smart contract which transfers received funds to loan pool. If the loan repaid in its entirety, the collateral is released returning it to the loan recipient. At 7, distributions (interest payments) are made to depositors using the proceeds from the pool's assets.

FIG. 15c illustrates collateral management functions build using the D-TCP 100 according to one embodiment of the present invention. FIG. 15c expands on the securities lending example above and illustrates the collateral management portion of the example. The D-TCP 100 is operable to enable banking collateral functions to be configured and connected to banking service and banking operations without coding. In one embodiment, at 1, the Obligee (Lender) creates a collateral asset and adds it to the loan asset's wallet. In one embodiment, at 2, the value of the collateral asset (A02:00) is the sum of all obliged assets in its wallet. Obliged assets are assets that have not been released. The IAsset.Price interface is operable to publish a collateral asset's value. In one embodiment, the value is determined based on its market (exchange) value drawn from an oracle. In one embodiment, at 3, Obligor posts collateral by sending to the Wallet of the Collateral Asset A02:00. In one embodiment, at 4, the collateral class is operable to throw an event when the wallet of the collateral asset A020:00 receives value. In one embodiment, at 5, Obligee performs actions, such as release of loan funds based on the thrown event if sufficient collateral is posted. In one embodiment, at 6, the ICollateralAsset.Seize interface is operable to seize the assets if default conditions are met (i.e., failed repayment or undercollateralization due to price change). In one embodiment, the ICollateralAsset.Seize interface is operable to transfer the funds from the Collateral Asset Wallet (A02:00) to the Obligee wallet. In one embodiment, the ICollateralAsset.Seize interface is operable to conduct partial seizures. In one embodiment, at 7, the ICollateralAsset.Release interface is operable to release the collateral by signing a release transaction if collateral conditions are met, such as a loan repayment. In one embodiment, released assets remain in the Collateral asset's wallet but are not counted in its valuation. In one embodiment, the ICollateralAsset.Release interface is opeable to enable partial releases (less than the full value of the collateral). In one embodiment, at 8, the ICollateralAsset.Reclaim interface is operable to enable an Obligor to reclaim released assets by signing a reclaim transaction, which results in a transfer of the released assets to the Obligor wallet.

The above illustrated examples (FIGS. 15a-15c) demonstrate a fully customized securities lending system created, with little to no coding, using the D-TCP 100. While the securities lending scheme may not be novel to the financial industry, a low-code development platform that enables non-coders to create a computer system to automatically facilitate and/or aid in the facilitating the functions of a lending scheme is of create benefit to the art. The D-TCP 100 is operable to enable object configuration operable to facilitate the functions of the securities lending scheme, which are represented by the different interfaces referenced above (i.e., ICollateralAsset.Release, ICollateralAsset.Reclaim, ICollateralAsset.Seize, etc). Furthermore, the D-TCP 100 is operable to enable a user of the platform to create the interfaces through configuration, modification, and/or combination of object behaviors, class templates, and/or published logic of the platform. It is important to note that the D-TCP 100 is operable to enable full customization of complex financial objects through a computer-implemented framework that includes a plurality of interconnected registries for defining object behavior in a decentralized network. This is further illustrated by the nomenclature of each interface, the "ICollateralAsset" representing the class template, and the ".function" that following representing the customization of each class to include additional logic. In one embodiment, the ICollateralAsset is derived from the class registry 104. In one embodiment, the plurality of ".function" logic is derived from the logic registry 106 and/or the interface registry 108.

Applications for composable objects exist in other domains as well. Recently, considerable interest has arisen for the application of blockchain technologies to gaming and the metaverse (i.e., a virtual-reality space in which users can interact with a computer-generated environment and other users). These domains may benefit from the D-TCP 100, just as the finance industry does in the preferred embodiment. As an example, substitute the loan class for a virtual starship class (referencing the gaming industry), with configurable properties (payload, fuel consumption, defensive characteristics, range, location, velocity, etc), and functions (attack, dock, etc) that enable an object assigned to the class interact with other objects. The starship class can be assigned weapons, an instance of the laser gun class for example. The starship may have a docking bay object in which other instances of a smaller class of ships can land. The ability to quickly create and assign behaviors enabled by registered smart contracts to create classes of objects that can interact with other objects of the same or different classes provides a powerful substrate for game development and creation in the metaverse. One of ordinary skill in the art will appreciate that the gaming analogy is nonlimiting and seeks to demonstrate the breath of variety of industries that the D-TCP 100 is applicable to. One of ordinary skill in the art will appreciate that it is the customizability of configurable objects, enabled by the D-TCP 100 and the plurality of registries, that is the purpose of this disclosure, rather than and specific implementation of configurable objects. The preferred embodiment is illustrated in this disclosure, that of a D-TCP 100 to enable configuration of objects to enable a noncoder to create financial systems, platforms, functions, process, and mechanisms with ease.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Figure 18:
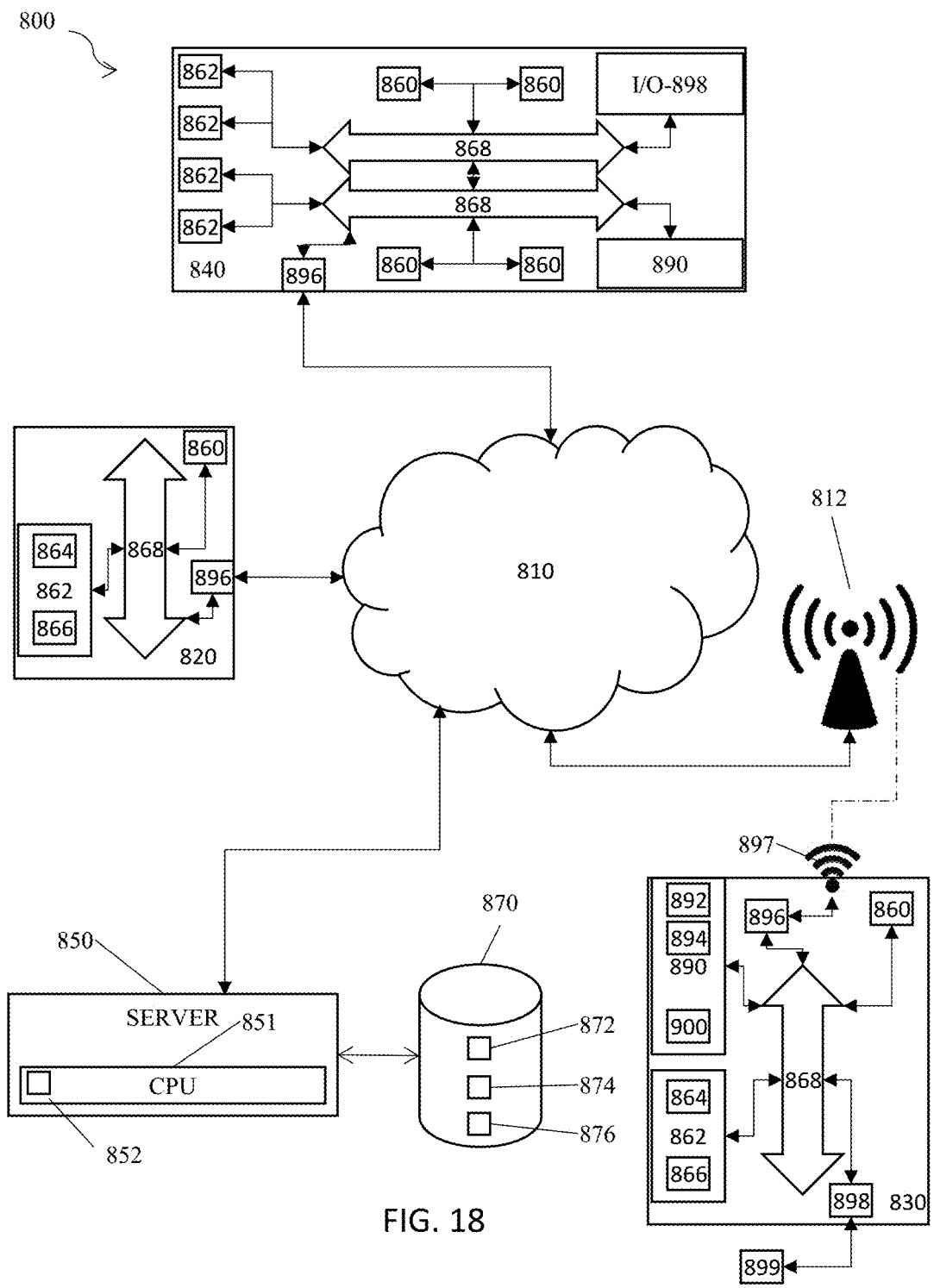
FIG. 18 is a schematic diagram of a system of the present invention.

FIG. 18 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 18, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 18, is operable to include other components that are not explicitly shown in FIG. 18, or is operable to utilize an architecture completely different than that shown in FIG. 18. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Data Stored on a Distributed Ledger

In a preferred embodiment, the platform is operable to store data on a distributed ledger, e.g., a blockchain. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across a network of nodes such that each node has a complete copy of the distributed ledger. The replication and synchronization of data across a distributed set of devices provides increased transparency over traditional data storage systems, as multiple devices have access to the same set of records and/or database. Additionally, the use of distributed ledgers eliminates the need for third party and/or administrative authorities because each of the nodes in the network is operable to receive, validate, and store additional data, thus creating a truly decentralized system. Eliminating the third party and/or administrative authorities saves time and cost. A decentralized database is also more secure than traditional databases, which are stored on a single device and/or server because the decentralized data is replicated and spread out over both physical and digital space to segregated and independent nodes, making it more difficult to attack and/or irreparably tamper with the data. Tampering with the data at one location does not automatically affect the identical data stored at other nodes, thus providing greater data security.

In addition to the decentralized storage of the distributed ledger, which requires a plurality of nodes, the distributed ledger has further advantages in the way that data is received, validated, communicated, and added to the ledger. When new data is added to the distributed ledger, it must be validated by a portion of the nodes (e.g., 51%) involved in maintaining the ledger in a process called consensus. Proof of work, proof of stake, delegated proof of stake, proof of space, proof of capacity, proof of activity, proof of elapsed time, and/or proof of authority consensus are all compatible with the present invention, as are other forms of consensus known in the art. In one embodiment, the present invention uses fault-tolerant consensus systems. Each node in the system is operable to participate in consensus, e.g., by performing at least one calculation, performing at least one function, allocating compute resources, allocating at least one token, and/or storing data. It is necessary for a portion of the nodes in the system (e.g., 51% of the nodes) to participate in consensus in order for new data to be added to the distributed ledger. Advantageously, requiring that the portion of the nodes participate in consensus while all nodes are operable to participate in consensus means that authority to modify the ledger is not allocated to one node or even a group of nodes but rather is equally distributed across all of the nodes in the system. In one embodiment, a node that participates in consensus is rewarded, e.g., with a digital token, in a process called mining.

The blockchain is a commonly used implementation of a distributed ledger and was described in Satoshi Nakamoto's whitepaper Bitcoin: A Peer-to-Peer Electronic Cash System, which was published in October 2008 and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. In one embodiment, a timestamp is also included in the hash. The computation of the cryptographic hash based on data in a preceding block is a computationally intensive task that could not practically be conducted as a mental process. The use of cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain and which breaks the mapping of the preceding block. The blockchain is an improvement on existing methods of data storage because it connects blocks of data in an immutable fashion. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. Additional information about the blockchain is included in The Business of Blockchain by William Mougavar published in April 2016, which is incorporated herein by reference in its entirety.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key also corresponding to the user. The separation of public keys and private keys means that external parties can verify a digital signature of a user using a public key but cannot replicate the digital signature since they do not have a private key. Digital signatures are not merely electronic analogs of traditional physical signatures. Physical signatures are easily accessible and easily replicable by hand. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms by human mental work. Therefore, creating, decoding, and/or verifying digital signatures with the human mind is highly impractical.

Public, private, consortium, and hybrid blockchains are compatible with the present invention. In one embodiment, the blockchain system used by the present invention includes sidechains wherein the sidechains run parallel to a primary chain. Implementations of distributed ledger and/or blockchain technology including, but not limited to, BITCOIN, ETHEREUM, HASHGRAPH, BINANCE, FLOW, TRON, TEZOS, COSMOS, and/or RIPPLE are compatible with the present invention. In one embodiment, the platform includes at least one acyclic graph ledger (e.g., at least one tangle and/or at least one hashgraph). In one embodiment, the platform includes at least one quantum computing ledger.

In one embodiment, the present invention further includes the use of at least one smart contract, wherein a smart contract includes a set of automatically executable steps and/or instructions that are dependent on agreed-upon terms. The smart contract includes information including, but not limited to, at least one contracting party, at least one contract address, contract data, and/or at least one contract term. In one embodiment, the at least one smart contract is deployed on a blockchain such that the at least one smart contract is also stored on a distributed node infrastructure. In one embodiment, the terms of the at least one smart contract are dependent on changes to the blockchain. For example, a provision of the at least one smart contract executes when a new block is added to the blockchain that meets the terms of the at least one smart contract. The smart contract is preferably executed automatically when the new block is added to the blockchain. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger. Additionally, all executions of the smart contract are immutably stored and accessible on the distributed ledger, which is an improvement over non-distributed, stateless coded contracts. In one embodiment, the state information is also stored on a distributed ledger.

Cryptocurrency Transactions

Distributed ledger technology further enables the use of cryptocurrencies. A cryptocurrency is a digital asset wherein ownership records and transaction records of a unit of cryptocurrency (typically a token) are stored in a digital ledger using cryptography. Use of centralized cryptocurrencies and decentralized cryptocurrencies are both compatible with the present invention. Centralized cryptocurrencies are minted prior to issuance and/or are issued by a single body. Records of a decentralized cryptocurrency are stored on a distributed ledger (e.g., a blockchain), and any node participating in the distributed ledger is operable to mint the decentralized cryptocurrency. The distributed ledger thus serves as a public record of financial transactions. Cryptocurrencies are typically fungible in that each token of a given cryptocurrency is interchangeable. The present invention is operable to facilitate transactions of at least one cryptocurrency, including, but not limited to, BITCOIN, LITECOIN, RIPPLE, NXT, DASH, STELLAR, BINANCE COIN, and/or ETHEREUM. In one embodiment, the present invention is operable to facilitate transactions of stablecoins, NEO Enhancement Protocol (NEP) tokens, and/or BINANCE Chain Evolution Proposal (BEP) tokens. In one embodiment, the present invention is operable to support tokens created using the ETHEREUM Request for Comment (ERC) standards as described by the Ethereum Improvement Proposals (EIP). For example, the present invention is operable to support ERC-20-compatible tokens, which are created using the EIP-20: ERC-20 Token Standard, published by Vogelsteller, et al., on Nov. 19, 2015, which is incorporated herein by reference in its entirety.

A cryptocurrency wallet stores keys for cryptocurrency transactions. As cryptocurrency is a virtual currency, the ability to access and transfer cryptocurrency must be protected through physical and/or virtual means such that such actions are only operable to be performed by the rightful owner and/or parties with permission. In one embodiment, a cryptocurrency wallet stores a private key and a public key. In another embodiment, the cryptocurrency wallet is operable to create the private key and/or the public key, encrypt data, and/or sign data (e.g., with a digital signature). In one embodiment, the private key is generated via a first cryptographic algorithm wherein the input to the first cryptographic algorithm is random. Alternatively, the input to the first cryptographic algorithm is non-random. In one embodiment, the public key is generated from the private key using a second cryptographic algorithm. In one embodiment, the first cryptographic algorithm and the second cryptographic algorithm are the same. The private key is only accessible to the owner of the cryptocurrency wallet, while the public key is accessible to the owner of the cryptocurrency wallet as well as a receiving party receiving cryptocurrency from the owner of the cryptocurrency wallet. Deterministic and non-deterministic cryptocurrency wallets are compatible with the present invention.

As a non-limiting example, a cryptocurrency transaction between a first party and a second party involves the first party using a private key to sign a transaction wherein the transaction includes data on a first cryptocurrency wallet belonging to the first party, the amount of the transaction, and a second cryptocurrency wallet belonging to the second party. In one embodiment, the second cryptocurrency wallet is identified by a public key. The transaction is then populated to a distributed network wherein a proportion (e.g., 51%) of the nodes of the distributed network verify the transaction. Verifying the transaction includes verifying that the private key corresponds to the first cryptocurrency wallet and that the amount of the transaction is available in the first cryptocurrency wallet. The nodes then record the transaction on the distributed ledger, e.g., by adding a block to a blockchain. Fulfilling the cryptocurrency transaction is a computationally intensive process due to key cryptography and the consensus necessary for adding data to the distributed ledger that could not practically be performed in the human mind. In one embodiment, a node is operable to verify a block of transactions rather than a single transaction.

Desktop wallets, mobile wallets, hardware wallets, and web wallets are compatible with the present invention. A software wallet (e.g., a desktop wallet, a mobile wallet, a web wallet) stores private and/or public keys in software. A hardware wallet stores and isolates private and/or public keys in a physical unit, e.g., a universal serial bus (USB) flash drive. The hardware wallet is not connected to the internet or any form of wireless communication, thus the data stored on the hardware wallet is not accessible unless the hardware wallet is connected to an external device with network connection, e.g., a computer. In one embodiment, the data on the hardware wallet is not operable to be transferred out of the hardware wallet. In one embodiment, the hardware wallet includes further data security measures, e.g., a password requirement and/or a biometric identifier requirement. In one embodiment, the present invention is operable to integrate a third-party cryptocurrency wallet. Alternatively, the present invention is operable to integrate a payments platform that is compatible with cryptocurrency, including, but not limited to, VENMO, PAYPAL, COINBASE, and/or payments platforms associated with financial institutions.

Tokenization

In one embodiment, the platform is operable to tokenize assets. A token is a piece of data that is stored on the distributed digital ledger and that can be used to represent a physical and/or a digital asset, e.g., in a transaction, in an inventory. The token is not the asset itself, however, possession and transfer of the token are stored on the distributed digital ledger, thus creating an immutable record of ownership. In one embodiment, the token includes cryptographic hashes of asset data, wherein the asset data is related to the asset. In one embodiment, the asset data is a chain of data blocks. For example, the asset is a work of digital art, and the asset data includes data about the work such as information about an artist, a subject matter, a file type, color data, etc. The corresponding token includes a cryptographic hash of the asset data, which describes the work. Alternative mappings of the asset data to the token are also compatible with the present invention. In one embodiment, the token is a non-fungible token (NFT). A first non-fungible token is not directly interchangeable with a second non-fungible token; rather, the value of the first token and the second token are determined in terms of a fungible unit (e.g., a currency). In one embodiment, the platform is operable to support ETHEREUM standards for tokenization, including, but not limited to, EIP-721: ERC-721 Non-Fungible Token Standard by Entriken, et al., which was published Jan. 24, 2018 and which is incorporated herein by reference in its entirety. In one embodiment, the platform is operable to create fractional NFTs (f-NFTs), wherein each f-NFT represents a portion of the asset. Ownership of an f-NFT corresponds to partial ownership of the asset.

The various functions disclosed herein can be accomplished by one or more computing devices having processors which execute instructions stored in one or more tangible computer readable memories. The various devices can be communicatively coupled to one another in known manners using known protocols. For example, the devices can be coupled over a Local Area Network or the Internet and affect ledgers that may reside on centralized, private decentralized, or public decentralized networks.

Additional alternative structural and functional designs may be implemented for enforcing compliance policies on decentralized financial transactions. Thus, while implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for defining object behaviors for a configurable object in a decentralized network comprising:
　a Decentralized Trusted Control Plane (D-TCP) receiving a request to define a behavior of the configurable object;
　　wherein the configurable object is a unique instance of a class expressed as a data structure specifying executable behaviors of the configurable object stored in an item registry;
　　wherein the data structure of the configurable object includes a unique identifier, identifiable by a plurality of registries;
　　wherein the plurality of registries includes the item registry including a plurality of objects and a logic registry including a plurality of selectable logic associated with the configurable object;
　　wherein the plurality of registries are executable on a Decentralized Ledger Technology (DLT) through at least one smart contract;

wherein the request includes smart contract logic from the logic registry defining an object behavior;
the D-TCP routing the request using instructions in the data structure of the configurable object;
the D-TCP mapping the smart contract logic from the logic registry to the configurable object of the item registry;
the D-TCP configuring the configurable object to include the behavior defined by the smart contract logic; and
the D-TCP executing the configurable object which includes the behavior defined by the smart contract logic using the at least one smart contract on the DLT.

2. The method of claim 1, wherein the item registry records all configurable objects of the D-TCP and includes smart contract code to execute configurable object behavior on a DLT and wherein the logic registry records all smart contract logic of the D-TCP and includes smart contract code to decentralize the deployment of smart contract logic by recording the smart contract logic on a DLT.

3. The method of claim 1, wherein the D-TCP receives the request to define the behavior of the configurable object through a graphical user interface (GUI) that enables low-code software development.

4. The method of claim 1, wherein the D-TCP enables pluggable logic by receiving a request to include logic to a configurable object, determining a class template of the class registry associated with the requested logic based on a classId, verifying that the requested logic is published to the logic registry, determining that the requested logic is supported, routing the requested logic to the configurable object, and storing routing information of the requested logic in the item registry.

5. The method of claim 1, further comprising an attestation registry and attribute registry determining authorization to define object behavior by assigning an attestation value associated with the configurable object.

6. The method of claim 1, further comprising a smart contract-based middleware enabling interactions between the configurable object and external smart contract logic, routing function calls between the configurable object and the plurality of objects in the item registry, and publishing events and/or errors associated with the configurable object.

7. The method of claim 1, wherein the behavior of the configurable object includes permissions, interfaces, functions, properties, events, errors, and/or dependencies of the configurable object.

8. The method of claim 1, further comprising a context-based permission model managing execution of state changes on the D-TCP by verifying that the configurable object associated with the requested state change is associated with a digital wallet having authority to make the requested state change through the unique identifier of the configurable object.

9. The method of claim 1, wherein the plurality of registries are implemented as computer modules that include corresponding smart contracts operable to execute the functions of the plurality of registries on a DLT.

10. The method of claim 1, wherein the D-TCP is executed on a public distributed ledger, a private distributed ledger, and/or a hybrid ledger.

11. The method of claim 1, wherein the class registry includes a plurality of class templates expressed as a data structure defining executable behaviors of a class.

12. The method of claim 1, wherein the D-TCP further comprises a token factory issuing a fungible token, wherein the D-TCP facilitates a fee and/or payment of the fungible token as value exchange for actions associated with logic certification, object creation, smart contract logic implementation, and/or class template implementation.

13. A system for defining object behaviors for a configurable object in a decentralized network comprising:
a Decentralized Trusted Control Plane (D-TCP) including a processor and a memory executable on a Distributed Ledger Technology (DLT);
wherein the D-TCP is operable to receive a request to define a behavior of the configurable object;
wherein the configurable object is a unique instance of a class expressed as a data structure specifying executable behaviors of the configurable object stored in an item registry;
wherein the data structure of the configurable object includes a unique identifier, identifiable by a plurality of registries;
wherein the plurality of registries includes the item registry including a plurality of objects and/or a logic registry including a plurality of selectable logic associated with the configurable object;
wherein the plurality of registries are executable on a DLT through at least one smart contract;
wherein the request includes smart contract logic from the logic registry defining an object behavior;
wherein the D-TCP further comprises an attestation registry and attribute registry operable to determine authorization to define object behavior by assigning an attestation value associated with the configurable object;
wherein the D-TCP further comprising a context-based permission model operable to manage execution of state changes on the D-TCP by verifying that the configurable object associated with the requested state change is associated with a digital wallet having authority to make the requested state change through the unique identifier of the configurable object;
wherein the D-TCP is operable to route the request using instructions in the data structure of the configurable object;
wherein the D-TCP is operable to map the smart contract logic from the logic registry to the configurable object of the item registry;
wherein the D-TCP is operable to configure the configurable object to include the behavior defined by the smart contract logic; and
wherein the D-TCP is operable to execute the configured configurable object using at least one smart contract on a DLT.

14. The system of claim 13, wherein the item registry records all configurable objects of the D-TCP and includes smart contract code to execute configurable object behavior on a DLT and wherein the logic registry records all smart contract logic of the D-TCP and includes smart contract code to decentralize the deployment of smart contract logic by recording the smart contract logic on a DLT.

15. The system of claim 13, wherein the D-TCP is operable to receive the request to define the behavior of the configurable object through a graphical user interface (GUI) that enables low-code software development.

16. The system of claim 13, further comprising a smart contract-based middleware operable to enable interactions between the configurable object and external smart contract logic, route function calls between the configurable object and the plurality of objects in the item registry, publish events and/or errors associated with the configurable object.

17. The system of claim 13, wherein the behavior of the configurable object includes permissions, interfaces, functions, properties, events, errors, and/or dependencies of the configurable object.

18. A system for defining object behaviors for a configurable object in a decentralized network comprising:
a Decentralized Trusted Control Plane (D-TCP) including a processor and a memory executable on a Distributed Ledger Technology (DLT);
wherein the D-TCP is operable to receive a request to define a behavior of the configurable object;
wherein the configurable object is a unique instance of a class expressed as a data structure specifying executable behaviors of the configurable object stored in an item registry;
wherein the data structure of the configurable object includes a unique identifier, identifiable by a plurality of registries;
wherein the plurality of registries includes the item registry including a plurality of objects and/or a logic registry including a plurality of selectable logic associated with the configurable object;
wherein the plurality of registries are executable on a DLT through at least one smart contract;
wherein the request includes smart contract logic from the logic registry defining an object behavior;
wherein the D-TCP further comprises a token factory operable to issue a fungible token, wherein the D-TCP facilitates a fee and/or payment of the fungible token as value exchange for actions associated with logic certification, object creation, smart contract logic implementation, and/or class template implementation;
wherein the D-TCP is operable to route the request using instructions in the data structure of the configurable object;
wherein the D-TCP is operable to map the smart contract logic from the logic registry to the configurable object of the item registry;
wherein the D-TCP is operable to configure the configurable object to include the behavior defined by the smart contract logic; and
wherein the D-TCP is operable to execute the configured configurable object using at least one smart contract on a DLT.

19. The system of claim 18, wherein the item registry records all configurable objects of the D-TCP and includes smart contract code to execute configurable object behavior on a DLT and wherein the logic registry records all smart contract logic of the D-TCP and includes smart contract code to decentralize the deployment of smart contract logic by recording the smart contract logic on a DLT.

20. The system of claim 18, wherein the D-TCP enables pluggable logic by receiving a request to include logic to a configurable object, determining a class template of the class registry associated with the requested logic based on a classId, verifying that the requested logic is published to the logic registry, determining that the requested logic is supported, routing the requested logic to the configurable object, and storing routing information of the requested logic in the item registry.

* * * * *